(12) United States Patent
Rennison

(10) Patent No.: US 7,870,117 B1
(45) Date of Patent: Jan. 11, 2011

(54) CONSTRUCTING A SEARCH QUERY TO EXECUTE A CONTEXTUAL PERSONALIZED SEARCH OF A KNOWLEDGE BASE

(75) Inventor: Earl Rennison, Mountain View, CA (US)

(73) Assignee: Monster Worldwide, Inc., New York, NY (US)

( * ) Notice: Subject to any disclaimer, the term of this patent is extended or adjusted under 35 U.S.C. 154(b) by 191 days.

(21) Appl. No.: 11/757,177

(22) Filed: Jun. 1, 2007

Related U.S. Application Data

(60) Provisional application No. 60/810,486, filed on Jun. 1, 2006.

(51) Int. Cl.
G06F 17/30 (2006.01)
(52) U.S. Cl. ...................................... 707/706; 707/723
(58) Field of Classification Search ................. 707/706, 707/723, E17.008, E17.014
See application file for complete search history.

(56) References Cited

U.S. PATENT DOCUMENTS

| | | | |
|---|---|---|---|
| 5,832,497 | A | 11/1998 | Taylor |
| 6,038,560 | A | 3/2000 | Wical |
| 6,108,698 | A | 8/2000 | Tenev et al. |
| 6,182,066 | B1 | 1/2001 | Marques |
| 6,289,340 | B1 | 9/2001 | Puram et al. |
| 6,385,620 | B1 | 5/2002 | Kurzius et al. |
| 6,484,166 | B1 | 11/2002 | Maynard |
| 6,539,373 | B1 | 3/2003 | Guha |
| 6,571,231 | B2 | 5/2003 | Sedlar |
| 6,618,727 | B1 | 9/2003 | Wheeler et al. |
| 6,675,159 | B1* | 1/2004 | Lin et al. ........................ 707/3 |
| 6,681,223 | B1 | 1/2004 | Sundaresan |
| 6,684,204 | B1 | 1/2004 | Lal |
| 6,711,585 | B1 | 3/2004 | Copperman et al. |
| 6,728,707 | B1 | 4/2004 | Wakefield et al. |
| 6,941,295 | B2 | 9/2005 | Nakamura et al. |
| 6,976,019 | B2 | 12/2005 | Davallou |
| 6,980,984 | B1 | 12/2005 | Huffman et al. |
| 6,981,040 | B1 | 12/2005 | Konig et al. |
| 7,062,483 | B2 | 6/2006 | Ferrari et al. |
| 7,117,207 | B1 | 10/2006 | Kerschberg et al. |

(Continued)

OTHER PUBLICATIONS knowledgerush, "Lexical analysis", 2003, Knowledgerush.com, http://www.knowledgerush.com/kr/encyclopedia/_Lexical_ analysis/.*

(Continued)

*Primary Examiner*—Mohammad Ali
*Assistant Examiner*—Amanda Willis
(74) *Attorney, Agent, or Firm*—Fenwick & West LLP

(57) ABSTRACT

Information retrieval systems face challenging problems with delivering highly relevant and highly inclusive search results in response to a user's query. Contextual personalized information retrieval uses a set of integrated methodologies that can combine automatic concept extraction/matching from text, a powerful fuzzy search engine, and a collaborative user preference learning engine to provide accurate and personalized search results. The system can include constructing a search query to execute a search of a database. The system can parse an input query from a user conducting the search of the database into sub-strings, and can match the sub-strings to concepts in a semantic concept network of a knowledge base. The system can further map the matched concepts to criteria and criteria values that specify a set of constraints on and scoring parameters for the matched concepts.

43 Claims, 19 Drawing Sheets

Mapping Input String to Search Criteria

U.S. PATENT DOCUMENTS

| | | | |
|---|---|---|---|
| 7,191,138 | B1 | 3/2007 | Roy et al. |
| 7,424,438 | B2 | 9/2008 | Vianello |
| 7,451,144 | B1 | 11/2008 | Koudas et al. |
| 7,496,561 | B2 | 2/2009 | Caudill et al. |
| 7,529,736 | B2 | 5/2009 | Katariya et al. |
| 7,536,413 | B1 | 5/2009 | Mohan et al. |
| 7,555,441 | B2 | 6/2009 | Crow et al. |
| 2001/0049674 | A1 | 12/2001 | Talib et al. |
| 2002/0128885 | A1 | 9/2002 | Evans |
| 2003/0028520 | A1 | 2/2003 | Alpha |
| 2003/0220909 | A1 | 11/2003 | Farrett |
| 2003/0229626 | A1 | 12/2003 | Nayak |
| 2004/0054679 | A1 | 3/2004 | Ralston |
| 2004/0210568 | A1 | 10/2004 | Makus et al. |
| 2004/0210661 | A1 | 10/2004 | Thompson |
| 2005/0080657 | A1* | 4/2005 | Crow et al. ............... 705/8 |
| 2005/0125746 | A1 | 6/2005 | Viola et al. |
| 2006/0229896 | A1 | 10/2006 | Rosen et al. |
| 2006/0265270 | A1 | 11/2006 | Hyder et al. |
| 2007/0118498 | A1 | 5/2007 | Song et al. |
| 2007/0179924 | A1 | 8/2007 | Zhong et al. |
| 2008/0172415 | A1 | 7/2008 | Fakhari et al. |
| 2009/0018918 | A1 | 1/2009 | Moneypenny et al. |

OTHER PUBLICATIONS

"Automatic Classification," Autonomy [online] [Retrieved on Feb. 1, 2006] Retrieved from the Internet<URL: http://www.autonomy.com/content/Products/IDOL/f/Classification.html>, 7 pages.

"Autonomy Technology White Paper," Autonomy [online] Copyright 2003, Retrieved from the Internet: <URL: http://www.autonomy.com>, 19 pages.

Hillyer, Mike, "MySQL AB: An Introduction to Database Normalization" [online] [Retrieved on Feb. 1, 2006] Retrieved from the Internet: <URL: http://dev.mysql.com/tech-resources/articles/intro-to-normalization.html>, 6 pages.

"Stratify Classification Server," Stratify, Inc., [online] Copyright 2003, Retrieved from the Internet: <URL:http://www.stratify.com>, 4 pages.

* cited by examiner $f(x): x > C \rightarrow$ $f(x): x < C \rightarrow$ $f(x): x = C \rightarrow$ $f(x): C_1 < x < C_2 \rightarrow$ Technology: Search Algorithm

CONSTRUCTING A SEARCH QUERY TO EXECUTE A CONTEXTUAL PERSONALIZED SEARCH OF A KNOWLEDGE BASE

RELATED APPLICATIONS

This application claims the benefit of under 35 U.S.C. §119(e) of U.S. Provisional Application No. 60/810,486 filed on Jun. 1, 2006, entitled "Contextual Personalized Information Retrieval," the entire disclosure of which is hereby incorporated by reference herein in its entirety for all purposes.

BACKGROUND OF THE INVENTION

1. Field of the Invention

This invention pertains in general to information retrieval, and more specifically to contextual personalized retrieval of information in response to user queries.

2. Description of the Related Art

Information retrieval systems face several daunting problems with delivering highly relevant and highly inclusive content in response to a user's query. These problems include synonymy, polysemy, spelling errors, abbreviations, and word concatenations in both the queries and the documents being queried. Information retrieval systems further face problems with partial matches, incomplete queries, complex meanings that extend beyond the words entered in queries and account for the relative significance of a users' query in a document, and the implicit preferences of the individuals conducting queries that were not specified in the query but can be inferred by the information retrieval system. These types of problems can be faced in the searching of various types of documents. For instance, these problems are illustrated in searches conducted for candidates to fill job openings or searches through résumés for particular criteria that match a set of desired criteria in a job description. Some examples of these types of common problems with searches are described in more detail below (using the job search model example for illustration):

Synonymy: There may be many different ways to refer to the same thing, and thus a query using a particular term might not retrieve search results including documents stating synonyms for that term. As one example that involves a job search situation, a résumé document may contain one set of words that refer to a concept (e.g., J2EE), while the job requisition (e.g., job description or list of skills, experience, etc. that a company is looking for in a job candidate) or the query may use a different set of words to refer to the same concept (e.g., Java 2 Enterprise Edition).

Polysemy: The same word(s) can have many different meanings For example, the word "Berkeley" can refer to the university, "UC Berkeley," the city of "Berkeley, Calif.," a company called "Berkeley Systems, Inc.," etc.

Spelling Errors: There may be spelling errors in a document being searched (e.g., in résumés, as well as the job requisition/query). Thus, a query, "Berkeley," will not retrieve a document incorrectly stating "Berkley."

Abbreviations: Similar to the synonymy issue, various different abbreviations can be used to refer to the same term. For example, a résumé can use the abbreviation "NYC," but a query constructed to search through a database of résumés might use the search term of "New York."

Concatenation Words: Certain words can be concatenated in some instances, but remain separated in others. A résumé can contain the term "MS Office," whereas the query can be "MSOffice"

Partial Matches: There can also be partial matches for certain terms. For example, a document can contain the term "Stanford," whereas the query might be "Stanford University."

In addition, different users may have different requirements and preferences, many of which are not entered as part of the search. Users commonly do not know exactly what they are looking for when conducting a search. Users often do not have the time to be complete and to explicitly specify all the parameters of their search. Even if a user was complete and explicit about all of his parameters, the user might not find any matches because very few candidates would meet all of that user's criteria. Moreover, users do not always know exactly what they are looking for until they see a few results, at which time they can refine their search. Thus, in general, preferences may not be known until a number of outcomes are experienced.

Another problem faced in searching is that, given the exact same search, two different users may have an entirely different ranking of the search results. Thus, the search results may need to be tailored to the person for whom the search is being conducted.

Accounting for hierarchical relationships when searching can also pose a problem. For example, when a user searches for people who went to U.C. Berkeley, the user expects to see people went to Haas Business School, or Boalt Law School within U.C. Berkeley. However, when a user searches for people who went to Haas, the user does not likely expect to find people who went to Boalt, or other departments of U.C. Berkeley, in general, outside of Haas.

A further problem is accounting for degree of match regarding search results. A piece of information may only contain part of a particular search criterion, so it may be necessary to look at how much of the search criterion is actually contained within the information. Search systems often fail to consider hierarchical relationships in this analysis. For example, if a résumé describes someone who has J2EE experience, that person will implicitly have Java experience. However, someone who has Java experience will not necessarily have J2EE experience. Further, many search systems do not support inclusion of scoring of documents under a hierarchy. For example, if a user's search criterion is "Web Application Server," then the system should be able to differentiate between a document that has BEA WebLogic and IBM WebSphere, and document that only has BEA WebLogic. In addition, commonly search systems are not be able to support the ability to measure the relative importance of content in a document. For example, if a user is searching for candidates with résumés who have "5 years of Web Application Server" experience, then the system should be able to differentiate between a résumé that lists 3 years of WebLogic experience and 2 years of WebSphere experience, and a résumé that lists 5 years of WebLogic experience and 1 year of WebSphere experience based on date information extracted from the résumés that is correlated to specific contents of the résumés. Search systems also sometimes fail to have the ability to determine how recent the search requirement is within a document. Degree of match calculations such as these should be configurable and adaptable.

Another problem faced by search systems is that not all search criteria are equal, and not all documents are equal. For example, if a user is searching for a résumé that lists "5 years of Web Application Server" experience, then the system should be able to differentiate between a résumé that refers to 4 years of WebLogic experience and 2 years of WebSphere experience, and a résumé that refers to 6 years of WebLogic experience and 1 year of WebSphere experience depending upon collection of resumes in the pool, AND who is doing the search. If all of the résumés in the pool list WebLogic experience and only a few people have WebSphere experience, then the first résumé should be ranked higher than the second résumé. However, if all of the résumés in the pool list WebSphere experience and only a few list WebLogic experience then the second résumé should be ranked higher. If all of the résumés in the pool list WebLogic experience and only a few résumés have WebSphere experience, but the project for which these resumes are being searched is based on WebLogic and not WebSphere, then the second résumé should be ranked higher than the first. A search system should be able to figure out the relative importance of all the search criteria, and personalize the importance of criteria for different individuals.

Furthermore, search systems are generally unable to mimic the way that a human performs a search or finds documents. The system should place a higher priority on concepts (e.g. skills and experience) that are more recent (e.g. from within the last two years). The system should understand which set of concepts (e.g. skills) are more important than others for a particular user. Setting "required," "desired," and "undesired" parameters can be helpful, but in many cases it is much more subtle and complicated to figure out which sets of concepts go together and are more important. In addition, the solution should be intuitive and easy to use (since the more "knobs" people have, and are required to turn, the less likely people will turn them). The system should be able to handle hidden criteria. For example, the user may prefer to hire people from competitors, thus the system may need to infer the value or weight of these criteria. As another example, a user may not want to hire over-qualified people, and so the system may need to infer the value or weight of job titles. Furthermore, the system should consider how much experience a résumé reflects that a candidate has working in a certain industry and regarding specific sets of skills. Additionally, the system should consider how long the candidate has held particular job positions (e.g., too short or too long may not be considered desirable).

Previous Approaches

A number of different approaches have been used for attempting to solve some of the problems delineated above, including keyword searching or Boolean queries, concept tagging and conceptual searches, automatic classification/categorization, entity extraction using natural language parsing, and the like. These approaches and their limitations are described in more detail below.

Keyword Searching or Boolean Queries

Keyword searches and Boolean queries do not fully address some of the most basic full-text search problems, including synonymy, polysemy, spelling errors, abbreviations, concatenations, and partial matches. Synonymy can be addressed using Keyword expansion or elaborate Boolean queries, but very few people know how to perform these types of queries, and even when an elaborate query is constructed, it can still bring back the wrong results because of the other problems. Polysemy can be addressed by contextualizing the search to a specific field, but results can be missed because of spelling errors, abbreviations, concatenations, partial matches, etc.

Concept Tagging and Conceptual Searches

To address the enormous problems surrounding keyword searching and Boolean queries, a commonly accepted practice is to tag documents with "concepts," i.e. map documents into a "concept space," and then map the query into the same "concept space" to find search result. If this is done properly, this approach can address the some problems of synonymy, polysemy, spelling errors, abbreviations, concatenations, and partial matches, with one solution. The key question is how to accurately extract concepts from documents with the highest degree of precision and recall. To be successful when working with résumés (as well as other types of documents), the concept matching algorithms must handle text strings of text strings that range from a single word to multiple words with no grammatical structure to short phrases to sentences, paragraphs, and long documents; all with the same degree of accuracy.

Several approaches are being used today with varying degrees of success. These include categorization, entity extraction using natural language parsing, and manual tagging, as described below.

Automatic Classification/Categorization

There are several algorithms used currently to automatically categorize a document into a taxonomy of concepts. These algorithms typically use various forms of Bayesian Networks with apriori learning to classify documents. The limitations with this approach include the following:

A low degree of accuracy, usually in the 60% to 80% range

A significant amount of training is required in order for the classifiers to work properly. This training requires manual intervention, either with selecting a set of documents to train the classifier how to recognize a concept, or by "interpreting" the results of an automatic taxonomy generator Poor results, or it simply doesn't work, with short phrases or a string with a few words No ability to match an input query of a few words into concepts in the taxonomy—this defeats the purpose of concept-based searching in the first place While automatic classification/categorization software can provide some benefits, these limitations make it unlikely to provide sufficiently useful results.

Entity Extraction using Natural Language Parsing

Extracting concepts from text using natural language parsing (NLP) techniques is another method commonly used. This approach uses semantic or lexical analysis to parse text into parts of speech. These lexical elements are then matched against grammar rules to extract entities from the text. While this approach is useful for extracting new concepts out of full text documents, it suffers from a number of limitations that make it unusable as a complete solution when dealing with résumés (as well as other documents), including the following:

Content may not have any grammatical structure, and hence the parsing simply fails Very brittle—If the text does not follow the grammatical rules, then concepts are missed Does not work well when there is ambiguity in the text Language dependent Even when you have successfully extracted a string containing a concept, it still has to be matched up against other known concepts, and in doing so, the concept must be normalized to account for spelling errors, synonyms, word order, abbreviations, concatenations, etc.

While Entity Extraction using NLP is useful for finding (potentially) new concepts, it is generally not sufficient for finding existing, or known, concepts.

Traditional Collaborative Filtering Engines

Traditional collaborative filtering engines tend to work well under the following conditions:

When there are a closed number of items (e.g. there are a finite number of books, music tracks, products, etc.)

When the number of users (U) is much greater than the number of items (I):

$U \gg 1$

Most of the items have been seen and rated by at least one of the users

These conditions exist in large market places, such as for companies like AMAZON®. Unfortunately, with most search-related applications, especially when searching résumés, the above conditions do not hold. In fact, the conditions are the opposite, as follows:

The number of searchable items, e.g. résumés, is increasing and changing constantly—new résumés are arriving every day The number of users is much LESS than the number of items:

$U \ll 1$

More than likely, very few of the items/resumes have been seen and rated in the past Given these conditions, traditional collaborative filtering techniques do not work with résumés, or other enterprise document search applications. It is preferable to deliver personalized search results in order to deliver a successful search solution (e.g., for the recruiting process). The current approaches described above do not effectively address this problem.

SUMMARY OF THE INVENTION

The contextual personalized information retrieval system uses a set of integrated methodologies that can combine automatic concept extraction/matching from text, a powerful fuzzy search engine, and a collaborative user preference learning engine to provide highly accurate and personalized search results. In general, the system can normalize documents or information objects into a canonical meta representation including concepts and a graph of relationships between concepts (e.g., a knowledge base). In one embodiment, the system can include a data connector that receives a document for indexing, and a document tagger that maps fielded text strings in the document to concepts organized into a concept network in the knowledge base. The system can further include a document importer that inserts the fielded text strings into the knowledge base, and a knowledge base interface that updates in a plurality of indices the concept network to represent insertion of the fielded text strings of the document into the knowledge base.

The system can normalize a query input into the same knowledge base and use the knowledge base to find and rank matching items. The query input can be from input entered interactively directly from a user, from a document (either entered from the user at query time, or preprocessed and inserted into the knowledge base prior to executing the query), or from a combination of both. Given a query that has been partially or completely normalized into the knowledge base as a set of search criteria, a search can be executed by first selecting a set of target concepts that match the selection aspects of the criteria, and then scoring each of the target concepts based on the scoring aspects of the criteria. The search results can then be presented to the user in a ranked order that may be sorted by the score (although users can sort the criteria by other attributes).

After a user has been presented with search results, the user can provide feedback on the quality of the search results by rating how well a search result meets his or her criteria. Thus, the system facilitates personalization of search results based on feedback from users. The system can receive feedback from the user regarding quality of search results presented to the user in a first search, and the user can rate how well the search results match a search query applied by the user. For example, once a user has been presented with search results, the user could also be presented with a five-star rating system where one star means not a fit, and five stars indicate an excellent match. The user could also be presented with an "undesired" or "not a fit" icon, or other types of rating systems (e.g., a slider bar, a point system, etc.). The system can construct one or more profiles for the user based on the feedback received, and each of the search results can be assigned feedback values used to construct a model including profile weights computed regarding the feedback. The user interface rating system can be mapped into a normalized feedback value. This user feedback can thus be fed back into the system to modify the weights or bias the weights used to score search criteria applied in producing the search results presented to the user. The user feedback can also be used to generate implicit search criteria for the user based on the profile(s). Both the implicit criteria and modified weights can modify how search results are scored, and hence ranked, thereby personalizing to the user future searches conducted by that user. The learning engine that supports the search personalization can allow the same input search criteria to produce different search results for two different users who have implicit criteria that they did not originally specify.

To address complex search requirements, the contextual personalized information retrieval system supports the ability to select target concepts using a variety of different methods that leverage the knowledge base, and then provides several methods for computing a score of how well the selected target concepts meet the search criteria. The selection methods can include both explicit and implicit selection of target concepts using transitivity across a schematic graph of inter- and intra-category concept relationships, selection of target concepts using transitive closure within a graph of intra-category concept relationships, selecting concepts that are similar to search criteria concepts using a similarity or distance metric (e.g. selecting locations that are within 25 miles of Mountain View, Calif., or selecting titles that are similar to "software engineer," e.g. "Video Game Developer"), and selection of target concepts using logical operations on sets of selected target concepts.

The scoring methods used in the system can include, but are not limited to, 1) computing a similarity measure based on one or more degree-of-match functions for one or more attributes along an "AttributePath" (described in more detail below); 2) computing a similarity measure based on a basis vector with dimensions defined by a set of subsumed concepts and a target vector with components that map to concepts associated with a target concept where each component in the vector can have zero or more degree-of-match functions, and the weight of each component can be biased by a user profile; and 3) any combination of the above two methods. The weight of each search criteria can be computed by a variety of methods, including, but not limited to, 1) log frequency—the log of the frequency of target concepts matching the selection criteria divided by the log of the total number of target concepts, 2) log inverse frequency—the log of the total number of target concepts divided by the number of target concepts matching the selection criteria divided by the log of the total number of target concepts, 3) linear frequency—the ratio of the number of target concepts matching the selection criteria divided by the total number of target concepts, and 4) fuzzy frequency—the log of the total number of target concepts divided by the sum of the partial scores of all the target concepts for the given search criteria (where the score is a number between 0.0 and 1.0) divided by the log of the total number of target concepts. Similarly, the weight of each component of the similarity vector used for computing degree of match can be based on any of the weight models used to compute the search criteria weight.

In one embodiment, there is a system for representing knowledge and performing contextual personalized information retrieval. The system includes a content extraction information bus for mapping documents into a knowledge base that is a semantic network of relationships among concepts. The system also includes a concept cube for indexing a plurality of the concepts in the knowledge base into one or more indexes, and a query parser for parsing an input query received by a user into a plurality of sub-components. The system further includes a search engine for mapping at least one of the sub-components of the input query to one or more of the concepts in the knowledge base that are identified to be matching concepts. The search engine can also map the matching concepts to a set of criteria and criteria values to construct a query of the documents mapped into the knowledge base. In addition, the search engine can execute the query constructed using the indexes to produce a partial set of search results and can select and score the search results in the partial set to produce a final set of search results that are ranked. The results can be ranked based on the score and/or based on attributes of the concepts represented by the search results In another embodiment, there is a system for mapping documents into a knowledge base. The system includes a data connector for receiving a plurality of unstructured documents for mapping into the knowledge base that is a semantic network of relationships among concepts. The system further includes a document parser for the input documents into semantically structured documents having semantic structure that describes fields of text data. In addition, a document tagger can map the semantic structure of the documents to concepts in the knowledge base and assigning concept tags to the semantic structure of the documents, the concepts and the concept tags representing semantic meaning of the documents. A document importer can record the mapped concepts and the concept tags of the semantically structured document into the knowledge base. Further, a concept cube can update a plurality of inverted indexes to represent the semantic structure and concept tags of the document inserted into the knowledge base.

In an additional embodiment, there is a system for representing knowledge and performing contextual personalized information retrieval. The system includes a content extraction information bus for mapping data stored a structured data source into a knowledge base that models a semantic network of relationships among concepts. The structured data source can be a relational database, a collection of RDF documents, a collection of XML documents, a collection of OWL documents, a collection of JSON documents, and so forth. The system also includes a concept cube for indexing a plurality of the concepts in the knowledge base into one or more indexes, and a query parser for parsing an input query received by a user into a plurality of sub-components. The system further includes a search engine for mapping at least one of the sub-components of the input query to one or more of the concepts in the knowledge base that are identified to be matching concepts. The search engine can also map the matching concepts to a set of criteria and criteria values to construct a query of the documents mapped into the knowledge base. In addition, the search engine can execute the query constructed using the indexes to produce a partial set of search results and can select and score the search results in the partial set to produce a final set of search results that are ranked. The results can be ranked based on the score and/or based on attributes of the concepts represented by the search results In a further embodiment, there is a method for constructing a search query to execute a search of a database. The method can include parsing an input query received from a user conducting the search of the database into a plurality of sub-components, and matching each of the sub-components to concepts in a semantic concept network of a knowledge base. In addition, the method can include selecting from the knowledge base a set of matching concepts that match at least part of the sub-components, and mapping the matching concepts to a structured set of criteria and criteria values that specify a set of constraints on and scoring parameters for the matching concepts. In this embodiment, the method can optionally include a further step of executing the search of the database to retrieve a set of search results constrained by the criteria according to the relationship between the search results and the matched concepts, wherein the search results are scored and ranked based on the criteria values.

There is still further an embodiment in which there is a method for using transitive or attribute indexes to search a knowledge base. The method includes accessing a knowledge base comprising a plurality of categories, each category including a plurality of attributes, each of the categories having concepts that are instances of that category and each of the attributes having values that are instances of that attribute. The knowledge base is a semantic network of relationships among the concepts. The method further includes receiving a query represented as criteria and criteria values that specify constraints on the categories and the attributes. The method also can include executing a search of the concepts and the values of the knowledge base using one or more inverted transitive indexes that index concepts and values referred to by concepts in a graph of concept-to-concept and concept-to-value relationships, given the referred value. Since there can be a set of concepts that refer to a set of one or more values or concepts, given a referred value or concept, the inverted transitive index can return a set of concepts that referenced to that value or concept. In addition, the method can include retrieving a result subset of the concepts and the values that satisfies the criteria and criteria values.

In another embodiment, there is a method for scoring target concepts selected for an input query. The method includes mapping into a knowledge base an input query provided by a user conducting a search of the knowledge base, the input query normalized into a structured set of criteria with associated criteria values e, where the knowledge base is a semantic network of relationships among concepts and the knowledge base providing an index of a plurality of documents. The input query is normalized into a structured set of criteria with associated criteria values. The method also includes selecting a set of target concepts and associated target values that match selection aspects of the criteria and the criteria values. The method further includes computing a partial score on each of the selected target values based on scoring aspects of the criteria and criteria values, each partial score measuring a match between the selected target values used in computing that partial score and the criteria with the associated criteria values on which that partial score is based. In addition, the method includes computing a weight for each of the criteria values, and determining a total score for each selected target concept by integrating the partial scores on the target values associated with the target concept using the weights for the criteria values associated with those target values. Further, there is a step of applying the total scores for the target concepts to generate search results for the user in a ranked order, the search results including one or more of the documents indexed.

In still another embodiment, there is a method for learning user preferences in a search of knowledge base to construct one or more profiles for producing personalized search results. The method includes receiving feedback from the user regarding quality of search results presented to the user in a search of a knowledge base that is a semantic network of relationships among concepts. The feedback can represent how well the search results match an input query provided by the user. The method further includes constructing the one or more profiles for the user based on the feedback received, where each of the search results that receive feedback values are used to construct a model that consists of profile weights computed from the feedback values. The method also includes modifying internal weights used for scoring search criteria applied in producing the search results presented to the user. These modifications can be made based on the profile weights in the constructed model. There can also be steps of generating implicit search criteria for the user based on the one or more profiles, and applying the implicit search criteria and modified weights during a subsequent search of the knowledge base conducted by the user producing a subsequent set of search results that are personalized to the user.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
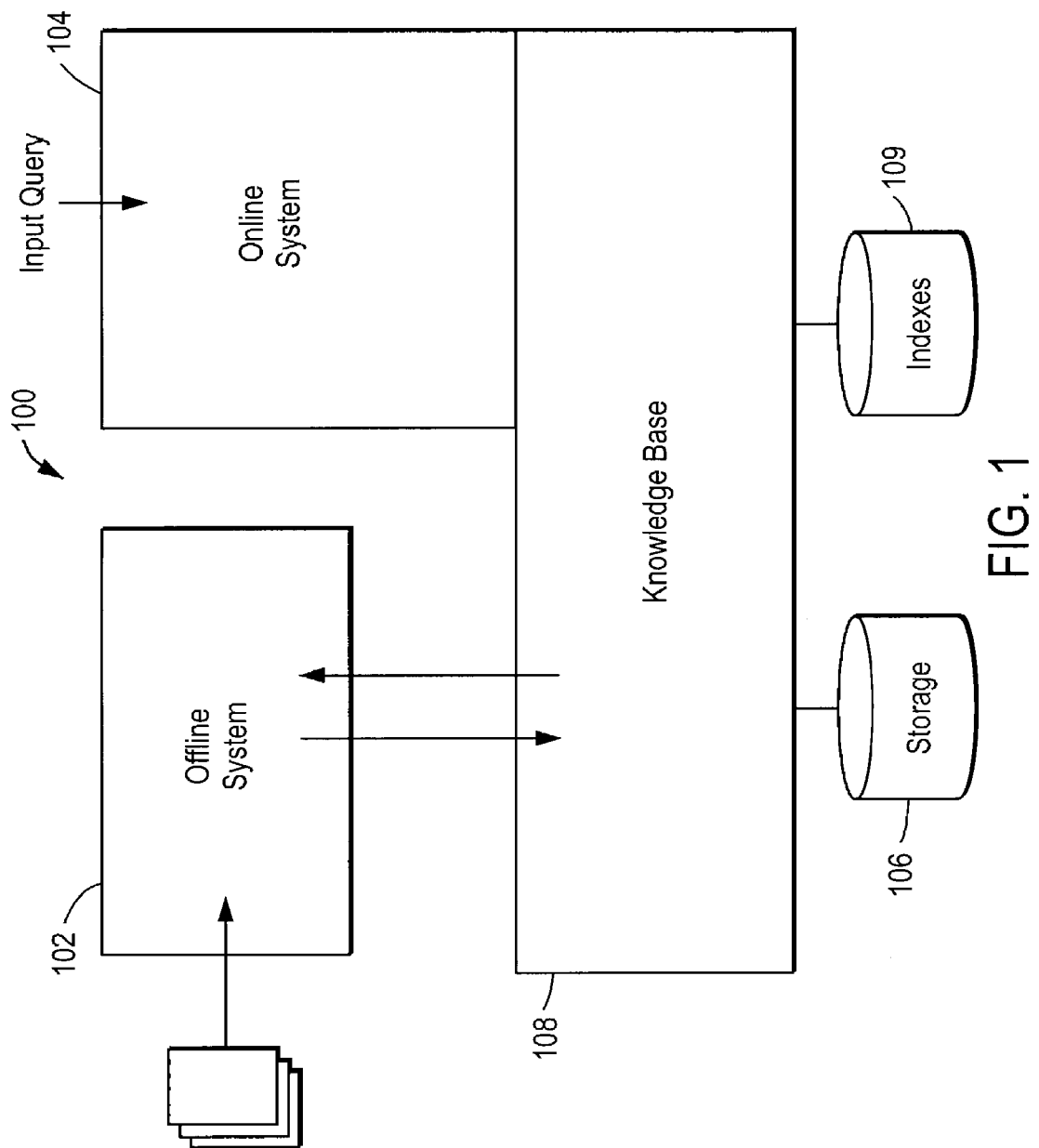
FIG. 1 is a high-level block diagram illustrating the components of the contextual personalized information retrieval system.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

I. Introduction

The contextual personalized information retrieval system can address the various problems that exist with previous systems. For example, the system can effectively deal with basic search problems, including handling synonyms, polysemous words, spelling errors in both the documents as well as the query, abbreviations, word ordering, partial matches, and the like (e.g., through an engine that can employ a statistical based pattern matching engine to match strings of text to concepts). The system can emulate the way that a human reviews a document. For example, the system can use fuzzy search algorithms to compute ranked matches (which eliminate the need to enter complex Boolean queries), can consider all available information, and can weigh the information together to determine how "much" of the search criteria a document has (e.g. how much experience a candidate has relative to the search criteria). As another example, the system can use subject matter knowledge (e.g., including hierarchical relationships) to evaluate how well a document matches given criteria, including using a process for computing subsuming "degree of match" calculations. As still a further example, the system can use "degree of match" calculations to determine how closely certain sections of a document contain matches to search criteria. The "degree of match" calculations can be computed on a concept-by-concept basis.

The contextual personalized information retrieval system can improve search results in a number of ways. The system can 1) learn individual user preferences with a minimal amount of user feedback, and 2) leverage collaborative input to build common, or shared, preference models that can be inherited to build a model of individual user preferences. This system leverages meta data in the collaborative learning process. When a user provides feedback for a document (e.g., a résumé), the feedback is propagated to all of the concepts associated with that document (e.g., for a résumé, concepts might include university names, companies, skills, etc.). Given that there may be from 50 to 400 or more different concepts for any given document, it is possible to quickly include concepts of a significant number of documents with a small number of samples. The system can allow for quick differentiation of "signal" (significant information) from "noise" (insignificant information) in user feedback to hone in on the true value or weight of a concept. The system can also differentiate feedback given in different contexts (e.g. the same hiring manager may give a candidate five stars for one job position, and one star for another job position because the positions have different characteristics). Further, the system can apply the concept weights captured in the user model directly to the search on a concept-by-concept basis.

In differentiating "signal" from "noise," the contextual personalized information retrieval system can use a combination of 1) the variance of feedback to determine how much weight should be given to a user preference, and 2) collaborative user profiling that leverages feedback from other users to augment personal feedback. Hence, the system enables rapid convergence on the true value or weight of a concept. In some embodiments, to address this second issue, the system's user profile model is split into models for the users without a specific context, and models for the search contexts (e.g. the context of a job search). The two profiles (e.g., the user profile and the search context profile) can be combined together when a search is executed to produce a model that is specific to both the user and the search context. In some embodiments, the system indexes the user profile data to apply the learned concept weights directly to the search algorithm. These techniques and the combination of these techniques can significantly improve the search results.

The contextual personalized information retrieval system can address the other problems that exist with previous systems by automatically determining hidden search criteria that were not specified by a user's query. In some embodiments, the learning algorithm automatically determines search criteria based on collaborative user feedback. Hidden search criteria (e.g., criteria not explicitly specified by the user) can significantly reduce the amount of time it takes to conduct a search because the search does not need to be constantly revised to account for issues that were not fully specified. In some embodiments, the system automatically learns the value of certain criteria relative to other criteria. The system can collaboratively build user preference profiles and apply profile weights within the search algorithms. The algorithms can use very simple input and very few samples from users, and thus can dramatically reduce the amount of data that users need to input to get good search results. Furthermore, the user interface for the system can be designed to require minimal user data input and feedback to deliver useful search results.

In some embodiments, the contextual personalized information retrieval system can employ various different techniques in the information retrieval process. The system can parse of documents into fields containing text strings and extract concepts from the fielded text strings, where the concepts are nodes in a semantic network. The system can further extend a semantic network with references to extracted concepts, and can index the semantic network with a combination of hierarchical, non-hierarchical, and linked inverted indexes constructed in a concept cube. Methods for conducting fuzzy searches of the indexed semantic network include the following: 1) searching the network from criteria specified from outside the semantic network whose results are ranked and scored, 2) finding ranked and scored matches to nodes defined within a semantic network, 3) using search profiles to personalize search results, 4) integrating full-text keyword searches into searches of a semantic network, and 5) scoring search results based on search profiles. In some embodiments, the system is able to construct a search and user profiles from collaborative and non-collaborative user feedback based on search results. The system can apply search and user profiles to the fuzzy search methods defined herein.

While many embodiments described herein refer to job searches or searches through résumé documents or job requisitions as an example, the invention can be universally applied to information retrieval in general, whether the information is included in an unstructured or semi-structured text documents, stored in structured data repositories, such as relational databases, and the like. Thus, the examples described here are to be considered illustrative but not limiting of the scope of the invention or implying necessary or essential features or characteristics.

As used herein, the term "concept" includes any type of information or representation of an idea, topic, category, classification, group, term, unit of meaning and so forth, expressed in any symbolic, graphical, textual, or other forms. For example, concepts typically included in a résumé include universities, companies, terms identifying time (e.g., years), experiences, persons, locations, contact information, hobbies, publications, miscellaneous information, grade point averages, honors, associations, clubs, teams, any type of entity, etc, or a collection of one or more of these. A concept can also be represented by search terms that might be used in a database search, web search, literature search, a search through statutes or case law, a patent search, and the like. The term "document" can include any type of document, including résumés, job requisitions or descriptions, books, articles, patents, business plans, corporate documents, webpages, product information documents, e-mails, files, and any other type of item upon which a textual search of its contents can be conducted. As used herein, the term "user" includes a person, a piece of software acting under the control of a person, such as a user agent web client, or an automated system, such as one performing a query or a search, and so forth. As referred to herein, the term "Résumé" is interchangeable with the term "Candidate," and thus both can be used in the examples involving document searches.

As is known in the art, a computer system is adapted to execute computer program modules, engines, components, etc. for providing functionality described herein. In this description, the terms "module," or "engine" or a defined component of the contextual personalized information retrieval system include computer program logic for providing the specified functionality. These can be implemented in hardware, firmware, and/or software (as either object code, source code, executable script, or some other format). Where any of the modules/engines/components described herein are implemented as software, they can be implemented as a standalone program, but can also be implemented in other ways, for example as part of a larger program, as a plurality of separate programs, or as one or more statically or dynamically linked libraries. It will be understood that the modules/engines/components described herein represent one embodiment. Certain embodiments may include others. In addition, the embodiments may lack modules/engines/components described herein and/or distribute the described functionality among the modules/engines/components in a different manner. Additionally, the functionalities attributed to more than one module/engine/component can be incorporated into a single module/engine/component.

In some embodiments, the methods include two primary processes: 1) an off-line information extraction and tagging process that inserts documents and their corresponding semantic structure and concept tags into an indexed information repository (the knowledge base), and 2) an on-line process for searching for information based on a set of search criteria and a user's profile, returning a ranked set of documents or information objects along with a set of refinements to the original search. Referring now to FIG. 1, there is shown a high level diagram of the overall contextual personalized information retrieval system 100, according to an embodiment. The system 100 includes an off-line system 102 and an on-line system 104. The off-line system 102 receives documents in various forms and performs an extraction and tagging process that inserts documents and their corresponding semantic structure and concept tags into an indexed information repository, referred to as the Knowledge Base 108. The system 102 can take as input information in a variety of forms, such as MS Word, PDF, or plain text; e-mail messages, XML files, or Relational Database records. The documents converted to a plain/clear text documents (if unstructured), parsed to extract semantic structure from the unstructured text content and convert an unformatted text document into a semantically structured document, and tagged to connect the semantic structure of the document to a semantic network of relationships represented by concepts in one or more Knowledge Bases 108, connecting the document into a semantic network of relationships represented by concepts in one or more Knowledge Bases. The system 102 can also use a set of concept matching rules to normalize, map, and split input strings into substrings and search the substrings for Concepts, and the system 102 can match input strings to Concepts in the Knowledge Base 108. Collections of inverted indexes 109 can be maintained between Concepts, and storage 106 can be used to store Concept data, text documents, and other information for the system 100.

The search process of the on-line system 104 can search through documents that have been inserted and indexed into the Knowledge Base 108 (via the off-line process) by searching through the graph of concepts and concept relationships defined by the Knowledge Bases 108 to find concepts that can represent documents or other information of interest. For example, the system 104 can search for résumés or job requisitions based on a user entered input query, which can include an input string of text, a document (e.g., a job requisition or résumé), etc. As stated above, collections of subsuming hierarchical and non-hierarchical inverted indexes 109 can be maintained between Concepts in the Knowledge Base 108, and these indexes can be utilized to execute fast parametric searches of the semantic networks stored in a Knowledge Base 108. The system 102 can also construct searches based on the user's input query by constructing a set of Search Criteria that can be organized into groups, and by using set of matching Concepts and a set of fuzzy search algorithms to determine a rank ordering of the matching Concepts based on a score for each matching Concept. Further, a reference semantic network stored in a Knowledge Base 108 can be used to construct a query including a set of Match Criteria that are used to select matching Concepts and rank them using fuzzy matching algorithms that evaluate a degree of match between the reference semantic network and the matching Concepts. The system 104 can also use search result rating feedback from users to compute a profile that includes a set of weights for concepts or values, and the context in which they are applied to modulate the weights of concepts as defined by the document collection. The profiles can be used to modify the weights used to compute scores for Search Criteria, and construct implicit scoring criteria to evaluate target concepts, modifying the score of the Target Concept, and hence altering the ranking of Target Concepts to meet implicit user requirements.

In addition, while system 102 is referred to as an "off-line system" and system 104 is referred to as an "on-line system," in some embodiments, one or more of the off-line steps can be achieved with a fully or partially on-line implementation and one or more of the on-line steps can be achieved with a fully or partially off-line implementation. For example, documents can be processed in an on-line analytical processing (OLAP) fashion by system 102. Similarly, one or more steps of the on-line system 104 could be handled in batch or during a non-interactive off-line processing step.

Figure 2:
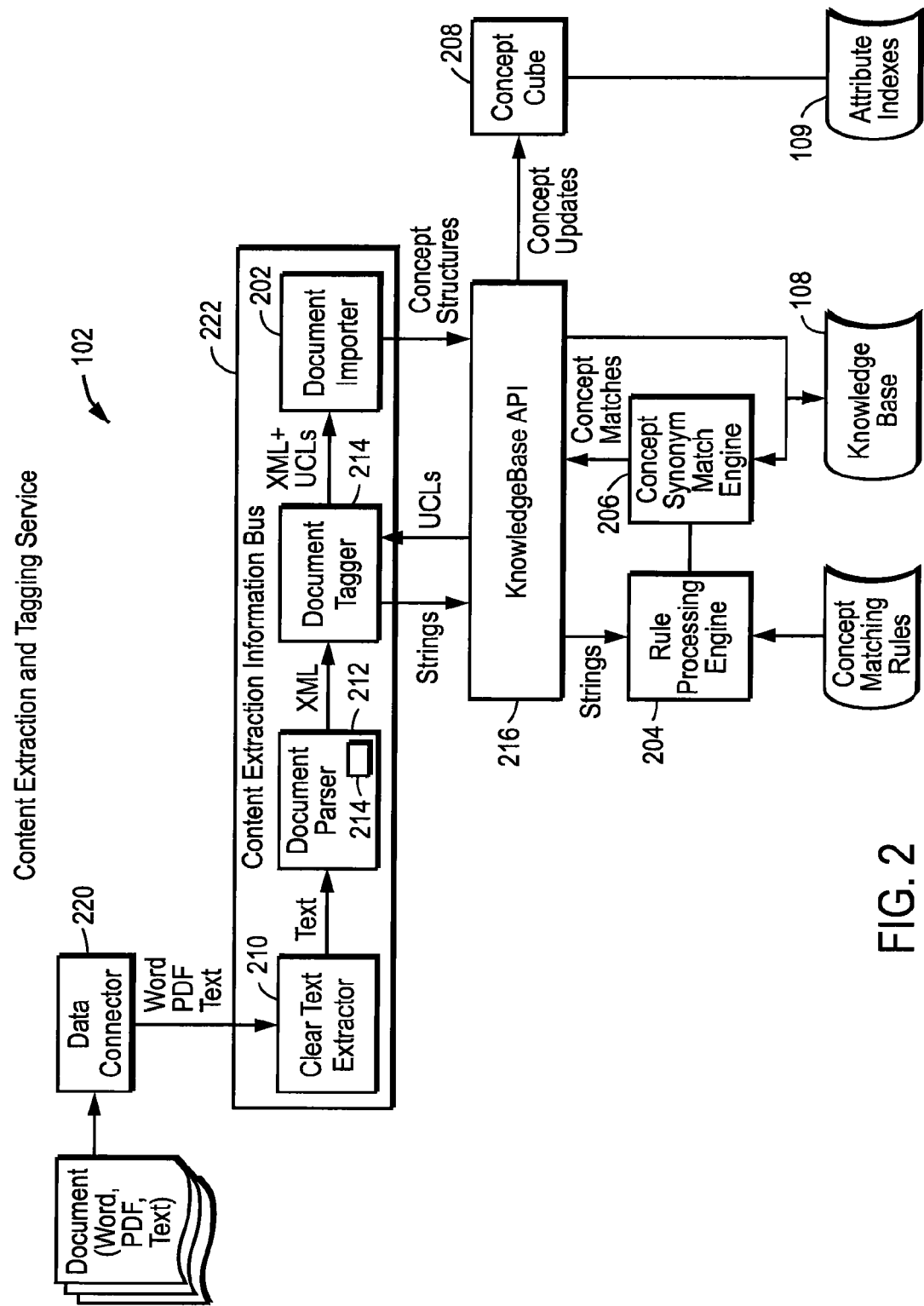
FIG. 2 is a high-level block diagram illustrating the off-line system associated with content extraction and tagging, according to one embodiment of the present invention.
Figure 3:
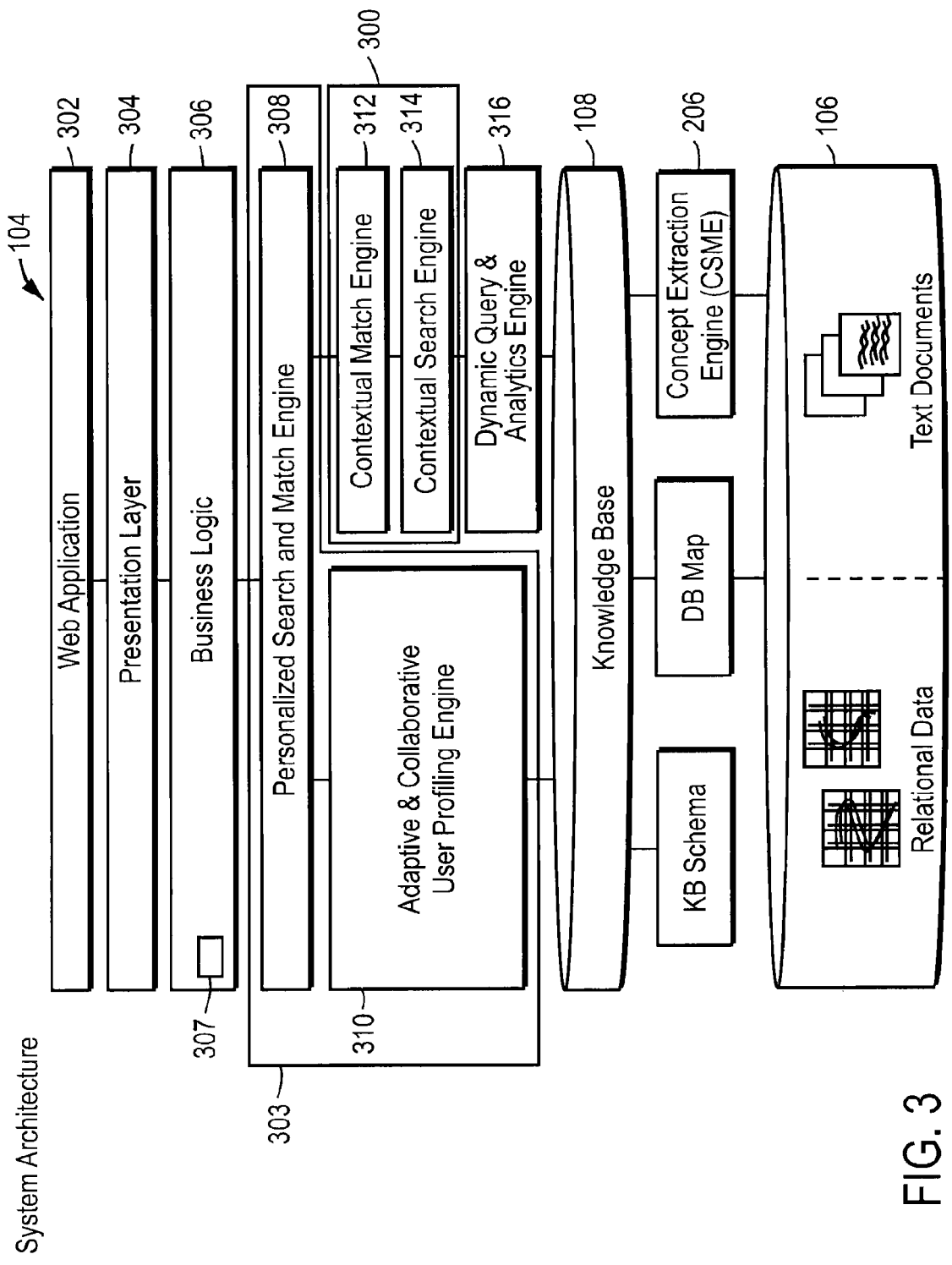
FIG. 3 is a high-level block diagram illustrating the on-line system architecture for the contextual personalized information retrieval system, according to one embodiment of the present invention.

These functions along with the components of the on-line 104 and off-line system 102 are described in more detail below. Further, a more detailed diagram of an embodiment of the system architecture that supports the off-line information extraction and tagging of the off-line system 102 is illustrated in FIG. 2. In addition, a more detailed diagram of an embodiment of the system architecture that supports the on-line searching and matching information objects and concepts of the on-line system 104 is illustrated in FIG. 3, according to some embodiments. To better understand the off-line and on-line processes, the Knowledge Base 108 is first described in detail below before the more detailed description of the off-line system 102 and then the on-line system 104.

II. Knowledge Base

A. General Overview

Figure 4:
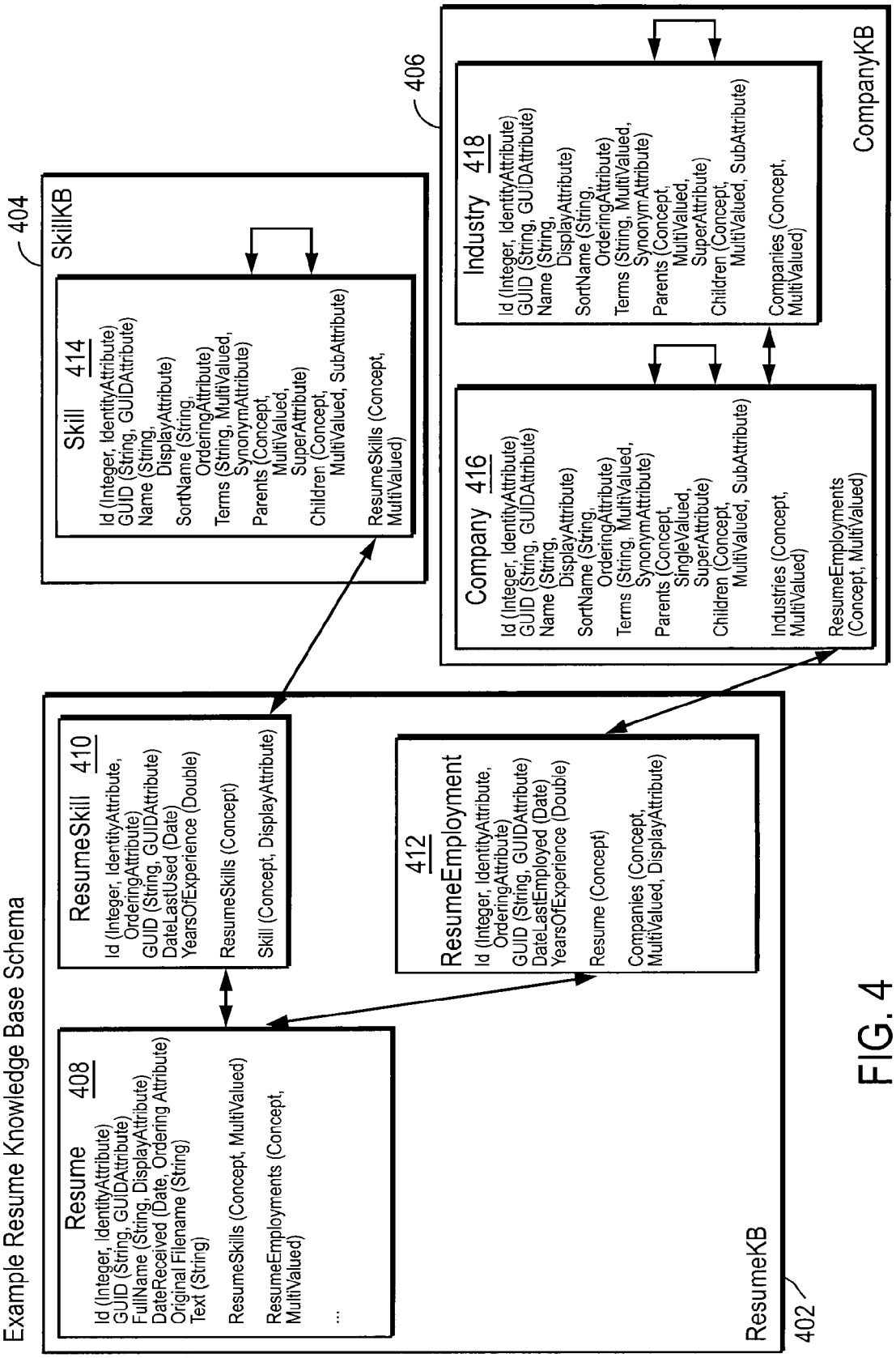
FIG. 4 is a diagram illustrating an example résumé knowledge base schema, according to one embodiment of the present invention.
Figure 5:
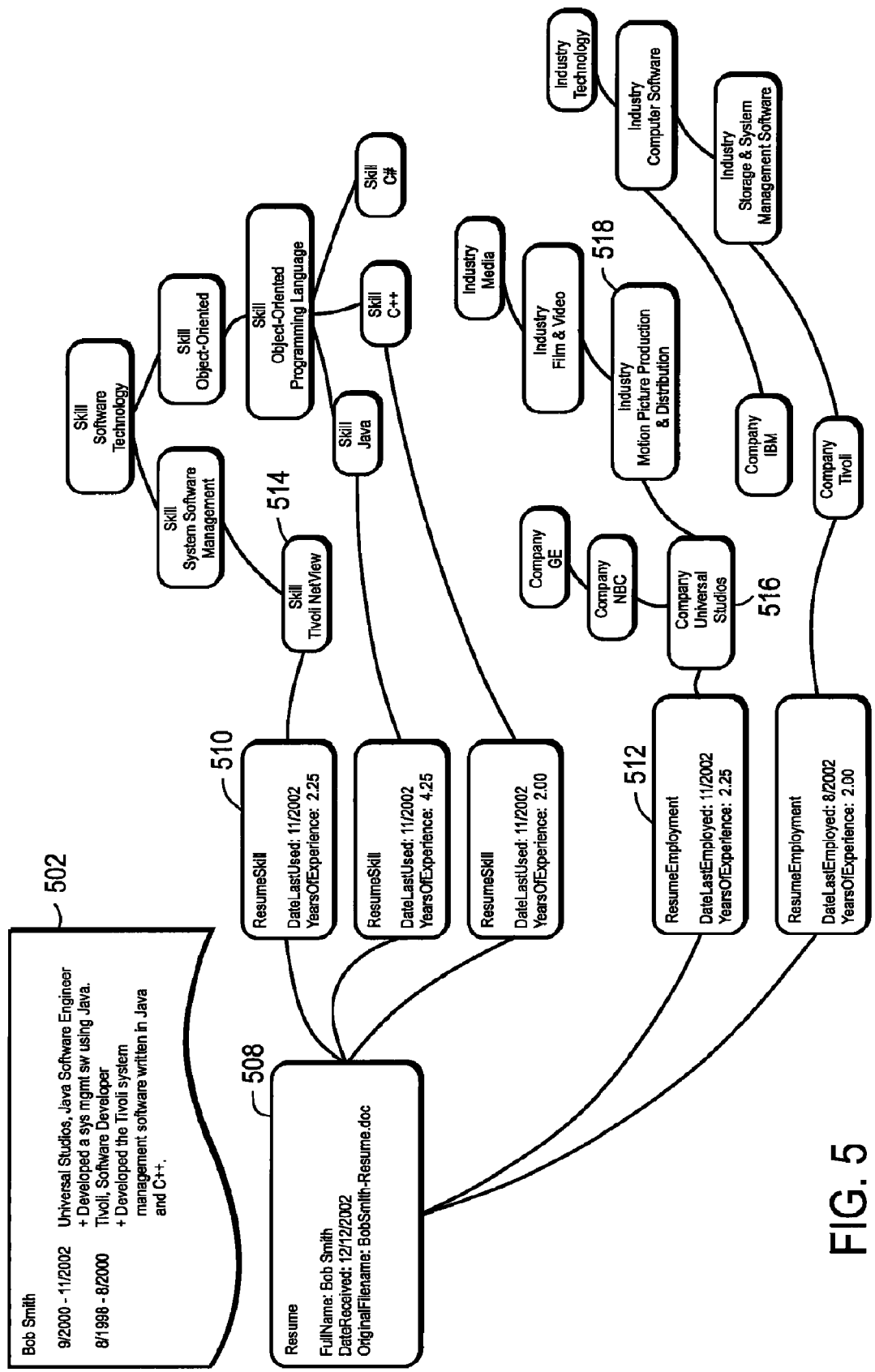
FIG. 5 is a diagram illustrating an example knowledge base instance, according to one embodiment of the present invention.

The Knowledge Base (KB) 108 is a foundation upon which other components and processes of the system are based. The KB 108 includes two primary parts: 1) a schema, and 2) an instantiation of the schema. An example of a Résumé Knowledge Base Schema is illustrated in FIG. 4. FIG. 5 illustrates an instantiation of the Knowledge Base Schema of FIG. 4. These Figures are briefly introduced here, but will be described in more detail below. Multiple KB Schemas can be defined and KB Schemas can reference other schemas. In the example illustrated in FIG. 4, there are three KB Schema definitions, including a "résumé" Schema called the RésuméKB 402, a "skill" Schema called the SkillKB 404, and a "company" Schema called the CompanyKB 406, which will each be addressed in more detail below.

A KB Schema includes a set of Categories defined by Category Definitions. A Category Definition includes a set of Category Properties (which describe characteristics of the Categories) and a set of Attributes defined by Attribute Definitions. In addition, an Attribute Definition can include a set of Attribute Properties (which describe characteristics of the Attributes). For example, in FIG. 4, within the RésuméKB 402, a particular Category called a "Résumé" Category 408 is shown in the leftmost box, which can include several Attributes that are listed within the box, such as "FullName," "Years of Experience," "DateReceived," etc. The RésuméKB 402 also includes a "RésuméSkill" Category 410 and a "RésuméEmployment" Category 412. As another example in FIG. 4, a "Skill" Category 414 is also shown within the SkillKB 404, which can include Attributes, such as "Name," "Terms," "Parents," and "Children." Furthermore, a "Company" Category 416 and an "Industry" Category 418 are shown within the CompanyKB 406. As will be described more below, an instance of a Category (e.g., Résumé 408) is called a Concept (e.g., Résumé of Bob Smith), and an instance of an Attribute (e.g., FullName) is called a Value (e.g., Bob J. Smith)

The Attribute Properties, which describe characteristics of the Attributes, include, but are not limited to, the following type of properties: label, id, constraint, data-type, is-display, is-ordering, is-super, is-sub, is-synonym, is-modifiable, is-visible, and is-indexable. Continuing with the above example and referring to FIG. 4, the "FullName" Attribute in the Résumé Category 408 could be described with the data-type equal to STRING, is-display equal to true (meaning that it is used as the DisplayAttribute and as such the value of this Attribute is presented to the user when displaying the corresponding Concept), is-indexable is set to true if the system wants the user to quickly search on the name, etc. The label and id properties can be separately used to reference an Attribute within a Knowledge Base Schema.

In some embodiments, an Attribute contains more than one value. A constraint property is at Attribute Property that describes the number of values that an Attribute can contain, including defining unique values (not shared by other Attributes) and defining whether or not an Attribute can contain a single value (one), or multiple values (more than one). For example, a Résumé may be allowed to contain only one name, so it would have a "single" constraint. On the other hand, a Résumé can have multiple skills, and so a Résumé's RésuméSkill Attribute would have a "multiple" constraint. In some embodiments, a unique constraint is used only by an IdentityAttribute. The data-type property [can define the type of data that is bound to the Attribute, creating a data-type-specific Attribute such as IntegerAttribute (e.g., "123" for the Identity IntegerAttribute), DoubleAttribute (e.g., "7.5" for YearsOfExperience Double Attribute), StringAttribute, DateAttribute (e.g., "2005-02-11" for DateReceived DateAttribute), GeoPointAttribute (e.g., "123.5E 73.2N for the longitude and latitude of a Location), and ConceptAttribute.

A ConceptAttribute can have special properties. It can define a relationship between two Categories or within the same Category. For example, in the Résumé Category 408, the RésuméSkills Attribute, which is a Concept Attribute, would describe the relationship between a Résumé and a Skill (e.g. Bob Smith's résumé may have a relationship to a Java Skill Concept). This example illustrates a relationship between two different Categories. An example of a relationship within the same Category is the parent-child relationship in a Skill Category 414. For example, the Parent ConceptAttribute in the Skill Category 414 might describe the relationship between the Java Skill Concept and the Object Oriented Programming Language Skill Concept. A ConceptAttribute can also define a converse Category and a converse ConceptAttribute. For example, the Converse Category of a RésuméSkill ConceptAttribute in the Résumé Category 408 might be the RésuméSkill Category 410, and the converse ConceptAttribute in the RésuméSkill Category 410 might be the RésuméSkills ConceptAttribute of the Résumé Category 408. The forward and converse ConceptAttributes can form a bi-directional link within a single Category or between two Categories. For example, in the case of Skill Category's 414 Parent ConceptAttribute, there would be a converse ConceptAttribute called Child whose converse Category is also Skill (i.e. it is an intra-Category ConceptAttribute), and as such, the Java Concept would be a Child of the Object Oriented Programming Language Concept, and the Object Oriented Programming Language Concept would be a Parent Concept of the Java Concept. In some embodiments, ConceptAttributes are used to form a graph of Category relationships.

Each Category has a set of known Attributes, including the following:

An IdentityAttribute (required)—Defines a unique identifier for the Concept within a local context A GUIDAttribute (optional)—Defines a global unique identifier for the Concept that extends across all contexts A DisplayAttribute (required)—Defines a display value that is used to present the Concept in a graphical user interface A default OrderingAttribute (required)—Defines a default value used to sort a set of Concepts A SynonymAttribute (optional)—Defines a set of values that are synonymous with the Concept. This attribute may store String values that define patterns that are used by the Concept Synonym Matching Engine to find Concepts input Strings A ParentAttribute (optional)—Defines the parent(s) Concept(s). Instances of this Attribute are used to form a hierarchy or directed acyclic graph of relationships within a Category A ChildAttribute (optional)—Defines the children Concepts. Instances of this Attribute are used to form a hierarchy or directed acyclic graph of relationships within a Category. This ConceptAttribute is the converse ConceptAttribute of the ParentAttribute.

As stated above, an instance of a Category is called a Concept. For example, for the Skill Category 414, an instance could be the Java Concept, or for the Résumé Category 408, an instance would be a Concept representing Bob Smith's résumé. As also stated above, an instance of an Attribute is abstractly called a Value. Each Category can include a set of Attributes. An Attribute of a Résumé Category 408 could be the Name Attribute, and an instance of the String "Bob Smith" is an example of a StringValue that is associated with the Résumé Category's Name Attribute. The Values of the Attributes are sub-classed for each data type corresponding to the data type of the Attribute. For example, an instance of a DoubleAttribute is a DoubleValue. An instance of a ConceptAttribute is a Concept.

Every Concept in the system is preferably referenceable by one or more of its Values. In other words, the Concept can be referenced by another Concept, or the Concept can be found using its reference. For example, a Concept's Identity Value is what can be used to reference a Concept, and the IdentityAttribute defines the field that is used as the Id. The Identity Value is typically an integer value, though a String value could also be used to identify a Concept. The identity of a Concept is unique. An Attribute describes some value or set of values that is associated with a Concept. For example, the Name Attribute describes the name on a Résumé, and the YearsOfExperience Attribute describes the number of years of experience a candidate has as describe in a Résumé. Further, the relationships among Concepts in a knowledge base can be a flat list, a single inheritance hierarchical relationship, a multiple inheritance hierarchical relationship (e.g., a directed acyclic graph), and so forth. Also, the relationship among the concepts in the knowledge base can be a one-to-one relationship, a one-to-many relationship, and a many-to-many relationship.

B. Persistent Storage of a Knowledge Base—the DB Map

In some embodiments, the Knowledge Base 108, instantiated as Concepts and Values, resides only in computer memory. In other embodiments, the Knowledge Base 108 is persisted to long term storage on a computer disk. The persistence mechanism can include, but is not limited to, a relational database, a structured file text file (such as an XML or RDF document), a binary serialization stored in a file, an object oriented database, or any other form of persistence. There can be several methods of persisting a Knowledge Base 108. In some embodiments, a database map is defined between Categories and Attributes in a Knowledge Base 108 and tables and columns in a relational database. Given these definitions, a database mapping mechanism can automatically construct SQL statements to insert, update, delete and query data to/from the database and in memory representation of the Knowledge Base 108. This database mapping mechanism can provide for a virtual representation of a Knowledge Base 108. In addition, multiple database maps can be defined allowing for different "views" of a relational database.

In some embodiments, there is an automated method for persisting all or portions of a Knowledge Base to an XML file. This mechanism can support an arbitrary mapping between XML tags and attributes, and Knowledge Base Categories and Attributes. The default mapping between Knowledge Base Categories and Attributes, and XML tags and attributes can include using the labels for the Categories and Attributes defined in the Knowledge Base Schema.

C. Example Knowledge Base Schema

Referring again to the example of a Résumé Knowledge Base Schema of FIG. 4, there are three KB Schema definitions, as noted above. The three KB Schema definitions include two "base" KB schemas the "skill" schema referred to as the SkillKB 404 and the "company" schema referred to as the CompanyKB 406. A "base" schema is a schema that is "semantic" in nature, i.e. it pertains to the meaning of terms. The third schema is a "document" schema referred to as the RésuméKB 402. This document schema is a "structural" schema because the Categories in the schema describe relationships between Concepts as opposed to the inherent meaning of Concepts. Thus, "base" KB schemas describe "semantic" Categories and "document" KB schemas describe Categories that define relationships between "semantic" or "entity" Categories. An example of a "semantic" Category is a Skill Category, and an example of an "entity" Category is a Person Category. While distinctions are made here between these various terms for the purpose of description and understanding relationships between different types of Knowledge Bases and Categories, the system does not require that any special distinctions be made within the system to these classes of Knowledge Bases and Categories. For example, one could just as easily search for a Skill as they could search for a Résumé. As a result, the system does not have to include a distinction between a Concept that represents a document and a Concept that represents the semantic meaning of a Skill.

As described above, the SkillKB 404 can describe a Skill Category 414 that contains a set of Attributes, including an IdentityAttribute ("Id"), a DisplayAttribute ("Name"), an OrderingAttribute ("SortName"), a SynonymAttribute ("Terms"), a ParentAttribute ("Parents"), and a ChildAttribute ("Children"). In addition, the Skill Category 414 can contain a reverse ConceptAttribute ("RésuméSkills") that references the RésuméSkill Category defined in the RésuméKB. The Parents and Children Attributes are multi-valued, intra-category Attributes, and hence define a directed acyclic graph of Skill relationships.

In the FIG. 4 example, the CompanyKB 406 has a similar structure to the SkillKB 404, but it describes two Categories: the Company Category 416 and the Industry Category 418. Both of these Categories have similar Attributes to the Skill Category 414, including "Id," "Name," "SortName," and "Terms." However, in the case of the Company Category 416 in the example, the "Parent" attribute is single-valued, which means that the Companies can be organized hierarchically as opposed to a directed acyclic graph. Industries on the other hand have a similar structure to Skills, with the "Parent" attribute being multi-valued and so defining a directed acyclic graph. The Company Category has two additional ConceptAttributes: "Industries" that references the Industry Category (which has the converse ConceptAttribute "Companies" that references the Companies Category), and "RésuméEmployments" that references the RésuméEmployment Category (which has the converse ConceptAttribute "Companies" that references the Companies Category).

In this FIG. 4 example, the RésuméKB describes several Categories, including the "Résumé," "RésuméSkill," and "RésuméEmployment" Categories, 408, 410, 412. The Résumé Category 408 is the primary Category in the RésuméKB 402 and describes the "Id," "GUID," "FullName," "DateReceived," "OriginalFilename," and "Text" of a résumé (though it could have many more Attributes defined). The Résumé Category 408 is referred to a primary category in the Résumé KB 402 because it defines the résumé itself, while the RésuméSkill and "RésuméEmployment" Categories 410, 412 are support categories or sub-components of the primary Category. For example, a RésuméEmployment Category 412 describes the employment section of a Résumé. In addition, the Résumé Category 408 describes the "RésuméSkills" ConceptAttribute that references the RésuméSkill Category (which has the converse ConceptAttribute "Résumé" that references the Résumé Category), and the "RésuméEmployment" ConceptAttribute that references the RésuméEmployment Category) which has the converse ConceptAttribute "Résumé" that references the Résumé Category).

According to the FIG. 4 example, the RésuméSkill Category 410 describes the "Id," "GUID," "DateLastUsed" (a DateAttribute), and "YearsOfExperience" (a DoubleAttribute) Attributes, in addition to the "Skill" and "Résumé" ConceptAttributes. The RésuméSkill Category 410 acts as a link between the Résumé Category 408 and the Skill Category 414, where the link has several values (e.g. DateLastUsed and YearsOfExperience) associated with the link.

In the FIG. 4 example, the RésuméEmployment Category 412 describes the "Id," "GUID," "DateLastUsed" (a DateAttribute), and "YearsOfExperience" (a DoubleAttribute) Attributes, in addition to the "Companies" and "Résumé" ConceptAttributes. The RésuméEmployment Category 412 acts as a link between the Résumé Category and the Company Category, where the link has several values (e.g. DateLast Used and YearsOfExperience) associated with the link. The RésuméEmployment Category 412 could also define a relationship to another other Knowledge Base 108, such as a Title Knowledge Base, using a similar structure.

D. Example Knowledge Base Instance

In some embodiments, a Knowledge Base 108 can be used to represent the underlying structure of a text document. For example, consider the following fragment of a résumé:

Bob Smith
123 Main St.
Cambridge, MA 02142
   9/2000-11/2002      Universal Studios, Java Software Engineer
       + Developed video asset management software using Java.
   8/1998-8/2000        Tivoli, Software Developer
       + Developed the Tivoli NetView system management
        software written in Java and C++.

This résumé can be represented by the Knowledge Base Schema defined above and illustrated in FIG. 4. As stated above, FIG. 5 illustrates how the Knowledge Base Schema could be instantiated as Concepts and Values, according to some embodiments. Like FIG. 4, FIG. 5 also illustrates the three KB schemas, including the RésuméKB 402, the SkillKB 404, and the Company KB 406. The fragment of Bob Smith's résumé shown above is also included in FIG. 5 as a résumé fragment 502. This example shows that under the Résumé Concept 508 (an instantiation of the Résumé Category 408) in the RésuméKB 402, the FullName Attribute (a DisplayAttribute) is "Bob Smith," the name of the job applicant stated on the résumé. In this same Concept 508, the DateReceivedAttribute (an OrderingAttribute) is "Dec. 12, 2002," or the date that the résumé was received by the system, and the OriginalFilname Attribute is "BobSmith-Résumé-.doc," or the name of the résumé file for Bob Smith. Similarly, there are various RésuméSkill Concepts 510 (instantiations of RésuméSkill Categories 410) in the RésuméKB 402 representing the different Skills on Bob Smith's résumé, including Tivoli NetView, Java, and C++. In the RésuméSkill Concepts 510, there are Values for the Attribute YearsOfExperience or the years of experience that Bob Smith has for various skills and the date (DateLastUsed) associated with the experience.

These RésuméSkills (e.g., Tivoli NetView, Java, C++) are linked in the schema in a hierarchy of skills. For example, each RésuméSkills Concept 510 is linked to a Skill Concept 514 (an instantiation of a Skill Category 414) in the SkillKB. Each of the Skill Concepts 514 can include numerous Values that are not illustrated in FIG. 5, including Values for each of the Attributes shown in FIG. 4 (e.g., Id, GUID, Name, Sort-Name, Terms, Parents, Children, RésuméSkills, etc.). The RésuméSkill Concept for Java programming experience from Bob Smith's résumé is linked to the Skill Concept 514 Java. Similarly, the Skill Concept 514 Java references the Skill Concept 514 Object-Oriented Programming Language, which is linked to the more general Skill Concept 514 of Object-Oriented, which is ultimately linked to the even more general Skill Concept 514 of Software Technology. Since skill C++ and C# also fall under Object-Oriented Programming Language, the skill Java is also indirectly linked to skills C++ and C#. Similarly, under the RésuméEmployment Concept 512 in the RésuméKB 402, there are Values for Attributes YearsofExperience and DateLastEmployed relating to each of the jobs held by Bob Smith. The RésuméEmployment Concepts 512 reference Company Concepts 516 in the CompanyKB 406, including Company Universal Studies and Company Tivoli, which are linked to other companies and industries within the schema. Company Universal Studies is linked to Company NBC, which is linked to GE, but Universal Studios is also linked to the Industry Concept 518 for the Motion Picture Production & Distribution Industry, and so forth. Thus, a search through a résumé database for résumés of persons who work in the motion picture industry could produce Bob Smith's résumé since he worked as a software engineer at Universal Studios and this company is linked to that industry.

E. Knowledge Base Schema Notation and AttributePaths

In some embodiments, a path of Attributes connected together through set of Knowledge Base Schemas is called an AttributePath. In these embodiments, since every Attribute has an associated Category, an AttributePath can be defined as a having a base Category followed by a chain of connected Attributes. A partial path can include a subset of the Attribute chain in an AttributePath. An AttributePath is a useful mechanism for defining the relationship between Categories and Attributes across Knowledge Bases.

The following BNF notation can be used to define Knowledge Bases, Categories, Attributes, and AttributePaths:

```
knowledge-         ::= <letter> {<letter> | <digit>}
base-label
category-label     ::= <letter> {<letter> | <digit>}
attribute-label    ::= <letter> {<letter> | <digit>}
category           ::= knowledge-base-label "." category-label
attribute          ::= category "." attribute-label ["(" <digit> ")" | "*"]
attribute-path     ::= attribute {"." attribute-label} ["(" <digit> ")" | "*"]}
```

For example, the Résumé Category 408 can be referenced with the label RésuméKB.Résumé. The Industries Attribute in the Company Category 416 can be referenced with the label "CompanyKB.Company.Industries." The Name Attribute in the Skill Category 414 can be referenced from the Résumé Category using the AttributePath RésuméKB.Résumé.RésuméSkills.Skill.Name. Further, AttributePaths can extend across multiple Knowledge Bases. For example, the Name Attribute in the Industry Category 418 can be referenced from the Skill Category 414 using the following AttributePath:

SkillKB.Skill.RésuméSkills.Résumé.RésuméEmployments.Companies.Industries.Name.

F. Referencing Concepts—the Universal Concept Locator

In some embodiments, the system further includes the ability to reference Concepts between and among Knowledge Bases. A Universal Concept Locator (UCL) (or Universal Concept Identifier (UCI)) can be used in system 100 to reference a Concept. The UCL (or UCI) can use the following BNF notation:

```
ucl              ::= [protocol "://" hostname [":" port ]] "/"context "/"
                     [knowledge-base-label "." category-label] [":" guid |
                     local-id] { ucl-path-element }
protocol         ::= "kbtp"
hostname         ::= { <letter> | <digit> } {["." { <letter> | <digit>}]}
port             ::= { <digit> }
context          ::= { <letter> | <digit> }
guid             ::= { <letter> | <digit> }
local-id         ::= { <digit> }
ucl-path-        ::= "/" [display-name] ["?" parameter-list]
element
parameter-       ::= attribute-op-value [{ "&" attribute-op-value }]
list
attribute-       ::= attribute-label operator value
op-value
```

A UCL specifies the host where the Concept is stored, the context or instance where the Concept is stored, the Knowledge Base and the Category of the Concept, the identifier (which may be the GUID), and a path or partial path to a Concept in a Concept hierarchy, and optionally a set of Attribute Values along the path. These values can be used to find a Concept, and hence, a UCL can be used as a reference to a Concept. The following are example UCLs used to reference Concepts in the example Knowledge Base illustrated in FIG. 5:

//SkillKB.Skill/Software+Technology/Object+Oriented/Object+Oriented+Programming+Language/Java //CompanyKB.Company/GE/NBC/Universal+Studios //CompanyKB.Industry/Technology/Diversified+Computer+Systems

III. Off-Line System: the Information Structure Extraction and Tagging Subsystem A. General Overview As explained above, the contextual personalized information retrieval system 100 includes both an off-line system 102 and an on-line system 104. The system 102 is "off-line" in that it operates before a search is executed; the term "off-line" is not meant to suggest that system is disconnected from a network, or is operated during limited periods. With regard to the off-line system 102, an off-line information extraction and tagging process occurs that inserts documents and their corresponding semantic structure and concept tags into an indexed information repository (the knowledge base). The search process of the on-line system 104 can search through documents that have been inserted and indexed into a Knowledge Base 108 that describe both the structure of the document and the relationship of the document to a set of "meta" Concepts, such as "Object Oriented" Skills shown in the example KB instance of FIG. 5, which form the basis of the search. Thus, the off-line process converts a text document into a Knowledge Base structure by extracting structure from documents and mapping them to the "meta" Concepts. The Knowledge Base structure may include 1) Concepts that capture the structure of the String-based text, 2) Concepts that map to normalization Knowledge Bases, such as the SkillKB and CompanyKB describe in the above example, or 3) any combination of the 1 and 2. In some embodiments, a Knowledge Base 108 is defined to capture data for the entire process, including a reference to and/or the contents of the original document, meta information about the original document, the clear text of the original document, a structural breakdown of the text of the document, and references to external "base" Knowledge Base concepts that were matched from the text of the document. This information is can be leveraged during the search process.

Referring again to FIG. 2, there is shown a high-level block diagram of the off-line system 102 for information structure extraction and tagging, according to an embodiment of the invention. The system 102 includes the following components:

A Data Connector 220 for gathering or receiving information (e.g., input documents) that is to be loaded into the system.

A Content Extraction Information Bus 222 for mapping documents into a knowledge base, where the knowledge base is a canonical representation of a semantic network of relationships among concepts, as described above. In some embodiments, the Bus can map data stored in a structured data source, such as a relational database into a knowledge base or such as a collection of RDF documents, XML documents, JSON documents, OWL documents, or other structured document files that model a semantic network of relationships among concepts.

The Content Extraction Information Bus 222 includes:

A Clear Text Extractor 210 (or Plain Text Converter) (optional) for converting formatted documents into plain text documents.

A Document Parser 212 for parsing documents into sub-components, including fielded text strings (which can be represented as XML documents). The term "sub-components" can include tokens, phrases, terms, sub-strings, or other text strings, matches to different rules or regular expressions, and so forth. The Document Parser 212 further includes a Parse Validator 224 that determines the correctness of the fielded text strings extracted from the document and in some cases corrects for errors.

A Document Importer 202 that can take either a set of fielded text strings or a set of fielded text strings with Concept references and insert them into a Knowledge Base that contains a network of relationships between collections of Concepts that contain a configurable set of Attributes; and A Document Tagger 214 that uses a Concept Synonym Matching Engine to match fielded text strings to Concepts stored in Knowledge Bases A KnowledgeBase API 216 that Stores data in a KnowledgeBase repository;

Interfaces with a Rule Processing Engine 204 and a Concept Synonym Matching Engine 206 to identify Concept in text strings; and Updates a network of Concept relationships that are indexed by a Concept Cube 208 that maintains collections of inverted indexes between Concepts and between Concepts and primitive values such as Strings, numbers (e.g. doubles, floats, and integers), Dates, and Geographical Points A Rule Processing Engine 204 that uses a set of concept matching rules to normalize, map, and split input strings into substrings and searches the substrings for concepts.

A Concept Synonym Matching Engine 206 to match input strings to Concepts in a KnowledgeBase 108.

A Concept Cube 208 that maintains collections of inverted indexes between Concepts.

Those of skill in the art will recognize that other embodiments can have different and/or additional components than those shown in FIG. 2 (and other FIGS. showing system components), and the functionalities can be distributed among the components in a manner different than described herein.

The Clear Text Extractor 210, Document Parser 212 (including its Parse Validator 224), Document Tagger 214, Document Importer 202, Rule Processing Engine 204, and Concept Synonym Matching Engine 206 are described in more detail below, followed by a description of the overall process of information extraction and tagging.

B. Clear Text Extractor

The system 102 takes as input information in a variety of forms, including, but not limited to, documents in formats such as MS Word, PDF, HTML, or plain text; e-mail messages, XML files, or Relational Database records. The Data Connector 220 gathers or receives this information that is to be loaded into the system 102. For unstructured documents, such as MS Word, PDF, HTML, and e-mail messages, the document may need to be first converted to a plain/clear text document. The Clear Text Extractor 210 of the Content Extraction Information Bus 222 performs this task by converting formatted documents into unformatted text documents. The Clear Text Extractor 210 can take input in a variety of formats, including, but not limited to word processing or office software documents, such as a MICROSOFT® Word document, a PDF document, an e-mail messages, an HTML document, etc., and can produce an output in the form of, for example, a UTF-8 encoded character stream.

C. Document Parser

The Document Parser 212 can extract semantic structure from the unstructured text content, and thereby converts an unformatted text document into a semantically structured document. The Parser 212 can parse documents into sub-components that can include tokens, phrases, terms, sub-strings, or other text strings, matches to different rules or regular expressions, and so forth, as stated above. The semantically structured document can contain a hierarchy of structure elements that have semantic labels and attributes that describe fields of text data. Some embodiments use the Extensible Markup Language (XML) to represent the semantic structure. However, many other document formats can also be used to represent the semantic structure of the document. In some cases, such as for XML files or content derived from Relational Databases, the semantic structure is already defined so this parsing can be skipped.

As one example, consider the contact information contained in the Bob Smith résumé:

```
Bob K. Smith
1234 My Circle
San Jose, CA 95131
Home: 408-123-4567
Email: bob_k_smith@hotmail.com
```

This document segment can be represented (using an XML schema defined as HR-XML) with the following hierarchical semantic structure:

```
<ContactInfo>
    <PersonName>
        <FormattedName>Bob K Smith</FormattedName>
        <GivenName>Bob</GivenName>
        <MiddleName>K</MiddleName>
        <FamilyName>Smith</FamilyName>
    </PersonName>
    <ContactMethod>
        <Use>personal</Use>
        <Location>home</Location>
        <WhenAvailable>anytime</WhenAvailable>
        <PostalAddress type="undefined">
            <CountryCode>US</CountryCode>
            <PostalCode>95131</PostalCode>
            <Region>CA</Region>
            <Municipality>San Jose</Municipality>
            <DeliveryAddress>
                <AddressLine>1234 My Circle</AddressLine>
            </DeliveryAddress>
        </PostalAddress>
    </ContactMethod>
    <ContactMethod>
        <Use>business</Use>
        <Location>home</Location>
        <WhenAvailable>anytime</WhenAvailable>
        <Telephone>
            <AreaCityCode>408</AreaCityCode>
            <SubscriberNumber>123-4567</SubscriberNumber>
        </Telephone>
    </ContactMethod>
    <ContactMethod>
        <Use>personal</Use>
        <Location>home</Location>
        <WhenAvailable>anytime</WhenAvailable>
        <InternetEmailAddress>bob_k_smith@hotmail.com
```

-continued

```
        </InternetEmailAddress>
    </ContactMethod>
</ContactInfo>
```

In some embodiments, the Parse Validator 204 determines the validity of the semantic document structure, ensuring that there are no obvious errors in converting the clear text document to a semantic structured document, or the unstructured document into a structured document. If possible, the Parse Validator 204 will repair the semantic structure. In some embodiments, if the parse is invalid, the semantic structured document is rejected. In these cases, a human can review the document or some other mechanism can be employed to manage in the invalid parsing.

D. Document Tagger

The Document Tagger 214 can connect the semantic structure of the document to "base" Knowledge Bases, connecting the document into a semantic network of relationships represented by concepts in one or more Knowledge Bases.

To perform this function, the Document Tagger 214 can interpret the structure of the document to determine which Knowledge Bases 108 should be matched against the fielded text data. This process may involve using several different text fields to determine a connection between a document element and a concept in a Knowledge Base 108. In many cases, the fielded text data may contain errors, variations or partial text representations of concepts, or the Document Parser 212 may have erroneously structured the document. To deal with these issues, the Document Tagger 214 may search through several text data fields to determine a concept connection.

To illustrate the function of the Document Tagger 214, consider an employment description on the résumé of Bob Smith in which he worked as a Senior Software Engineer at ANNUNCIO™ Software. This employment description can be represented by the following XML structure:

```
<EmploymentHistory>
    <EmployerOrg>
        <EmployerOrgName>Annuncio Software</EmployerOrgName>
        <PositionHistory positionType="directHire" currentEmployer="true">
            <Title>Senior Software Engineer</Title>
            <OrgName>
                <OrganizationName>Annuncio Software</OrganizationName>
            </OrgName>
            <OrgInfo>
                <PositionLocation type="undefined">
                    <CountryCode>US</CountryCode>
                    <Region>CA</Region>
                    <Municipality>Mountain View</Municipality>
                </PositionLocation>
                <WebSite />
            </OrgInfo>
            <Description>Senior Software Engineer. Feb 2000 - Present
Annuncio Software, Mountain View, CA[*]
Lead the design and development efforts for a Java enterprise application for
eMarketing. Technology used included: Servlet, XML, and EJB. Tools used
included Tomcat and iPlanet Application Server.
Designed, developed and implemented the application s multi-threaded
runtime engine, APIs and Oracle stored procedures.
Involved with various phases of the new product: building of the prototype,
market validation, MRD reviews, writing and reviewing of functional and
design specs.
Drive the integration design and development efforts with existing product
line.</Description>
            <StartDate>
```

-continued

```
            <AnyDate>2000-02-01</AnyDate>
        </StartDate>
        <EndDate>
            <AnyDate>2005-04-25</AnyDate>
        </EndDate>
    </PositionHistory>
</EmployerOrg>
```

In this context and application, the Document Tagger 214 analyzes this structure and determines the connection between this employment description structure and 1) Companies in a CompanyKB, 2) Titles in a TitleKB, 3) Locations in a LocationKB, and 4) Skills in a SkillKB. In determining these relationships, the Document Tagger 214 may also compute derived data such as CandidateSkills.YearsOfExperience and CandidateSkills.DateLastUsed. The Document Tagger 214 may also translate the semantic structure of the input document into the semantic structure of the Knowledge Base 108, which may define Attributes that store the original fielded text data. The result of the above document tagging process can be represented by the following section of an XML document:

```
<CandidateEmployment id="973" >
    <Candidate>
        <Candidate id="167" ucl="//CandidateKB.Candidate:167//Bob+K+Smith"/>
    </Candidate>
    <CompanyString>Annuncio Software</CompanyString>
    <OrganizationName>Annuncio Software</OrganizationName>
    <Companies>
        <CompanyKB.Company id="2148"
ucl="//CompanyKB.Company:rfxvgwl76vc389wjtg7obgt7jc//Oracle+Corporation/
Annuncio+Software+Inc."/>
    </Companies>
    <TitleString>Senior+Software+Engineer</TitleString>
    <TitleSeniorities>
        <TitleKB.TitleSeniority id="3"
ucl="//TitleKB.TitleSeniority:nnbo2rsy2rdivpgivjcy7jnj3b//Senior"/>
    </TitleSeniorities>
    <TitleFields>
        <TitleKB.TitleField id="1486"
ucl="//TitleKB.TitleField:4fpcpiygk5cgfoibr3er2hnard//Engineering/Engineer/
Software+Engineer"/>
    </TitleFields>
    <Location>
        <LocationKB.Location id="26780"
ucl="//LocationKB.Location:3ltxjchvbbdbllmh4nmmo6houb/Bay+Area%3FLocationType%
3D%62F%2F%3Anfaxplgmhzfnzpgilp2iwu3fmc%2F%2Fdivision1/650%3FLocationType%3D%2F%
2F%3Asilhmaziibfuhkgjmfxpsfg2ie%2F%2Fregion%2Fareacode/Palo+Alto%3FLocationTyp
e%3D%2F%2F%3Ahb7lpl255fglvj7ijaidu6djla%2F%2Fcity"/>
    </Location>
    <Department></Department>
    <EmploymentYears>5.60029009474738</EmploymentYears>
    <StartDate>02%2F01%2F2000+12%3A00+AM</StartDate>
    <EndDate>03%2F12%2F2300+12%3A00+AM</EndDate>
    <Summary>Senior+Software+Engineer%5B*%5D.++Feb+2000+-
+Present%0AAnnuncio+Software%2C+Mountain+View%2C+CA%0A%0ALead+the+design+and+d
evelopment+efforts+for+a+Java+enterprise+application+for+eMarketing.++Technolo
gy+used+included%3A+Servlet%2C+XML%2C+and+EJB.+Tools+used+included+Tomcat+and+
iPlanet+Application+Server.%0A%0ADesigned%2C+developed+and+implemented+the+app
lication+s+multi-
threaded+runtime+engine%2C+APIs+and+Oracle+stored+procedures.%0A%0AInvolved+wi
th+various+phases+of+the+new+product%3A+building+of+the+prototype%2C+market+va
lidation%2C+MRD+reviews%2C+writing+and+reviewing+of+functional+and+design+spec
s.%0A%0ADrive+the+integration+design+and+development+efforts+with+existing+pro
duct+line.</Summary>
    <ConcurrentEmploymentDensityRatio>1.0</ConcurrentEmploymentDensityRatio>
    <CandidateSkills>
        <CandidateSkill id="12946"
ucl="//CandidateKB.CandidateSkill:12946//Writing+Skills+"/>
        <CandidateSkill id="12908"
ucl="//CandidateKB.CandidateSkill:12908//Software+Development+"/>
        <CandidateSkill id="12945"
ucl="//CandidateKB.CandidateSkill:12945//Software+Engineering+"/>
        <CandidateSkill id="12935"
ucl="//CandidateKB.CandidateSkill:12935//Presentation+Software+"/>
        <CandidateSkill id="12920"
ucl="//CandidateKB.CandidateSkill:12920//XML+%28EXtensible+Markup+Language%29+"/>
        <CandidateSkill id="12919"
ucl="//CandidateKB.CandidateSkill:12919//Java+"/>
        <CandidateSkill id="12933"
ucl="//CandidateKB.CandidateSkill:12933//iPlanet+Application+Server+"/>
        <CandidateSkill id="12921"
ucl="//CandidateKB.CandidateSkill:12921//Enterprise+JavaBeans+%28EJB%29+"/>
        <CandidateSkill id="12944"
ucl="//CandidateKB.CandidateSkill:12944//Software+Design+"/>
```

```
        <CandidateSkill id="12904"
ucl="//CandidateKB.CandidateSkill:12904//Oracle+Database+"/>
        <CandidateSkill id="12939"
ucl="//CandidateKB.CandidateSkill:12939//Stored+Procedures+"/>
        <CandidateSkill id="12937"
ucl="//CandidateKB.CandidateSkill:12937//Prototyping+"/>
        <CandidateSkill id="12928"
ucl="//CandidateKB.CandidateSkill:12928//Java+Servlets+"/>
        <CandidateSkill id="12923"
ucl="//CandidateKB.CandidateSkill:12923//Tomcat+"/>
        <CandidateSkill id="12941"
ucl="//CandidateKB.CandidateSkill:12941//Marketing+Reguirements+Document+%28MRD%29+"/>
        <CandidateSkill id="12936"
ucl="//CandidateKB.CandidateSkill:12936//Enterprise+Applications+"/>
    </CandidateSkills>
    <KeywordSearchBlob>Senior+Software+Engineer%5B*%5D.++Feb+2000+-
+Present%0AAnnuncio+Software%2C+Mountain+View%2C+CA%0A%0ALead+the+design+and+d
evelopment+efforts+for+a+Java+enterprise+application+for+eMarketing.++Technolo
gy+used+included%3A+Servlet%2C+XML%2C+and+EJB.+Tools+used+included+Tomcat+and+
iPlanet+Application+Server.%0A%0ADesigned%2C+developed+and+implemented+the+app
lication+s+multi-
threaded+runtime+engine%2C+APIs+and+Oracle+stored+procedures.%0A%0AInvolved+wi
th+various+phases+of+the+new+product%3A+building+of+the+prototype%2C+market+va
lidation%2C+MRD+reviews%2C+writing+and+reviewing+of+functional+and+design+spec
s.%0A%0ADrive+the+integration+design+and+development+efforts+with+existing+pro
duct+line.</KeywordSearchBlob>
    </CandidateEmployment>
```

To perform these functions, the Document Tagger 214 can utilize the Rule Processing Engine 204 and the Concept Synonym Matching Engine 206, as described below.

E. Rule Processing Engine

The Rule Processing Engine (RPE) 204 identifies and searches for concepts referenced in a selection of text. The RPE 204 can use regular expressions to identify input strings that follow a syntactic pattern. For example, people often use certain punctuation to reference certain types of Locations. Some examples include 1) "San Francisco, Calif.", 2) "San Francisco (CA)", 3) "United States—California—San Francisco", or 4) "San Francisco, Calif. 94107." Each of these cases can be represented with a regular expression that keys off of the punctuation or character types. For example, in Case #1, it is two strings separated by a comma, in Case #2 it is one string to the left of another string that is enclosed in a left and right parentheses characters, in Case #3 it is three strings separated by two double hyphens, and in Case #4 it is two strings separated by a comma where the second string contains a sub-string consisting of a sequence of five digits. Each of these strings can then be used to search, for example, a LocationKB to find Location Concepts that have a certain type of relationship. For example, the string "San Francisco" could be used to find a Location that is City that is located within a Location that is a State that is found using the string "CA".

If an input string matches a regular expression pattern, the RPE 204 can use the regular expression to parse the input string into sub-strings. The substrings can be used to search through a Knowledge Base 108 to find concepts. In the above example, the RPE 204 coordinates the process of finding Locations. A Rule specified in the RPE 204 can contain regular expressions that would parse an input string into substrings, and those sub-strings can be passed into the Concept Synonym Matching Engine (CSME) 206 (described below) to find concept matches. The CSME 206 can find concepts using the strings where there is ambiguity caused by misspellings, word concatenations, multiple word meanings, etc. The concepts found by CSME 206 are then checked against other parts of the RPE Rule, i.e. the hierarchical relationship between San Francisco and California and Location Type, e.g. a City and State, respectively. This search process can leverage the hierarchical structure of a Knowledge Base 108 to find concepts.

The RPE 204 provides a RuleSet that contains a set of Rules. Rules can be defined by 1) a regular expression, 2) an optional preprocessing string normalization function, and 3) a hierarchical set of match candidates. For example, where an input query includes "SF, CA," a Rule can be applied to determine how to map "SF" and "CA" to the Knowledge Base, and can be used in conducting different hierarchical searches for these terms to determine that SF, the city, is a child of CA, the state.

The RPE 204 can define a string normalization function (f(S)→S') as any function that maps one string to another string. Input strings and/or sub-strings can be passed through string normalization functions to convert the input strings into a common character representation used to find matches. For example, the system can conduct phrase mapping where a phrase containing abbreviations "sw eng" can be mapped into the phrase "software engineering." The system preferably uses several string normalization functions, including, but not limited to, the following:

BasicLatinStringNormalizer—maps characters to the ASCI character set

CharMapNormalizer—maps all instances of a character to another character

DefaultStringNormalizer—maps characters to the ASCI characters, removes extra whitespace, and converts characters to lower case PipelineStringNormalizer—allows any of the other StringNormalizers to be chained together to form another StringNormalizer PhraseMapNormalizer—maps a sequence of words to another sequence of words, including a null set which would eliminate the sequence of words RemoveBracketedStringNormalizer—removes characters contained within a bracket RemoveCharNormalizer—removes all instances of a character RepeatingPatternStringNormalizer—removes repeating patterns of characters ReplaceCharNormalizer—replaces all instances of a character with another character ReplaceStringNormalizer—replaces all instances of a sequence of characters with another sequence of characters ToLowerCaseNormalizer—converts the string to lower case characters TrimStringNormalizer—removes all leading and trailing whitespace WhiteSpaceCompressor—removes redundant whitespace characters A Match Candidate is defined by a set of tests and a set of actions that are taken based on the results of the tests. A Test describes how to use extracted (and potentially normalized) input strings to search for concepts in a Knowledge Base 108. The Tests can include either 1) a query for concepts that have Attributes that explicitly match the input values given, 2) a query for concepts using the Concept Synonym Matching Engine 206, or 3) any combination of the these two methods. The actions define what to do when either no concepts are found, or when one or more concepts are found. The actions can include, but are not limited to, the following:

Assign—assigns values to Concepts

Create—creates a new concept using the input values provided

Recurse—continue with another set of tests taking as input matches the previously executed test Return—return the results found Stop—stops the search process and returns no results Unassign—removes values from Concepts The following is an example of a RPE RuleSet to find a Location in a LocationKB:

```
<RuleSet knowledgeBase="LocationKB">
  <Rule name="city comma state space zip" example="San Francisco, CA 95107">
    <regexpr>\s*( \w [\( \. ,#&\;\w\s\-
\'\\\/]*[\w\)\.])\s*,\s*(\w[w\s]*[\w\.])\s*(\d{5}) (\-\d{4})?\s*$</regexpr>
    <StringFunction name="term"
filename="LocationKB/LocationKB.Location.Terms-normalizer.xml"/>
    <StringFunction name="state">
      <RemoveBracketedString init="( )"/>
      <Trim/>
    </StringFunction>
    <Candidate category="Location" name="City, State ZIPCODE
      not found"
      example="San Francisco, California 94107">
      <Concept category="Location" onMatch="return">
        <test>
          <SortName value="$3" op="EQ"/>
          <LocationType Name="zipcode" op="EQ"/>
        </test>
        <test>
          <Name value="$3" op="EQ"/>
          <LocationType Name="zipcode" op="EQ"/>
        </test>
      </Concept>
    </Candidate>
    <Candidate category="Location" name="City, State ZIPCODE"
      example="San Francisco, California 94107">
      <Concept category="Location" onMatch="recursen">
        <test>
          <SortName value="$term(2)" op="EQ"/>
          <LocationType Name="division" op="EQ"/>
        </test>
        <test>
          <Name value="$2" op="EQ"/>
          <LocationType Name="division" op="EQ"/>
        </test>
```

-continued

```
        <test>
          <Terms value="$term(2)" op="EQ"/>
          <LocationType Name="division" op="EQ"/>
        </test>
        <MatchConceptTest value="$term(2)" minScore="0.95"
matchType="single">
          <LocationType Name="division" op="EQ"/>
        </MatchConceptTest>
        <recurse>
          <Concept category="Location" onMatch="return">
            <test>
              <SortName value="$1" op="EQ"/>
              <LocationType Name="city" op="EQ"/>
              <Parents id="$super" op="EQ"/>
            </test>
            <test>
              <Name value="$1" op="EQ"/>
              <LocationType Name="city" op="EQ"/>
              <Parents id="$super" op="EQ"/>
            </test>
            <test>
              <Terms value="$term(1)" op="EQ"/>
              <Parents id="$super" op="EQ"/>
              <LocationType Name="city" op="EQ"/>
            </test>
            <MatchConceptTest value="$term(1)" minScore="0.95"
matchType="single">
              <LocationType Name="city" op="EQ"/>
              <Parents id="$super" op="EQ"/>
            </MatchConceptTest>
          </Concept>
        </recurse>
      </Concept>
    </Candidate>
  </Rule>
</RuleSet>
```

F. Concept Synonym Matching Engine

The Concept Synonym Matching Engine (CSME) 206 identifies and extracts concepts referenced in a selection of text and matches these to concepts defined in a Knowledge Base 108 (e.g. a SkillKB) in the presence of errors or variations in the description of those concepts. The CSME 206 can also identify the sub-sections of the selection of text (i.e. which words) were used to identify the concept. In this manner, the CSME 206 can highlight words in text when presenting matches to users, as well as building queries and identifying which parts of an input string match to concepts, and hence are expanded, and which parts of an input string do not correspond to a concept and hence are used as keyword queries. The systems and methods that more specifically define this subcomponent are described in U.S. patent application Ser. No. 11/253,974, filed on Oct. 18, 2005, entitled "Concept Synonym Matching Engine," which claims the benefit of U.S. Provisional Application No. 60/620,626, filed on Oct. 19, 2004, entitled "Concept Synonym Matching Engine," the entire disclosures of which are both hereby incorporated by reference herein in their entireties for all purposes.

The CSME 206 preferably identifies concepts referenced in an input string of text by dividing the input string into one or more input tokens that form one or more sub-strings of text within the input string. The CSME 206 can represent the concept to be identified with a pattern that is divided into one or more pattern tokens. Applying the input and pattern tokens, the CSME 206 can identify a token match between the one or more input tokens and the one or more pattern tokens. The CSME 206 can identify a pattern match between one of the one or more sub-strings and the pattern based on the token match. Once the matches are identified, the CSME 206 can score the pattern match based on the token match by assigning each of the one or more basic patterns a weight that together equal the total weight for the pattern. The CSME 206 determines whether the concept is present in the input string based on the score. Additionally, which one of the one or more sub-strings of text in the input string naming the concept is identified based on the token match. The CSME 206 can select the pattern match with the total weight that is highest (and where the pattern match does not overlap any other pattern matches for the input string).

G. Document Importer

The Document Importer 202 (illustrated in FIG. 2) reads a semantic structured document, such as an XML document. The Document Importer 202 further inserts concepts and concept relationships into one or more Knowledge Bases 108. The Document Importer 202 thus reads the document representation that consists of the parsed structure of the document and concept tags associated with each of the document structure components. The Document Importer 202 writes the values into the Knowledge Bases 108 via the KnowledgeBase API 216. In the process of inserting Concept Updates into the Knowledge Base 108, the KnowledgeBase API (KBAPI) 216 inserts into a relational database (optional) that is used to persist the Knowledge Base 108 Concept values and sends messages to the Concept Cube 208, which in turn updates the Attribute Indexes 109.

The Attribute Indexes 109 are inverted indexes such that if Concept A references Concept B, Concept A can be found given Concept B. For example, if Concept A is Bob Smith's résumé, and Concept B is the Title: Software Engineer, Bob Smith's résumé can be found given the Software Engineer Title Concept. The KBAPI 216, Knowledge Base 108, Concept Cube 208 and Attribute Indexes 109 are both "off-line" and "on-line" components. In other words, the components are a "bridge" between the off-line and on-line components.

H. Extraction and Tagging Process

Figure 6:
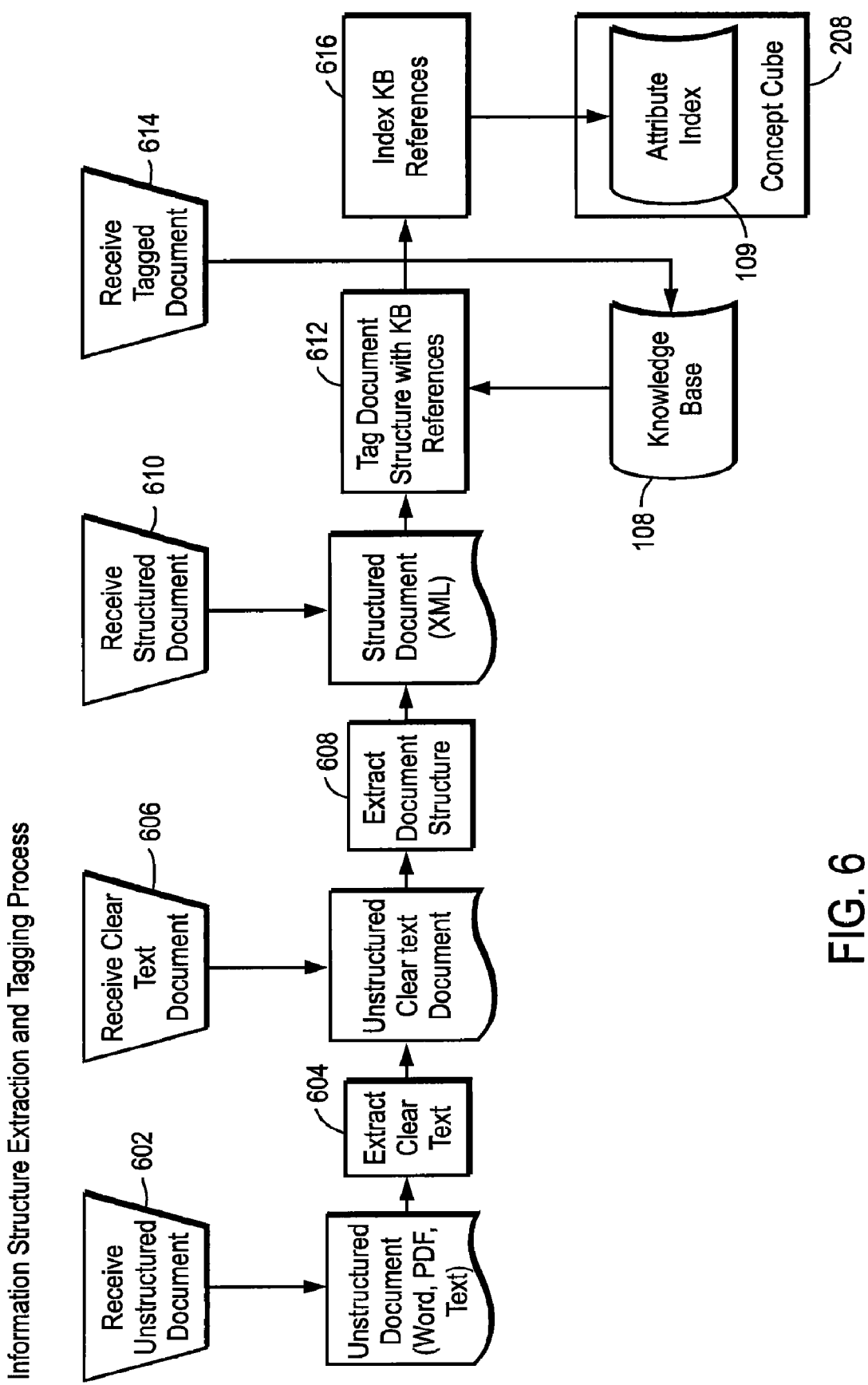
FIG. 6 is a flowchart illustrating the information structure extraction and tagging process conducted by the off-line system, according to one embodiment of the present invention.

Referring now to FIG. 6, there is shown a flowchart illustrating the information structure extraction and tagging process. As explained above, the system 102 receives a document for extraction and tagging. The system 102 can receive 602 unstructured documents (e.g., MS Word, PDF, and e-mail messages), can receive 606 clear text documents, or can receive 610 structured documents. The receiving step 610 can also refer to receiving a document containing structured data (structured data source) that can include XML documents, RDF documents, JSON documents, OWL documents, etc. Even though these are structured data sources, these can still be matched to concepts in the knowledge bases as structured data sources typically make reference to strings and not fully resolved concepts. These documents can be provided by a user (e.g., a user providing his résumé to a job search service), provided by a company, acquired by the system 102 itself (e.g., a résumé acquired from a résumé posting website or other location), or received by some other means. Where the system 102 receives 602 an unstructured document, the system 102 can first convert it to a plain/clear text document by extracting 604 clear text from the document, as described above. The system 102 can take this clear text document and extract 608 semantic structure from the unstructured text content. However, if the document initially received 606 was a clear text document, then the first step of extraction 604 can be skipped. The system 102 can take the structured document produced by the extraction 608 and tag 612 the document structure with KB references. So, the system 102 can tag 612 the structural components with Concepts defined in a Knowledge Base 108. This process may use the semantic structure of the document to disambiguate Concept references within the text. Where the system 102 initially received 610 a structured document (e.g., XML files or content derived from Relational Databases), the semantic structure is already defined so the extraction 608 step can be skipped.

The system 102 then receives 614 the tagged document produced in the tagging 612 process and inserts the semantically structured content and Concept tags into an indexed Knowledge Base, and thus the system 102 indexes 616 the KB references. The Attribute Indexes 109 are maintained within the Concept Cube 208. In addition, the data received 614 could also be derived directly from a relational database (structured data source). At any step in the process, the data may be persisted to disk or to into a database for later retrieval to continue with the above-described process.

IV. On-Line System: the Personalized Information Retrieval Subsystem

A. General

Referring again to FIG. 3, there is shown a high-level block diagram illustrating the components of the on-line system 104, according to an embodiment of the invention. This system 104 searches a graph of concepts and concept relationships (defined by one or more Knowledge Bases 108) to find concepts that may (or may not) represent documents or other information of interest. In one example, the system 104 searches for résumés or job requisitions based on a user entered query, or based on a job requisition or résumé, respectively. The system 104 preferably includes the following modules (some of which overlap with the off-line system 102 and so have already been discussed in detail above):

- An optional Web Application 302 through which the user can access the system 104 and conduct a search.
- A Presentation Layer 304 that presents the search results to the user or another process.
- A Business logic layer 306 for translating a users input query into a search. The business logic layer 306 also includes a Query Parser 307 for parsing of the user's input query into a plurality of sub-components in a manner similar to that described above regarding the parsing in the off-line system 102 illustrated FIG. 2.
- A Concept Synonym Matching Engine (CSME) 206 (described above, and referred to in FIG. 3 as the Concept Extraction Engine) that is used to match a users input query. The user's "input query" or "search query" can include queries ranging short input strings (including simple or contextual strings) to complete documents, to a set of Concepts that are mapped to Search Criteria.
- A Knowledge Base API 216 (shown in FIG. 2).*and* Knowledge Base 108 repository that contains the tagged and indexed collection of documents and the semantic network of Concepts that define the document tags.
- A ConceptCube 208 (described above, and shown in FIG. 2) that maintains collection of subsuming hierarchical and non-hierarchical inverted indexes between Concepts in a Knowledge Base 108. Thus, the ConceptCube 208 is configured for indexing a plurality of the concepts in the knowledge base into one or more indexes.
- A Dynamic Query and Analytics Engine 316 that utilizes subsuming hierarchical and non-hierarchical indexes to execute fast parametric searches of the semantic networks stored in a Knowledge Base 108.
- A Search Engine 300 that maps sub-components of the input query (the input query is parsed into sub-components by the Query Parser 307) to one or more of the concepts in the knowledge base that are identified to be matching concepts matching the sub-components. The search engine further maps the matching concepts to a set of criteria and criteria values to construct a query of the documents mapped into the knowledge base. The search engine can also execute the query constructed using the indexes to produce a partial set of search results, and can select and score the search results in the partial set to produce a final set of search results that are ranked. The Search Engine 300 includes:

A Contextual Search Engine 314 that takes as input a set of Search Criteria (whereby the Search Criteria include a variety of forms including Selection Criteria/Search Criteria, Score Criteria, and Filter Criteria) that can be organized into groups of Search Criteria and, utilizing the Dynamic Query and Analytics Engine 316, selects a set of matching Concepts and uses a set of fuzzy search algorithms to determine a rank ordering of the matching Concepts based on a score for each matching Concept.

A Contextual Match Engine 312 that uses a reference semantic network stored in a Knowledge Base 108 to construct a query including a set of Match Criteria (that can include a variety of forms) that are used to select matching Concepts and rank them based fuzzy matching algorithms that evaluate a "degree of match" between the reference semantic network and the matching Concepts.

A Feedback Engine 303 that applies feedback received from the user stored in a profile to personalize the search to the user by adjusting the ranking of the search results in the final set. The Feedback Engine 303 includes:

An Adaptive and Collaborative User/Search Profiling Engine 310 that uses search result rating feedback from users to compute a profile that includes a set of weights for concepts or values, and the context in which they are applied, that modulate the weights of concepts as defined by the document collection.

A Personalized Search Engine and Match Engine 308 that uses the User and Search Profiles (as defined below) to modify the weights used to compute scores for Search Criteria, and constructs implicit scoring criteria used to evaluate target concepts, modifying the score of the target concept, and hence altering the ranking of target concepts to meet implicit user requirements. The Adaptive and Collaborative User/Search Profiling Engine 310 and the Personalized Search Engine and Match Engine 308 together make up the Feedback Engine 303 of the system 104.

With the exception of modules that have already been described above, each of these modules is defined in more detail below.

B. Dynamic Query and Analytics Engine

1. QueryPath

As stated above, the Dynamic Query and Analytics Engine (DQAE) 316 utilizes subsuming hierarchical and non-hierarchical indexes to execute fast parametric searches of the semantic networks stored in a Knowledge Base 108. A sub-type of an AttributePath is a QueryPath which can be used to query Concepts and Values stored in a Knowledge Base 108. For example, considering an AttributePath associated with Bob Smith's résumé as illustrated in FIG. 5, it is possible to query all Skills that a résumé references, where that résumé also references Companies that are in Industries that have a Name equal to "Motion Picture Production & Distribution." Using the example illustrated in FIG. 5, this query would return the Skills of "Tivoli NetView," "Java," and "C++". We can extend this model to allow queries along the AttributePath using the following form:

| operator | ::= | "=" | "!=" | "<" | "<=" | ">" | ">=" | "|" | "!|" | "=^" | "=!^" |
|---|---|---|
| value | ::= | { <letter> | <digit> | <punctuation> } |
| query-element | ::= | attribute-label operator value |
| sub-query | ::= | query-element { "&" query-element } |
| query-path | ::= | category [ "[" sub-query "]" ] {"." attribute-label [ "[" sub-query "]" ] } ["(" <digit> ")" | "*"] } |

To find all Skills referenced by the résumé, where that résumé also references Companies that are in Industries that have a Name equal to "Motion Picture Production and Distribution" AND where the YearsOfExperience for a Skill is greater than 4 years, it is possible to use the following QueryPath:

SkillKB.Skill.RésuméSkills[YearsOfExperience>4.0].Résumé.RésuméEmployments.Companies.Industries [Name=Motion+Picture+Production+and+Distribution]

This type of query could be mapped to a standard SQL query if the above schema was mapped to relational database. However, in another example where a user is interested in querying all résumés that have "Object Oriented" Skills, the query could be expressed a follows:

RésuméKB.Résumé.RésuméSkills.Skill[Name="Object+Oriented"]

In this case, the user would expect to find the Bob Smith résumé since Bob Smith has listed on his résumé some object-oriented programming skills (Java and C++). However, Bob Smith does not have a direct link to the "Object Oriented" Skill. To address this problem, a Skill directed acyclic graph (DAG) can be used to find all Skills that inherit "Object Oriented" properties through the parent-child relationship. Using this relationship, a search for object-oriented will return all résumés that are tagged with "Object Oriented Programming Language," "Java," "C++," and "C#," which is what the searcher would expect to find. However, the searcher would not expect to find résumés that were tagged with "System Software Management" or "Tivoli NetView," and these types of résumés would not be returned in this search. This type of query can be expressed using the QueryPath:

RésuméKB.Résumé.RésuméSkills.Skill.Parents* [Name="Object+Oriented"]

This query specifies that the user wants to find all résumés that have Skills that have an ancestor with the Name Attribute equal to "Object Oriented." This type of relationship is referred to here as transitive closure. In addition, the system can also include one or more PhraseIndexes that allow look up of more than one word provided in a user's input query (e.g., can look for two words together), and in the specific order provided.

2. AttributeIndexes and the ConceptCube

Performing a transitive closure query using SQL could be very expensive and take a long time to execute, especially if the directed acyclic graph is very large. To address this issue, the system 104 can compute the transitive closure for all nodes in the directed acyclic graph going in a specified direction, e.g. from parent to child, or from child to parent, and can store these values in an AttributeIndex 109, turning the search process into a very fast lookup. Not all AttributeIndexes 109 necessarily compute and store the transitive closure of the DAG, however. AttributeIndexes 109 can index a limited degree of transitivity across a DAG. For example, an AttributeIndex 109 can index only one degree of transitivity, which would index only the parents or children of Concepts in a Category, excluding the grand parents and higher, or grand children or lower. In addition, an AttributeIndex 109 can compute and store transitivity between Categories. For example, an AttributeIndex 109 can compute and store transitivity across the Category Skill 414 and the Category RésuméSkill 410 (shown in KB schema of FIG. 4).

In general, an AttributeIndex 109 maintains and stores inverted indexes for Attribute Values and the Concepts that reference those Values. Values in this case can be Concepts, as well as any of the primitive values. For example, an AttributeIndex 109 for a StringAttribute is equivalent to a keyword inverted index used in traditional full-text search.

In some embodiments, AttributeIndexes 109 are managed by a ConceptCube 208 (shown in FIG. 2). The ConceptCube 208 can build indexes from underlying data and dynamically updating indexes, including insertions and deletions, when values change. In addition, the ConceptCubes208 can maintain relationships between AttributeIndexes so that queries across an AttributePath can be executed quickly. With the ConceptCube 208 and AttributeIndexes 109, it is possible to execute a query to find all Résumés that have "Object Oriented" Skills very quickly.

3. AttributePathIndexes

Queries that involve transitivity across an AttributePath, such as the following, RésuméKB.Résumé.RésuméSkills.Skill.Parents*=// SkillKB.Skill/Software+Technology/Object+Oriented can be achieved by connecting a series of AttributeIndexes 109 together, which is referred to here as "spinning the cube." In this case, the SkillKB.Skill.Parents*AttributeIndex 109 would be used to find all Skills that are "subsumed" by the "Object Oriented" Skill. Those Skills can then be fed into the RésuméKB.RésuméSkill.Skill AttributeIndex to retrieve all RésuméSkill concepts that reference any of the Skills subsumed by "Object Oriented." In addition, the RésuméKB.Résumé.RésuméSkills AttributeIndex 109 can be used to find all the résumés that reference those RésuméSkill concepts. While these operations can be optimized to execute very quickly, repeated execution of this type of operation can be very expensive. Alternatively, the DQAE 316 computes and maintains AttributePathIndexes that store transitive relationships across an AttributePath. With AttributePathIndexes a single lookup in the RésuméKB.Résumé. RésuméSkills.Skill.Parents*AttributePathIndex can result in all the résumés that reference Skills that are subsumed by the "Object Oriented" Skill. The transitive indexes described in this application, including but not limited to AttributeIndexes, AttributePathIndexes, etc., can index constrained degrees of transitivity across a DAG, including indexing up to, exactly, at least, or one or more limited or constrained ranges of one, two, three, four, five, six, seven, or more degrees of transitivity. Furthermore, that DAG and these indexes can index across multiple distinct Categories, relational database tables, knowledge bases, etc., and this indexing can be up to, exactly, at least, or one or more limited or constrained ranges of one, two, three, four, five, six, seven, or more degrees of transitivity. For example, the indexes could be constrained to index between {2,10} degrees of transitivity, between {4, unlimited} distinct categories, a combination of these constraints, etc. In some embodiments, these constraints can be applied for efficiency reasons, for example to limit trivial indexing of low degrees of transitivity and/or limit indexing of very high degrees of transitivity. In some embodiment, the a DAG spanning multiple categories or relational tables will be indexed in a single index, allowing efficient or direct lookups in queries that span multiple distinct tables, categories, etc.

4. Complex Queries and the Dynamic Query and Analytics Engine

To facilitate finding Concepts in a Knowledge Base 108, complex queries can be used. For example, a query can be constructed to find all Companies in the "Media" Industry AND résumés of people who worked at those Companies and also have "Object Oriented" Skills with greater than 4 years of experience. This query can be performed using the Knowledge Base schema described in FIG. 5, and using the following syntax:

SELECT CompanyKB.Company WHERE

CompanyKB.Company.Industry.Parents*=//CompanyKB.Industry/Media AND

CompanyKB.Company.RésuméEmployments.Resume.RésuméSkills.Skill.Parents*=//SkillKB. Skill/Software+Technology/Object+Oriented AND CompanyKB.Company.RésuméEmployments.Resume.RésuméSkills.YearsOfExperience>4

An alternative query achieving the same results using a QueryPath is as follows:

SELECT CompanyKB.Company WHERE

CompanyKB.Company.Industry.Parents*=///Media AND

CompanyKB.Company.RésuméEmployments.Resume.RésuméSkills[YearsOfExperience>4].Skill. Parents*=///Software+Technology/Object+Oriented In this example, the Category specification in the UCLs is left out because it is implied by the KB Schema.

This query can leverage the AttributePathIndexes describe above. However, given the complexity of how queries can be constructed and the number of combinations that can be formed it can be difficult to pre-index all the relationships. Hence, it is desirable to construct dynamic queries. The DQAE 316 constructs and executes dynamic queries. A Query can be defined as a Constraint on a Category that results in a set of zero or more Concepts of that Category. More than one Constraint can be applied to a Category through the use of a CompoundConstraint, where the final set of concepts is computed as the intersection (AND) or the union (OR) of the sets defined by each Constraint. CompoundConstraints can also be complemented. In addition, Queries can be nested by using a QuerySetConstraint on one or more of the Attributes of the Category being queried.

The system provides the following hierarchy of Constraint classes:

Constraint—defines an abstract Constraint that constrains a Category to a set of Concepts AdhocConstraint—defines an Adhoc set of Concepts AttributeConstraint—defines a Constraint on a specified Attribute, which includes the degree of transitive closure for that Attribute. This class is an abstract class and has, but is not limited to, the following subclasses:

DBConstraint—the system also allows the Attributes to be mapped to values stored in a relational database. A DBConstraint allows queries on those values to be executed in a relational database and integrated into the result set. Subclasses of a DBConstraint can include, but are not limited to, SimpleDBConstraint SetDBConstraint GeoConstraint—defines an AttributeConstraint where the input value is a GeoPoint and a radius, or a GeoRegion KeywordConstraint—defines an AttributeConstraint for StringAttributes where the input String Value can specify Boolean operations for each of the substring components of the input String Value RangeConstraint—defines an AttributeConstraint with a range of values with minimum and maximum values and whether or not the range is inclusive of the minimum and/or maximum values SetConstraint—defines an AttributeConstraint with multiple values, along with a SetOperation that defines the results of the individual constraints are combined together, including an intersection (AND), a union (OR); and whether or not the result should be a compliment QuerySetConstraint—defines an AttributeConstraint who's input values are the result of a nested Query. The QuerySetConstraint is used to "spin the cube" and execute transitivity across and AttributePath SimpleConstraint—defines a AttributeConstraint with a single value AttributePathConstraint—defines a Constraint along an AttributePath, which can include degrees of transitive closure along elements of the path. Subclasses of AttributePathConstraint include, but are not limited to, GeoAttributePathConstraint—defines an AttributePathConstraint where the last Attribute is a GeoPointAttribute and where the input value is a GeoPoint and a radius, or a GeoRegion KeywordAttributePathConstraint—defines an AttributePathConstraint where the last Attribute is a StringAttributes and where the input String Value can specify boolean operations for each of the substring components of the input String Value RangeAttributePathConstraint—defines an AttributePathConstraint with a range of values with minimum and maximum values and whether or not the range is inclusive of the minimum and/or maximum values SetAttributePathConstraint—defines an AttributePathConstraint with multiple values at the end of the AttributePath, along with a SetOperation that defines the results of the individual constraints are combined together, including an intersection (AND), a union (OR); and whether or not the result should be a compliment SimpleAttributePathConstraint—defines an AttributePathConstraint with a single value to constrain the path CompoundConstraint—defines a Constraint that includes an array of Constraints who's results are combined together as specified by a SetOperation, including an intersection (AND), a union (OR); and whether or not the result should be a compliment QueryConstraint—defines a Constraint that includes a nested Query Queries can result in sets of Concepts where each set has a cardinality, and where sets of Concepts can be operated on using standard set operations, including union, intersection and complement.

a. Constraint Trees

To facilitate the construction of and optimization of complex queries, such as the one described above, the system preferably utilizes a Constraint Tree. A Constraint Tree can be defined as a hierarchy of Constraints that define a Query. A Query can be defined by a single Constraint. However, using CompoundConstraints and QuerySetConstraints, which are defined below, an arbitrarily complex tree of Constraints can be formed. When a query is executed, the DQAE 316 can analyze the Constraint Tree and compute an optimal execution of the query given the available AttributeIndexes and AttributePathIndexes, and the relative complexity of each branch of the tree. An example of a Constraint Tree is shown below for a query conducted for the skill "Java" combined with the title "Software Engineer." The skill "Java" can be searched in a number of locations, including within the full text of documents, the RésuméSkills, the Title (either as a string or a concept, e.g., if a candidate has a title like "Java Software Engineer"), and so forth. The text below shows a Constraint Tree for this query:

```
CombinedConstraint: CompoundConstraintImpl:
SetOperation: AND
Constraints:
    CompoundConstraintImpl:
      SetOperation: OR
      Constraints:
        SimpleAttributePathConstraintImpl:
          Attribute path: RésuméKB.Resume.RésuméSkills.SkillObject.Parents*
          Inverted: false
          MatchValue: Java
        SimpleConstraintImpl:
          Attribute: RésuméKB.Resume.OriginalBlob
          Inverted: false
          MatchValue: java
        QuerySetConstraintImpl:
          Attribute: RésuméKB.Resume.RésuméEmployments
          Inverted: false
          SetOperation: OR
          SubQuery:
            ConceptQueryImpl
            Category: RésuméKB.RésuméEmployment
            Constraint:
            SimpleConstraintImpl:
              Attribute: RésuméKB.RésuméEmployment.TitleInputString
              Inverted: false
              MatchValue: java
        SimpleAttributePathConstraintImpl:
          Attribute path: RésuméKB.Resume.ResumeTitleSkills.SkillObject.Parents*
          Inverted: false
          MatchValue: Java
    CompoundConstraintImpl:
      SetOperation: OR
      Constraints:
        QuerySetConstraintImpl:
          Attribute: RésuméKB.Resume.RésuméEmployments
          Inverted: false
          SetOperation: OR
          SubQuery:
          ConceptQueryImpl
          Category: RésuméKB.RésuméEmployment
          Constraint:
          SimpleConstraintImpl:
            Attribute: RésuméKB.RésuméEmployment.TitleInputString
            Inverted: false
            MatchValue: software engineer
```

SimpleAttributePathConstraintImpl:
    Attribute path: RésuméKB.Resume.RésuméEmployments.TitleField.Parent*
    Inverted: false
    MatchValue: Software Engineer
  b. Variations and Hierarchical Variations In addition to defining a set of Concepts in a Category, the system can also define that a Query can produce a set of Variations for any given Attribute of a Category. A Variation can be defined as an AttributeConstraint that can be applied to the Category. Variations can define subsets of Concepts that would be returned if the AttributeConstraint was applied as a Query on the Category. Variations can result in a "narrowing" of the set of Concepts, or they can "expand" the set of Concepts. When used interactively, Variations can be used to allow users to navigate through result sets by refining or expanding result sets without requiring the user to enter the specifications of the constraint. In addition, Variations can be used to analyze result sets and form the basis of analytics.

In some embodiments, there can also be Hierarchical Variations as a hierarchy of Variations where the hierarchy is specified by the Parent/Child Attributes of the Category. The set inclusion of Hierarchical Variations can be computed using transitive closure of the Parent/Child DAG. With Hierarchical Variations, a user can narrow a result set by leveraging the hierarchy of one Category, such as Skills, and using it to narrow results sets of another Category, such as Résumés. In the process of doing so, the user can be presented with the cardinality of the Hierarchical Variation indicating the size of the subset of data if the variation was selected. For example, using the example illustrated in FIG. 5, a user could be presented with "System Software Management" and "Object Oriented" at one level. Under "Object Oriented" the user would be presented with "Object Oriented Programming Language." Continuing down into "Object Oriented Programming Language," the user would be presented with "Java", "C++" and "C#," each of which would indicate the number of résumés that listed each of those Skills.

C. Contextual Search Engine

Figure 7:
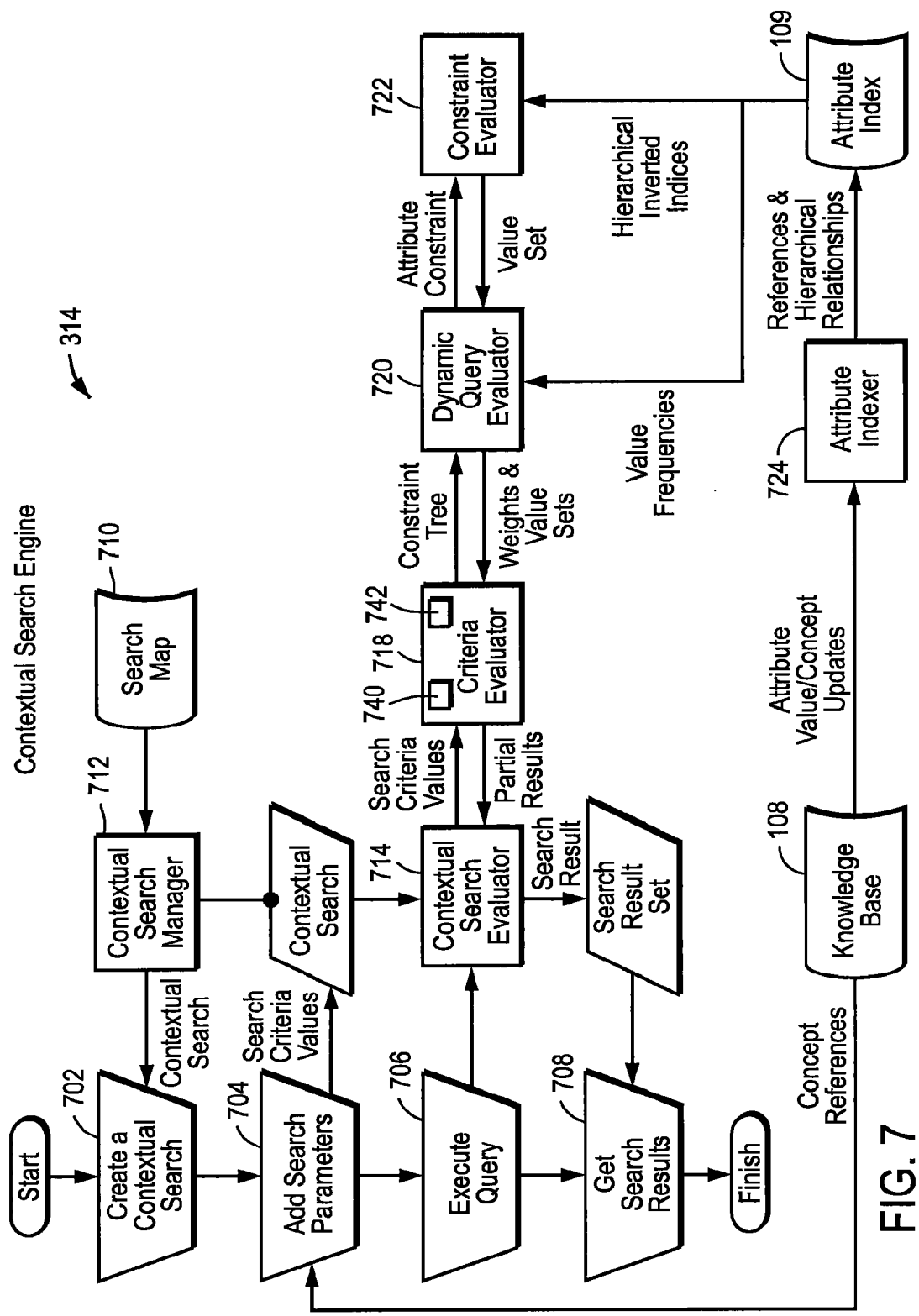
FIG. 7 is a high-level block diagram illustrating the Contextual Search Engine components and processes, according to one embodiment of the present invention.

The architectural components of the Contextual Search Engine 314 and steps associated with contextual searching are illustrated in FIG. 7 As briefly described above, the Contextual Search Engine 314 takes as input a set of Search Criteria (the Search Criteria can include a variety of types, including Selection Criteria/Search Criteria, Score Criteria, and Filter Criteria) that can be organized into groups of Search Criteria and, utilizing the DQAE 316, selects a set of matching Concepts and uses a set of fuzzy search algorithms to determine a rank ordering of the matching Concepts based on a score for each matching Concept. The Contextual Search Engine 314 includes a Contextual Search Manager 712, a SearchMap 710, and a Contextual Search Evaluator 714. The Contextual Search Engine 314 further includes a Criteria Evaluator 718 (includes a ScoreEvaluator 740 and a SubPartialEvaluator 742). The Contextual Search Engine 314 also works in conjunction with the Dynamic Query Engine 316 and the Concept Cube 208 shown in FIGS. 2 and 3. The Contextual Search Engine 314 includes a Dynamic Query Evaluator 720 and a Constraint Evaluator 722. Further, the Engine 314 works with an Attribute Indexer 724 and one or more Attribute Indexes 109.

While FIG. 7 is described in more detail below, an example is provided here first to briefly introduce the components and how they function. In this example, a user enters a query for a résumé stating that he wants a "Software Engineer with 5+years of Object Oriented Programming." A Contextual Search is created 702 using the Contextual Search Manager 712, where the search is defined by a Search Map 710. The string "Software Engineer with 5+years of Object Oriented Programming" is evaluated against a Title and Skill Knowledge Base 108 to extract the concept Title: Software Engineer, and Skill: Object Oriented Programming. Using the SearchMap 710, Search Criteria Values (described below) can be added 704 to the Contextual Search. The Contextual Search is executed 706 by the Contextual Search Evaluator 714. When evaluated, each of the Search Criteria (in this case there are two Search Criteria Title=Software Engineer and Skill=Object Oriented Programming (5+years of experience)), are analyzed by the Criteria Evaluator 718.

When a Search Criterion is evaluated, it returns a set of partial results consisting of a Target Concept (described below) and a partial score for that Target Concept. The Criteria Evaluator 718 can compute a Constraint Tree that can be given to a Dynamic Query Evaluator 720, which uses the Constraint Tree to compute a set of Target Concepts that match the constraints (for example all the résumés of people who have been a Software Engineer of one form or another). A Constraint Tree can include many different Constraints that span across a graph of Concepts. Each of those Constraints can be evaluated by a Constraint Evaluator 722 that uses an Attribute Index 109 and an Attribute Indexer 724 to determine the set of sub-matching Concept/Value Sets. Those sub-matching Concept or Value Sets are then combined together using the prescribed Boolean logic to arrive at the final set of Target Concepts.

As part of this process, the Criteria Evaluator 718 can stop at some point in an AttributePath to do a score evaluation. For example, the search for Software Engineer résumés may select a set of Work Experience sections of one or more résumés and evaluate the years of experience a candidate has working as a Software Engineer and how recently they worked as a Software Engineer. The implicit score evaluation might require at least 2 years of experience as a Software Engineer and would only give full credit if they worked as a Software Engineer within the last two years. To do this calculation correctly, the Criteria Evaluator 718 may need to sum up the years of experience that the candidate in each position and then base the calculation on the sum of experience. For example, the candidate may have worked as a Software Engineer at three different companies in the last three years, and as such would have 3 years of experience as a Software Engineer.

The partial results for each of the Search Criteria are returned to the Contextual Search Evaluator 714 where the Contextual Search Evaluator 714 can combine the partial scores together to arrive at a final score for each of the Target Concepts. The Contextual Search Evaluator 714 can sort the results based on the score (if that was the chosen sort order), and construct and return 708 a Search Result Set. FIG. 7 is described in more detail below.

1. Fuzzy Queries and Contextual Search

Given that explicit queries can be executed quickly using AttributeIndexes, AttributePathIndexes and the DQAE 316, it is also possible to consider an example where the user wants to find résumés of candidates that have "5+" years of experience with "Object Oriented" Skills. In this case, Bob Smith from the FIG. 5 example has 4¼ years of experience using Java. A recruiter or hiring manager would probably consider Bob Smith to be close enough to 5 years of experience to consider him. However, a recruiter or hiring manager might rank another résumé that has more than 5 years of experience higher. Further, in the example given, Bob Smith had experience with two of the "Object Oriented Programming Language" Skills, but his résumé still may not necessarily reflect the most qualified candidate. There may be another résumé that had all three of the "Object Oriented Programming Language" Skills, which a recruiter may decide represents a more qualified candidate. In addition, there could be other recruiting criteria, such as 7+years of experience with "System Software Management" that further affect which résumés are of most interest to a particular recruiter. These examples illustrate the benefit of performing fuzzy queries.

To address this issue, the system can include a fuzzy query with a Contextual Search. A Contextual Search can be defined by two parts: 1) a search schema (referred to here as a Search-Map 710) that provides the Target Category and a set of Criteria (described in more detail below), and 2) an instance of the search schema that includes CriteriaValues that correspond to the Criteria. A Target Category describes a set of Target Concepts. For example, a Target Category can be a Résumé Category, where Bob Smith's résumé is an example of a Target Concept. A Target Category is not limited though to Categories which represent documents. For example, a Target Category could be a Company Category. In other words, a job seeker might execute a search in which he is trying find Companies that are seeking candidates who have experience with machine learning or information retrieval. Alternatively, a job seeker could search for all of the most common sets of Skills that a company, such as GOOGLE™ is looking in their Software Engineering job openings. In that case the Target Category would be the Skill Category, and a Target Concept might be the Machine Learning Skill.

As stated above, an instance of the search schema for the Contextual Search includes CriteriaValues that correspond to the Criteria. A CriteriaValue can be defined by a tuple including, but not limited to, the following:
- a weight range,
- a weight, which is a function of the weight range,
- a requirement, which can be one of the following:
  REQUIRED
  DESIRED
  UNDESIRED
  INCLUDE
  EXCLUDE
- a value or set of values (only for certain types of CriteriaValues) used to select a set of Target Concepts 2. Contextual Search Criteria The system includes four basic types of Criteria:
FilterCriteria—specifies how the selection of Target Concepts are filtered
IncludeCriteria—specifies a set of Target Concepts that are guaranteed to be included in the result set
ScoreCriteria—specifies how Target Concepts are scored
SearchCriteria—specifies how a subset of Target Concepts are selected and scored Each Criterion can specify a Weight Model that is used to compute the weight of CriteriaValues.

The system includes, but is not limited to, the following hierarchy of Criteria classes:
FilterCriteria
    AdhocFitlerCriteria—specifies that the Target Concepts are filtered using an AdhocConstraint or an AdhocAttributePathConstraint
    CompoundFilterCriteria—specifies how FilterCriteria are combined together—the filter of Target Concept corresponds to a CompoundConstraint
    SetFilterCriteria—specifies that Target Concepts are filtered using a SetConstraint or SetAttributePathConstraint
    SimpleFilterCriteria—specifies that Target Concepts are filtered using a SimpleConstraint or a SimpleAttributePathConstraint
IncludeCriteria
    AdhocIncludeCriteria—specifies that the Target Concepts are included in the result set using an AdhocConstraint or an AdhocAttributePathConstraint
    CompoundIncludeCriteria—specifies how IncludeCriteria are combined together—the inclusion of Target Concept corresponds to a CompoundConstraint
    SetIncludeCriteria—specifies that Target Concepts are included in the result set using a SetConstraint or SetAttributePathConstraint
    SimpleIncludeCriteria—specifies that Target Concepts are included in the result set using a SimpleConstraint or a SimpleAttributePathConstraint
ScoreCriteria—specifies an ScoreEvaluator that computes partial scores for the Target Concepts included in the Contextual Search result set
    CompoundScoreCriteria—specifies how ScoreCriteria are combined together compute partial scores for Target Concepts
    SimpleScoreCriteria—specifies a single ScoreEvaluator that computes partial scores for TargetConcepts
SearchCriteria—specifies a SubPartialEvaluator that computes partial scores for each of the selected Target Concepts, and the weight for the Criteria is a function of the frequency of the Target Concept selected by the Criteria and the total number of Target Concepts in the Target Category.
    AdhocSearchCriteria—specifies that the Target Concepts are selected using an AdhocConstraint or an AdhocAttributePathConstraint.
    CompoundSearchCriteria—specifies how selections and scores from other SearchCriteria can be combined together—the selection of Target Concept corresponds to a CompoundConstraint
    GeoSearchCriteria—specifies that Target Concepts are selected using a GeoConstraint or GeoAttributePathConstraint
    KeywordSearchCriteria—specifies that Target Concepts are selected using a KeywordConstraint or KeywordAttributePathConstraint
    SetSearchCriteria—specifies that Target Concepts are selected using a SetConstraint or SetAttributePathConstraint
    SimpleSearchCriteria—specifies that Target Concepts are selected using a SimpleConstraint or a SimpleAttributePathConstraint Each of the above Criteria can have a corresponding CriteriaValue, which is an instance of the Criteria. A Search Schema can be instantiated by a Contextual Search which is populated with CriteriaValues.

3. Contextual Search Execution

When a Contextual Search is executed, a set of Target Concepts are selected and scored, resulting in a Search Result Set containing a set of Search Results defined by tuple including the Target Concept and a score. For example, if a user is searching for a résumés, the Target Concept would be a Résumé Concept. If a job seeker is searching for a job, a Target Concept would be a Job Concept. FIG. 7 illustrates the steps associated with Contextual Searching.

A Contextual Search query can be executed in a number of steps. Outside of the Contextual Search Engine 314, a user can input a search query via which the system can create 702 a contextual search. In this creation 702 of a Contextual Search, the Contextual Search Engine 314 can map a user's input query, which can include text input strings as well as complete documents, into a structured set of SearchCriteriaValues, ScoreCriteriaValues, IncludeCriteriaValues and FilterCriteriaValues. In this manner, the Engine 314 instantiates a Contextual Search. For each FilterCriteriaValue, the Engine 314 can select a subset of Target Concepts using the FilterCriteriaValue parameters, and compute inclusion and exclusion filter sets by combining the subsets together using SetOperations specified by the FilterCriteriaValues. For each IncludeCriteriaValue, the Engine 314 can select a subset of Target Concepts using the IncludeCriteriaValue parameters and add them to the Search Result Set, applying the inclusion and exclusion filter sets when specified. For each of the SearchCriteriaValues, the Engine 314 can select a subset of Target Concepts using the SearchCriteriaValue parameters, computing a partial score for each of the Target Concepts in the subset, and adding each of the selected Target Concepts to the Search Result Set. For each ScoreCriteriaValue, the Engine 314 can compute a partial score for each of the Target Concepts in the Search Result Set. For each of the SearchCriteriaValues and ScoreCriteriaValues, the Engine 314 can compute the weight of the CriteriaValue. For each of the Target Concepts, The Engine can construct a Search Result and compute the final Search Result Score. The Engine 314 can sort the Search Results based on a user selected set of Criteria, which may or may not include the Search Result Score. These steps are described in more detail below.

a. Query Construction

Figure 8:
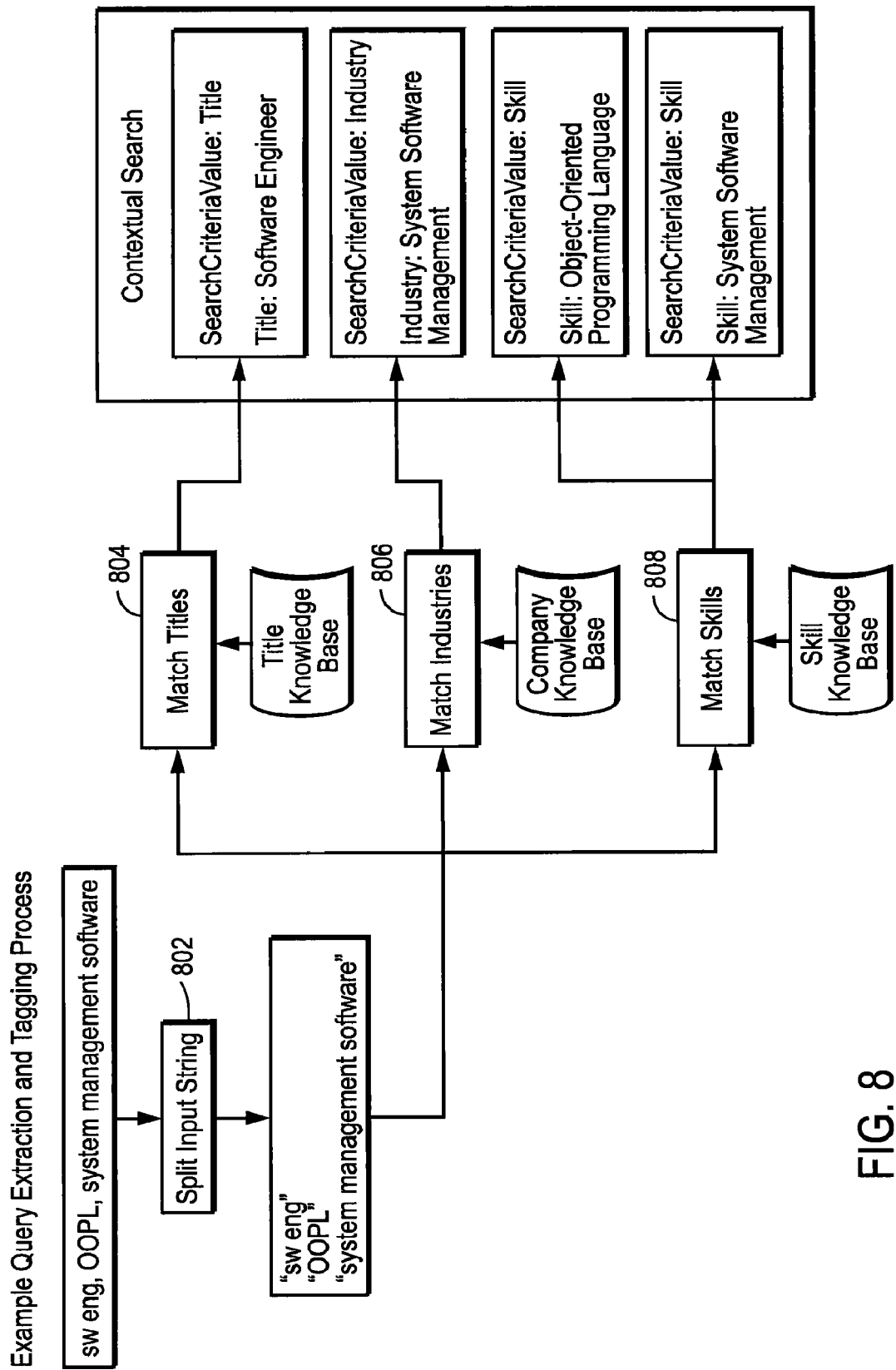
FIG. 8 is a diagram of an example query extraction and tagging process, according to one embodiment of the present invention.
Figure 9A:
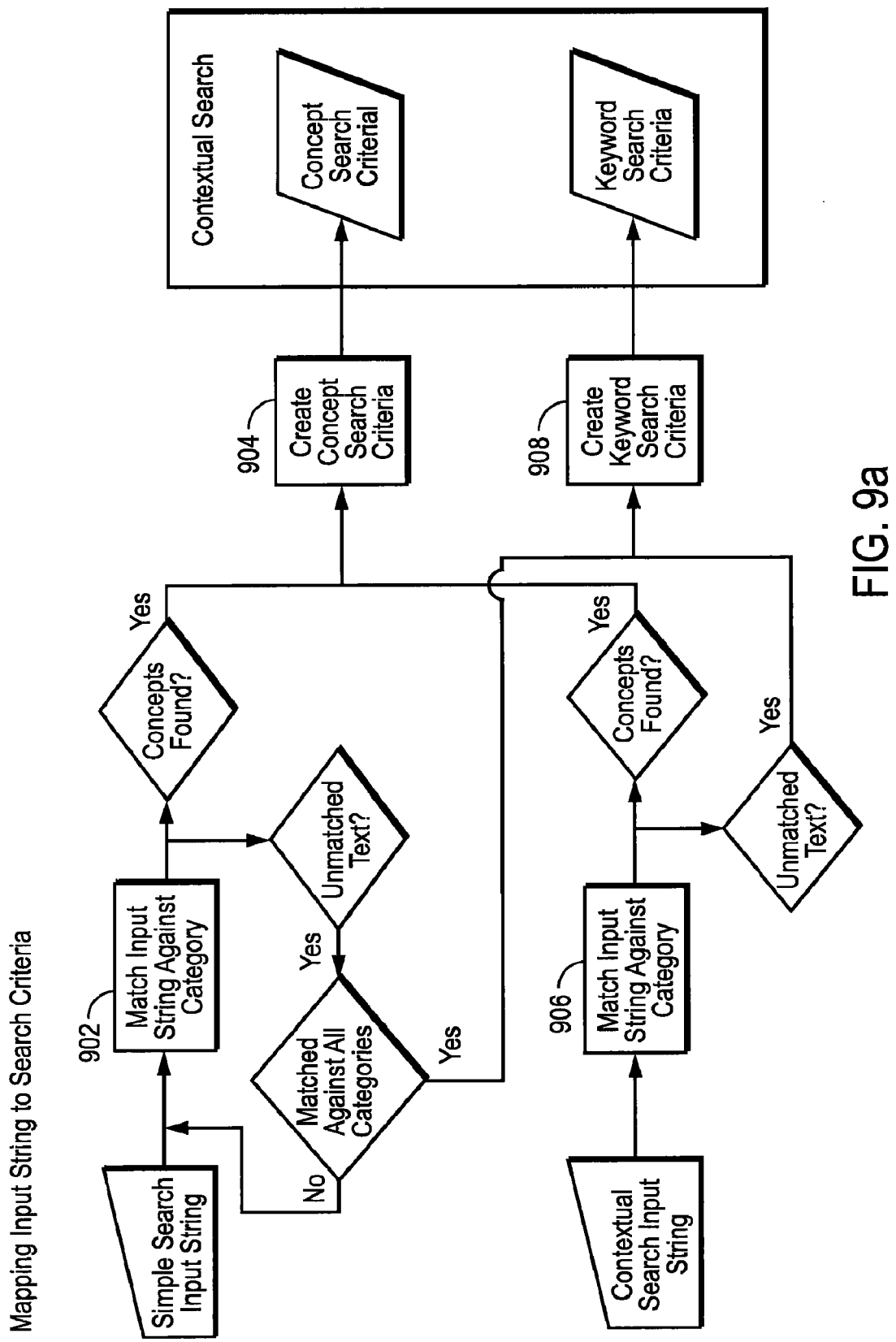
FIG. 9a is a flowchart illustrating mapping of an input string to search criteria, according to one embodiment of the present invention.

When the user inputs a search query for conducting a search via the on-line search system 104, this input query can take numerous forms. The input can include, for example a single input string entered by the user, e.g. a search text entry box on a web page. FIG. 8 illustrates an example query extraction and tagging process in which a single input string is entered by a user to create 702 a Contextual Search. In this example, the input string is "SW eng, OOPL, system management software," which can be split 802 into component parts. For example, the input string of FIG. 8 might be split into the parts "sw eng," and "OOPL," and "system management software." This process for dividing up and processing an input string is described in detail in U.S. patent application Ser. No. 11/253,974, filed on Oct. 18, 2005, entitled "Concept Synonym Matching Engine," the entire disclosure of which is hereby incorporated by reference herein in its entirety for all purposes. The system can match 804 Titles in the input string to a Title Knowledge Base, match 806 Industries in the input string to a Company Knowledge Base, and match 808 Skills in an input string to a Skill Knowledge Base. The system can then use the results of this matching to create 702 a contextual search. In the example of FIG. 8, the system searches for résumés listing a Title of Software Engineer, an Industry of System Software Management, and for Skills of Object-Oriented Programming Language and System Software Management. The mapping of the simple input string to search criteria is also illustrated in FIG. 9a where the string is matched 902 against Categories (e.g., Skill, Title, Industry) and Concepts are found that can then be used to create 904 Concept Search Criteria for execution of the Contextual Search.

The input can also include a set of contextual input strings where each input string has context, e.g. a string corresponding to a school and another to a set of skills. For example, a user might enter "java" in a search box labeled "Title." In that case, the system looks for the word "java" or Concept Java in a person's job title described in a résumé. If the user, on the other hand, entered the word "java" in a search box labeled "Skill," the system searches for the word "java" or the Skill Concept Java in the job description or skills summary section of a résumé. The input can also include a set of contextual input strings where each input string has additional parameters associated with the input string. For example, a user might enter "5+years of Java Programming experience." This translates into searching for the job description paragraphs for Java Skills (which could include skills like J2EE or JMS) and using the time frame associated with that job description to evaluate if the candidate had 5 or more years of experience using the Java Programming Language. The mapping of contextual input strings to search criteria is also illustrated in FIG. 9a. Again, the string is matched 906 against Categories, and Concepts are found that can then be used to create 904 Concept Search Criteria for execution of the Contextual Search.

Where there is unmatched text regarding either the simple or contextual input string, the system checks to see if the input string was matched against all categories. If not, the string is matched against categories that it was not previously matched against. If the input string was matched against all categories, the system then creates 908 Keyword Search Criteria for execution of a Contextual Search. A Keyword Search Criteria is similar to a Concept Search Criteria in that it is used to select Target Concepts; however, a Keyword Search Criteria selects Target Concepts that have been indexed using keywords; whereas, the Concept Search Criteria selects Target Concepts that have been "tagged" with Concepts. An example of Keyword Search Criteria might be "software engineer." Using this Criterion, the system can find résumés that explicitly use the words "software" and "engineer." Further, if the Keyword Search Criteria contained quotes around the words "software engineer" then résumés that had the word "software" followed by "engineer" would be selected. If on the other hand a Concept Search Criteria was constructed using the concept Title: Software Engineer, résumés could be selected that describe titles that might include "software engineer," "software developer," "computer programmer," "web developer," "java architect," or even "sw eng."

Figure 10:
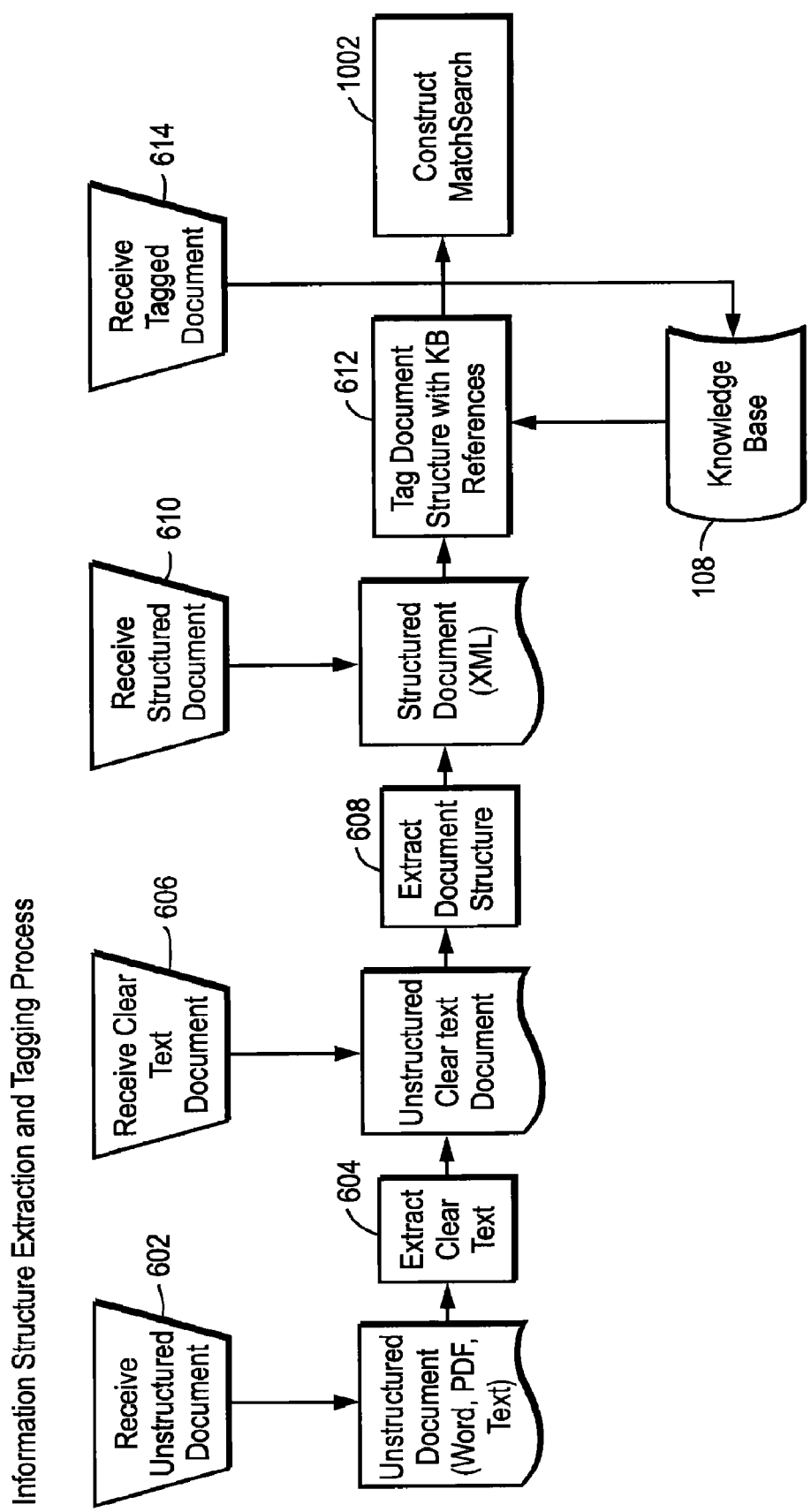
FIG. 10 is a flowchart illustrating extraction of a query to construct a search, according to one embodiment of the present invention.

In addition to input strings, the input for constructing a search can also be a document, such as a plain text document, a structured text document, a structured information object that has been indexed into a Knowledge Base 108, and so forth. This information extraction and tagging of a document as input is illustrated in FIG. 10 and is generally the same as the process described above regarding FIG. 6, where the system received 602, 606, 610 an unstructured document, a clear text document or a structured document which was tagged 612 with Knowledge Base 108 references and indexed 616. Similarly, the same extractions 604, 608, and tagging 612 processes can be used to instead construct 1002 a search, which in this case is a Contextual Match Search, rather than a Contextual Search. Contextual Match Searches are described in detail below regarding the Contextual Match Engine.

b. Selection of Target Concepts

As explained above, the Engine 314 can select subsets of Target Concepts (e.g., a subset for each FilterCriteriaValue using the FilterCriteriaValue parameters, a subset for each IncludeCriteriaValue using the IncludeCriteriaValue parameters, and a subset for each of the SearchCriteriaValues using the SearchCriteriaValue parameters). In some embodiments, in each of the selection steps, the Contextual Search Manager 712 of Engine 314 manages the process by using a Constraint Tree to construct queries that select subsets of Target Concepts. The Search Schema (referred to here as a SearchMap 710), as specified by the Criteria, can define how the Constraint Tree is constructed by defining Target AttributePaths, where the base Category of the Target AttributePath must always be the Target Category. The Constraint Tree can have arbitrary levels of depth and can constrain a search across any AttributePath so long as the AttributePath is valid and the base Category of the AttributePath is the Target Category for the search.

c. Computing Partial Scores—Evaluators

As stated above, the Contextual Search Engine 314 can include a Criteria Evaluator 718 as the general mechanism for computing a partial score for a CriteriaValue. An Evaluator can be defined as any function that takes as input a Target Value and produces an output in a fixed range, such as a range of 0.0 to 1.0, inclusively, i.e. pst=f(vt) where f(vt) is and element of {0.0 . . . 1.0}. A Target Value is a Value that is associated with a Target Concept. For example, Bob Smith's Résumé might state that he worked for Universal Studios for 2 years where he used the "Java" skill. In this example, Bob Smith's Résumé is a Target Concept, and the Universal Studios and 2 years of experience are both Target Values, as well as the Java Skill, each of which can be individually "evaluated" using one or more Evaluators. For example, the 2 years of experience at Universal Studios could be "evaluated" against a preference for candidates who have worked in positions for 4 years. The 2 years of experience using Java could be evaluated against a Criterion of 3+years of Object Oriented Programming experience.

An example embodiment of an Evaluator is a CurveFunction. A CurveFunction can be defined by a set of piece wise contiguous Bezier Curves (for an explanation of Bezier Curves, see Paul Bourke, Bézier Curves, April 1989 (updated December 1996) at http://astronomy.swin.edu.au/~pbourke/curves/bezier/ or see the Wikipedia entry for Bezier Curves at http://en.wikipedia.org/wiki/Bezier_curve, both of which are hereby incorporated by reference herein in their entireties for all purposes) or other curve functions, such as those similar to Bezier Curves. The Bezier Curves can be defined in an X-Y coordinate space where the X coordinate corresponds to the input value and the Y coordinate is the partial score. The Y Coordinate space can be scaled to a value range, such as from 0.0 to 1.0. A fast implementation of the CurveFunction divides the X dimension equidistant slices and computes the Y value for each edge of the slice. Y values can be linearly interpolated for X values that fall between the two edges of a slice. The result of this operation is a piece-wise linear curve.

Figure 9B:
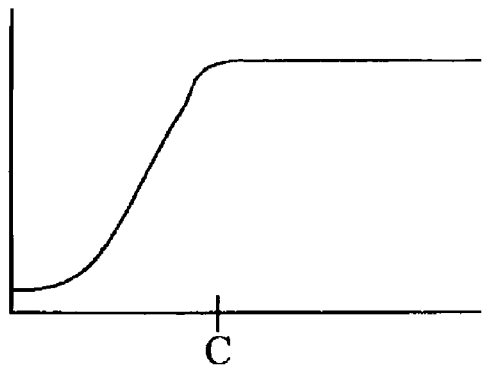
FIG. 9b. is a diagram illustrating CurveFunctions used by the system, according to one embodiment of the present invention.
Figure 9B:
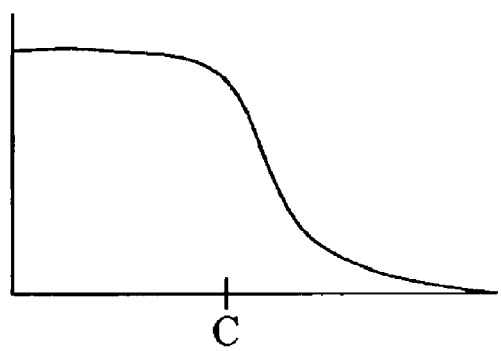
Figure 9B:
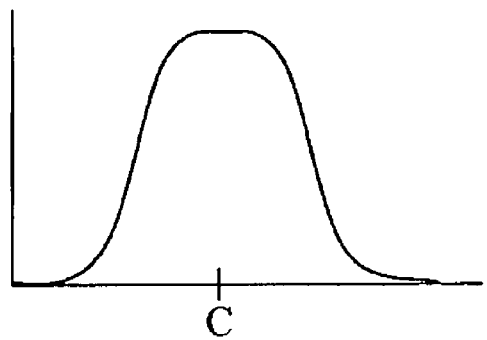
Figure 9B:
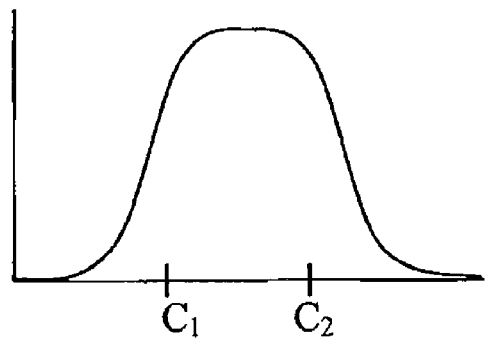

A CurveFunction can be configured to represent a wide range of continuous functions that are defined by the designers of the search function. Examples include, but are not limited to, the Evaluator functions shown in FIG. 9*b*.

A CurveFunction can be constructed based on input parameters where the input space maps directly to the X Coordinates of a CurveFunction. Alternatively, the input space can be normalized based on a reference value (e.g. C), or values, (e.g. C1 and C2). In this case, the X value is mapped into a normalized input space using a normalization function, N(x,C).

With this mechanism criteria such as "x>5" are no longer binary constraints, but rather fuzzy constraints. For example, if we have a constraint such as "x>5" a value of "4" might have a score of 0.7 instead of 0.0.

A CurveFunction is one example of an Evaluator. The system allows for an arbitrary specification of Evaluator functions through an extension mechanism.

d. ScoreEvaluators

Each Criterion can specify a Weight Model that is used to compute the weight of CriteriaValues. In some embodiments, the Criteria Evaluator 718 described above includes a ScoreEvaluator 740 that computes a partial score for all Target Concepts in the Search Result Set. The ScoreCriteria (described above) can use the ScoreEvaluator 740 to compute partial scores. The ScoreEvaluator 740 can define a Target AttributePath that is used to select values that correspond to a Target Concept, and an Evaluator function (as described above) that evaluates the Target Values and computes a partial score. A ScoreCriteria may define one or more ScoreEvaluators for a given ScoreCriteriaValue. Multiple partial scores can be combined together to produce a single partial score using one of the following methods: 1) weighted average, 2) average, 3) geometric mean, 4) weighted geometric mean, 5) product of the partial scores, or 6) an application defined score combining method.

As one example of how a ScoreEvaluator 740 can work, a search may define a ScoreCriteria that evaluates the years of experience of a candidate as demonstrated by a person's résumé. A job requisition may have a ScoreCriteria indicating a preference for a candidate having 5 to 7 years of experience. Rather than excluding candidates that have 4 or 8 years of experience, the system can give them less "credit", i.e. a lower score for that Criteria. In this fashion, the preference for 5 to 7 years of experience is not used as selection criteria, i.e. not used to select a candidate just because he has 5 to 7 years of experience. Rather, it is used to evaluate candidates that meet other Criteria. A ScoreEvaluator is used to evaluate how many years of experience a candidate has relative to the requirement of 5 to 7 years. So a candidate with 6 years of experience might receive a partial score for this Criterion of 1.0. However, and candidate with 4 years of experience might get a partial score of 0.75, and so forth.

e. SubPartialEvaluators

The Criteria Evaluator 718 includes a SubPartialEvaluator 742 that computes a partial score for Target Concepts selected by a SearchCriteria. SubPartialEvaluators 742 can be defined by a function that takes as input Values defined by one or more Attributes or AttributePaths from the Target Category, and compute a partial score based on those values. A useful class of functions called degree of match functions are defined in more detail below.

An example of a SubPartialEvaluator 742 is a SubsumptionEvaluator. A SubsumptionEvaluator can compute "how much" of an Evaluation Concept a Target Concept has—for example, "how much Object Oriented Programming Language Skills does a résumé have?" To perform this evaluation, a SubsumptionEvaluator can compute a similarity measure between 0.0 and 1.0 by computing the normalized dot product of a basis vector B and target vector T, $$ps=(B \cdot T)/(\|B\| \|T\|)$$

where

1. The components of the basis vector are determined by the transitive closure of the Evaluation Concept as constrained by an AttributePath that passes through a primary constraining AttributePathElement. For example, using the KB Schema defined in FIG. 4 and the example give in FIG. 5, a SubsuptionEvaluator's basis vector can be defined by the following AttributePath:
   SkillKB.Skill.RésuméSkills.Skill.Parents*
2. The length of each of the basis vector components are computed by a weight function that takes as input the partial frequency of the Subsumed Evaluation Concept as constrained by an AttributePath, and the total frequency of the primary constraining AttributePathElement in the AttributePath (an example weight function is frequency which is computed by the log of the partial frequency divided by the log of the total frequency). For example, the partial frequency can be specified by the following AttributePath, RésuméKB.Résumé.RésuméSkills.Skill where the Target Category is RésuméKB.Résumé

3. The components of the target vector are determine by values selected along an AttributePath that has transitivity through the primary constraining AttributePathElement, for example RésuméKB.Résumé.RésuméSkills.Skill.Parents* where the Target Category is RésuméKB.Résumé

4. The length of each of the target vector components for which there is a value is set to 1.0

Figure 11A:
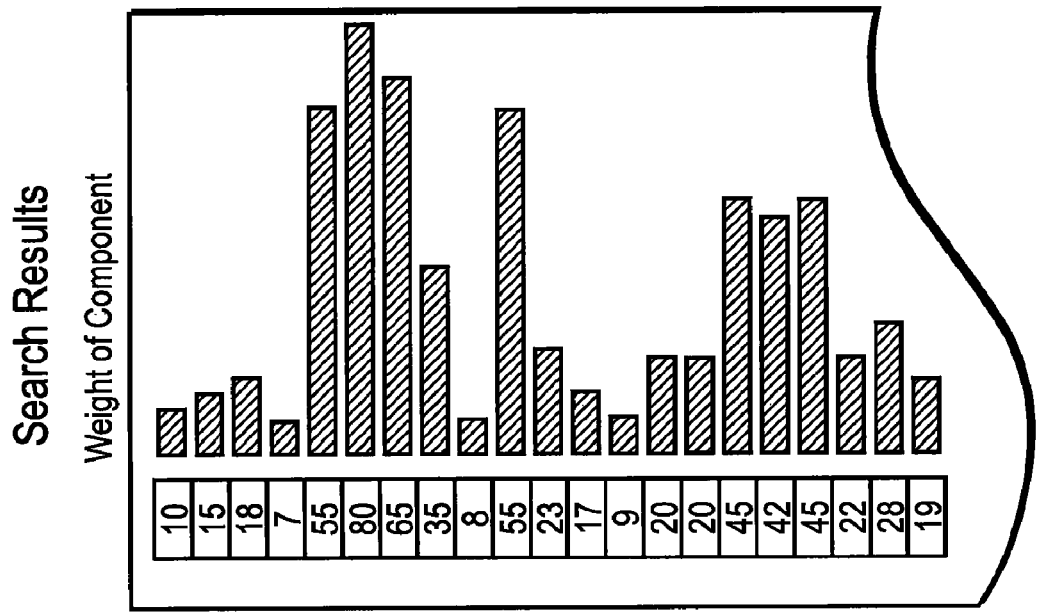
FIG. 11a is a high-level block diagram illustrating a search query example showing the weight of the query components, according to one embodiment of the present invention.
Figure 11A:
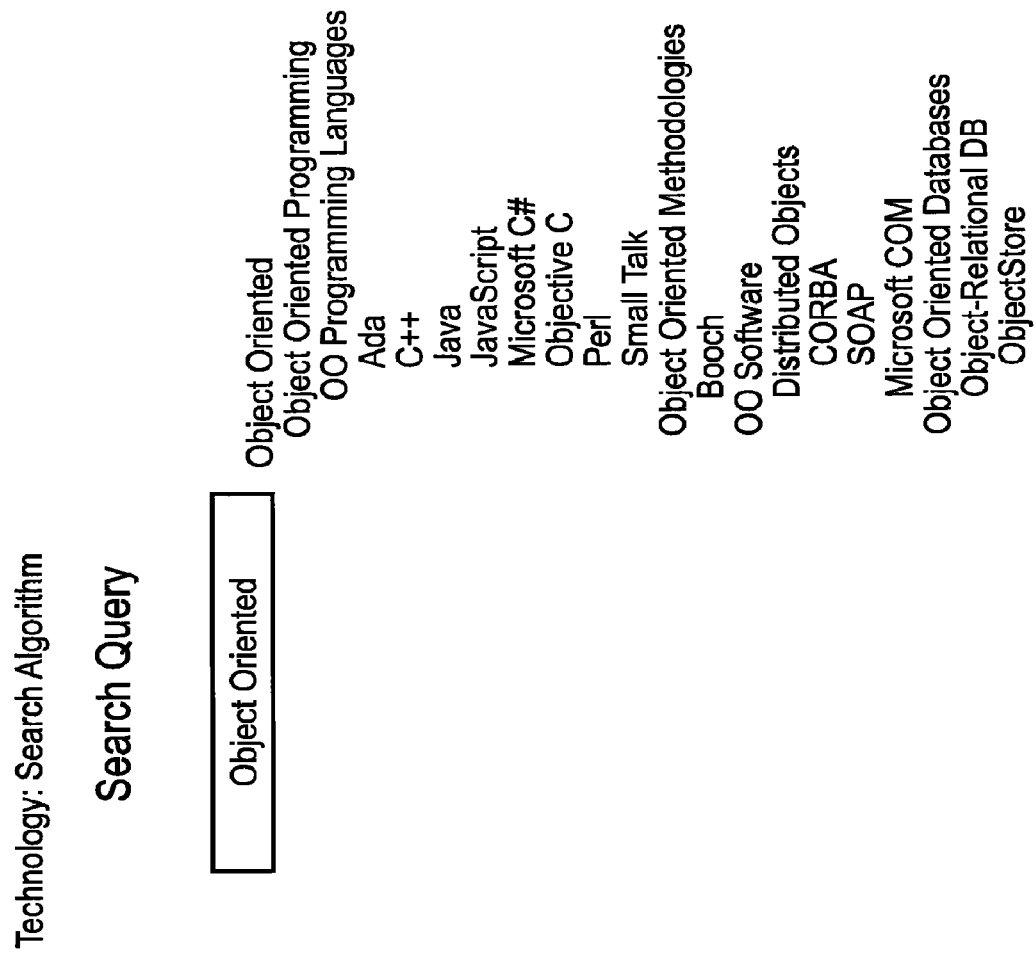
Figure 11B:
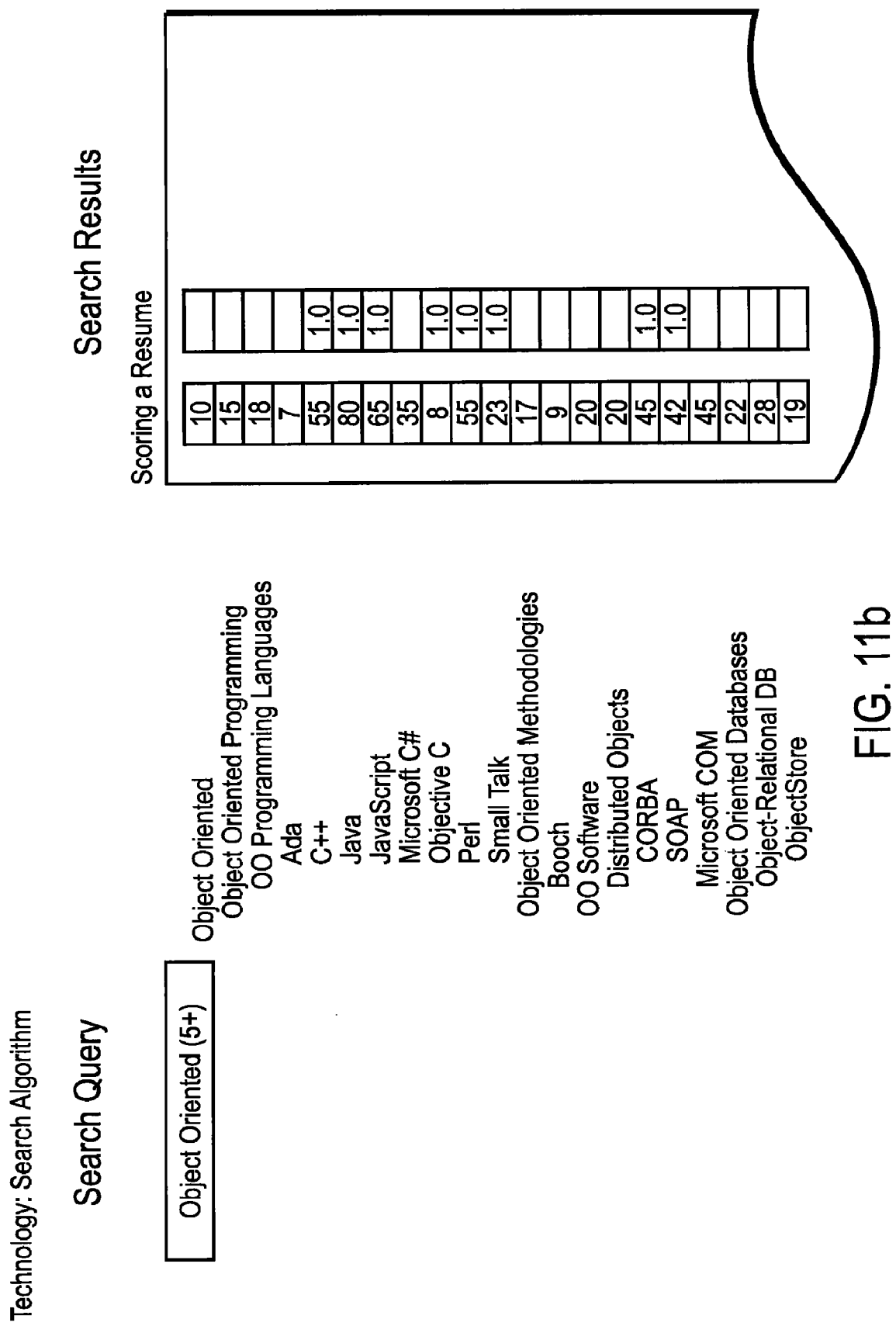
FIG. 11b is a high-level block diagram illustrating a search query example showing the scoring of a résumé, according to one embodiment of the present invention.

An example of the basis vector for the input parameter "Object Oriented" is illustrated in FIG. 11a, showing the search results including the weight of each component associated with the input parameter. An example of both the basis vector and target vector for evaluating a résumé is illustrated in FIG. 11b. The weight of each component of the similarity vector used by the SubPartialEvaluators can be based on any of the weight models used to compute the Search Criteria weight, as described below, including 1) log frequency, 2) log inverse frequency, 3) linear frequency, 4) fuzzy frequency, and 5) fuzzy inverse frequency. For example, when conducting a search for "Object Oriented," the indexes 109 can be used to select all of the resumes with RésuméSkills that have the Skill Object Oriented or its children. FIG. 11a illustrates the basis vector for each of the Skills including the weights for each of these components or rows of the vector. For example, the weight for the Skill C++ in FIG. 11a is 0.55, while the weight for Objective C is 0.08. The weight for Object Oriented can be computed by inverse document frequency, meaning that the fewer if the documents that include Object Oriented, the higher the weight for that skill. However, when computing the weight for the Skills that are children of Object Oriented (e.g., Java, C++, etc.), these can be computed by frequency, so the more frequent the skill is, the higher the weight. For example, if more resumes include C++, which is likely at important skill (i.e., if most resumes list the skill, it is probably a desired skill to have), whereas if only a few resumes have Objective C, which is probably a less desired skill. As shown in FIG. 11b, the search conducted returns a resume, and the Figure illustrates the scoring for that resume. The resume of FIG. 11b includes 8 of the RésuméSkills, including C++, Java, JavaScript, etc. (each row of the vector listing a 1.0 for the corresponding RésuméSkill). A weight of 1.0 is assigned to each of the skills present on the resume. For each resume, the system can calculate a number of these vectors (e.g., corresponding to different skills, titles, etc.). The scoring of the resume showing degree of match is illustrated below regarding FIGS. 15a and 15b.

f. Scoring Not Available Values

In some cases, the Target Concept might not have any value upon which a score can be computed. In these cases, each CriteriaValue has a default NotAvailableScore that describes the score when no Target Value is available for that CriteriaValue.

g. Computing SearchCriteriaValue and ScoreCriteriaValue Weights

The weight of each SearchCriteriaValue can be computed by a variety of methods, including, but not limited to, 1) log frequency—the log of the frequency of Target Concepts matching the selection criteria divided by the log of the total number of Target Concepts, 2) log inverse frequency—the log of the total number of Target Concepts divided by the number of Target Concepts matching the selection criteria divided by the log of the total number of Target Concepts, 3) linear frequency—the ratio of the number of Target Concepts matching the selection criteria divided by the total number of Target Concepts, 4) fuzzy frequency—the log of the partial scores of all the Target Concepts for the given Search Criteria (where the score is a number between 0.0 and 1.0) divided by the log of the total number of Target Concepts, and 5) fuzzy inverse frequency—the log of the total number of Target Concepts divided by the sum of the partial scores of all the Target Concepts for the given search criteria (where the score is a number between 0.0 and 1.0) divided by the log of the total number of Target Concepts.

The weight of each ScoreCriteriaValue can be computed using either fuzzy frequency or fuzzy inverse frequency. In addition, the ScoreCriteriaValue weight can be computed based on the weights of other CriteriaValues using one of the following Weight Models: scalar (where the value is a fixed value), geometric mean, average, median, max, or min.

h. Using Weight Ranges to Scale and Translate Weights

The Contextual Search Engine can also scale and translate weights based on a Weight Range. A Weight Range is defined by a minimum weight value, $wr_{min}$, and maximum weight value, $wr_{max}$, where $0.0 < wr_{min} < wr_{max} < 1.0$. The weight transformation function is defined as $$w'f(=w, wr_{min}, wr_{max}) = wr_{min} + (w*(wr_{max} - wr_{min}))$$

An application can define an arbitrary number of Weight Ranges, where the Weight Ranges correlate to the level of "importance" of the CriteriaValue. An example embodiment might define a set of Weight Range values as the following shown in Table 1:

TABLE 1

| Label | Icon | $Wr_{min}$ | $Wr_{max}$ |
|---|---|---|---|
| Extremely Important | ☺★★★★★ | 0.8 | 1.0 |
| Very Important | ☺★★★★☆ | 0.6 | 0.8 |
| Important | ☺★★★☆☆ | 0.4 | 0.6 |
| Somewhat Important | ☺★★☆☆☆ | 0.2 | 0.4 |
| Not Important | ☺★☆☆☆☆ | 0.0 | 0.2 |

An application can present these options to a user and allow them to select the level of importance for each of the CriteriaValues, thereby transforming the weight associated with that CriteriaValue. The result of this transformation is to provide more emphasis on the certain CriteriaValues, overriding the internal weight calculation determined by the collection of documents or Target Concepts.

i. Scaling Desired Weights

In some cases the weights and scores of the DESIRED and UNDESIRED CriteriaValues may outweigh the REQUIRED CriteriaValues. If this behavior is undesirable, the system provides a MaxNonRequiredWeightRatio that specifies the maximum ratio of the sum of the DESIRED and UNDESIRED CriteriaValue weights to the sum of the REQUIRED CriteriaValue weights. If this ratio exceeds the MaxNonRequiredWeightRatio, then the DESIRED and UNDESIRED CriteriaValue weights are scaled proportionally such that the ratio is equal to the MaxNonRequiredWeightRatio.

j. Computing Search Result Scores

When a Contextual Search is executed 706, certain types of CriteriaValues can be used a select a set of Target Concepts, while other CriteriaValues are used to score Target Concepts, producing a set of partial result tuples including a Target Concept and a partial score with a value from 0.0 to 1.0.

By defining each partial result as having a partial score, each CriteriaValue can define a fuzzy set of Target Concepts.

For each Target Concept, a score can be computed as a function of the weight, requirement and partial score of each of the CriteriaValues: STC=f({(wc,rc,psc)}). This function is called a Score Integration Function. An example of the function to produce the score of a Target Concept is as follows:

$$(\Sigma^{RI} w_i ps_i + \Sigma^D w_i ps_i - \Sigma^U w_i ps_i)/(\Sigma^{RI} w_i + \Sigma^D w_i ps_i + \Sigma^U w_i ps_i)$$

where $\Sigma^{RI}$ is the sum over all REQUIRED and INCLUDE Criteria, $\Sigma^D$ is the sum over all DESIRED Criteria, and $\Sigma^U$ is the sum over all UNDESIRED Criteria, and where both $w_i$ and $ps_i$ are defined by the corresponding Criteria used. In addition, Criteria can be grouped together into Criteria-Groups. CriteriaGroups can be combined together to form a hierarchy of Criteria. Correspondingly, CriteriaValues can be grouped together using CriteriaGroups. In this case, the score for each Target Concept becomes a function of the weight of each of the CriteriaGroups and the partial score of the CriteriaGroup, where the weight and the partial score is a function of the weights and the partial scores of each of the CriteriaValues and/or CriteriaGroups contained in the CriteriaGroup: $S_{TC}=f(\{f(w_c,r_c,ps_c)_{cg}\})$. An example embodiment of the function to produce the score of a Target Concept when using Criteria Groups is as follows:

$$(\Sigma^{RI} w_i ps_i + \Sigma^D w_i ps_i - \Sigma^U w_i ps_i)/(\Sigma^{RI} w_i + \Sigma^D w_i ps_i + \Sigma^U w_i ps_i)$$

where $\Sigma^{RI}$ is the sum over all REQUIRED and INCLUDE Criteria Groups, $\Sigma^D$ is the sum over all DESIRED Criteria Groups, and $\Sigma^D$ is the sum over all the UNDESIRED Criteria Groups, and where $w_i$ is a function of the Criteria in the Criteria Group (for example, the weighted average of the weights), and where $ps_i$, the partial score of the Criteria Group, is computed by the using the following formula for all the Criteria in the Criteria Group:

$$(\Sigma^{RI} w_i ps_i + \Sigma^D w_i ps_i - \Sigma^U w_i ps_i)/(\Sigma^{RI} w_i + \Sigma^D w_i ps_i + \Sigma^U w_i ps_i)$$

where $\Sigma^{RI}$ is the sum over all REQUIRED and INCLUDE Criteria in the Criteria Group, $\Sigma^D$ is the sum over all DESIRED Criteria in the Criteria Group, and $\Sigma^U$ is the sum over all UNDESIRED Criteria in the Criteria Group, and where both $w_i$ and $ps_i$ are defined by the corresponding Criteria used. Note that it is also possible for Criteria Groups to be nested inside of other Criteria Groups, forming a hierarchy of Criteria Groups. One example of how Criteria Groups can be used is where a search is conducted for candidates having skills in usage of various types of tools that are very similar in nature, creating a long list of tools that might drown out other important skills in the search. For example, a search could be conducted for a person with skills in MS WORD®, MS EXCEL®, MS VISIO®, MS OUTLOOK®, and so forth in a long search string that also includes a desired skill of experience in patent prosecution, which could potentially be overwhelmed by the long list of office software skills. To manage this, the system can group the Criteria relating to office skills into a Criteria Group to be considered in a more balanced manner with the patent prosecution skills. The candidate can still be evaluated based on each of the office skills within the Criteria Group, but these office skills are grouped together so that they will not drown out the other skills in the list.

k. Sorting Search Results

Search Results can be sorted by comparing the Search Result Total Score (as described above) or another Attribute value of a Target Concept in either ascending or descending order. In the case where the Search Result Set is sorted by the Total Score, and the Total Score of two Search Results are equal, a secondary scoring method can be used to compute a secondary score. The preferred secondary scoring method is to convert all DESIRED CriteriaValues into REQUIRED CriteriaValues and recomputed the score. If these two values, or two values of an Attribute, are equal, then a chain of Attributes can be used to sub-sort two Target Concepts. For example, if two scores are equal, the DateReceived Attribute can be used to sort the most recent documents first.

C. Contextual Match Engine

Figure 12:
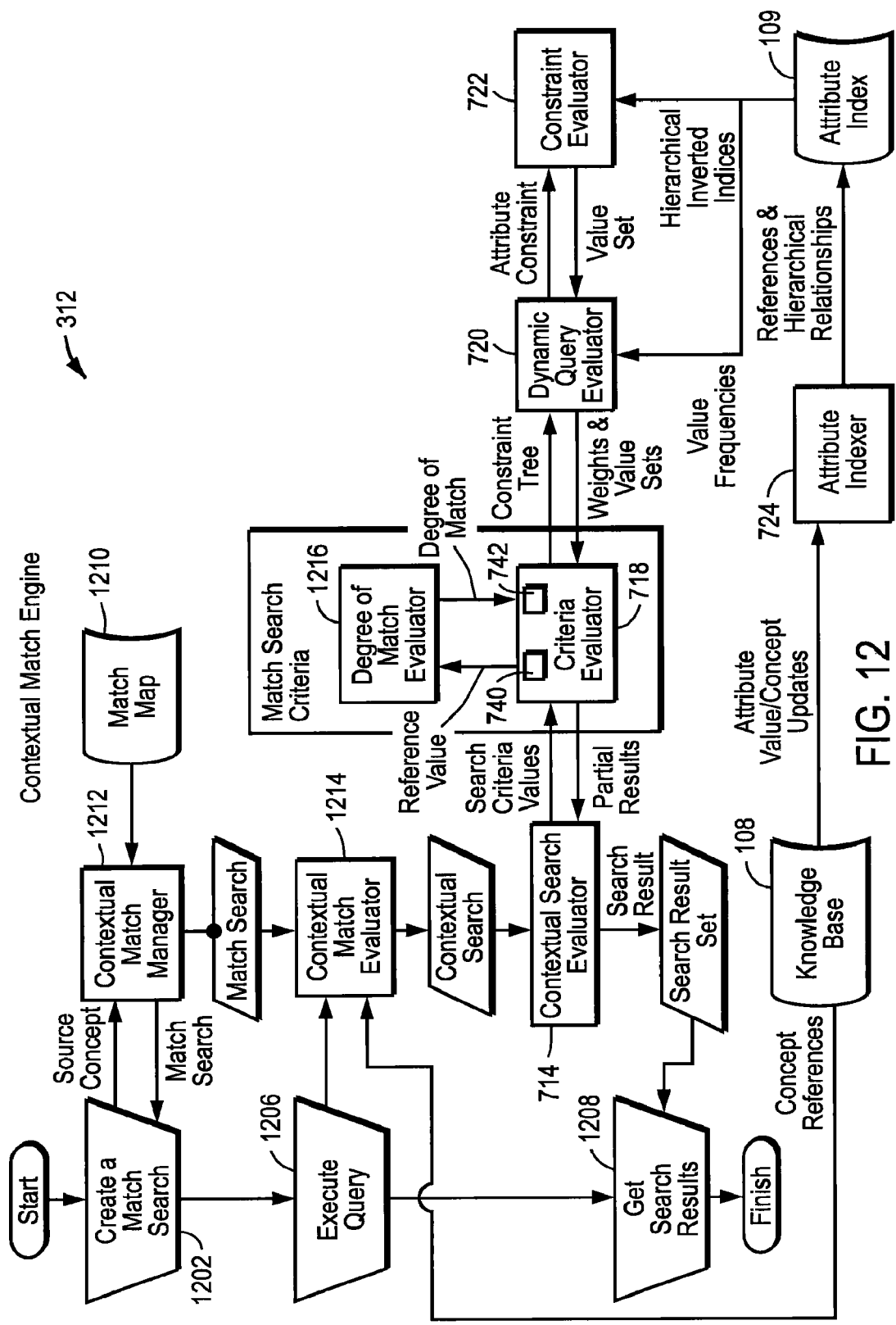
FIG. 12 is a diagram illustrating the Contextual Match Engine components and processes, according to one embodiment of the present invention.

Referring now to FIG. 12, there is shown a diagram of the Contextual Match Engine 312, according to an embodiment of the invention. The Contextual Match Engine 312 includes a Contextual Match Manager 1212, a Match Map 1210, a Contextual Match Evaluator 1214, a Degree of Match Evaluator 1216, and the Engine 312 also uses components shown in FIG. 7, including the Contextual Search Evaluator 714, the Criteria Evaluator 718 (includes a ScoreEvaluator 740 and a SubPartialEvaluator 742) the Dynamic Query Evaluator 720, the Constraint Evaluator 722, the Attribute Indexer 724, and the Attribute Index 109. These components and their functions are described in more detail below.

The components of FIG. 12 function generally in a manner similar to the components shown in FIG. 7 for the Contextual Search Engine 314, with a few differences. In the above example of the Contextual Search, the input of a Contextual Search can be specified by a user's input, such as an input string entered by a user during run time. There are cases, however, where the input can include an entire document, for example a job requisition, which can be persisted. Where the input is a document rather than a search string, the search constructed 1202 is called a Contextual Match Search. In this case, the document, such as a job requisition, can be parsed and analyzed to construct a query to find other documents, such as résumés. Further, with a Contextual Search the Search Criteria Values are provided by the user at run time, whereas with a Contextual Match Search the search is relative to a document or persistent concept structure—the Concept structure is traversed to generate Search Criteria using the values of the persistent concept structure. For example, if a set of skill requirements is extracted from a job requisition, those skill concepts, could be stored along with their associated years of experience and criteria requirements (e.g. desired, required, undesired, etc.) in the Requisition Knowledge Base. Then at a later time, a user may execute a search relative to the Job Requisition. At that time, we would examine the skills that had previously been extracted from the Job Requisition and construct Search Criteria. Those Search Criteria would then be "executed" to return a set of Résumés that have been scored against the Search Criteria.

As shown in FIG. 12, a Contextual Match Search is created 1202 using the Contextual Match Manager 1212, where the search is defined by a MatchMap 1210. The MatchMap 1210 can extract information from a Requisition KB (shown in FIG. 13, described below) to construct a query. The Contextual Match Search is executed 1206 by the Contextual Match Evaluator 1214. From this point, a Contextual Search can be conducted by the Contextual Search Evaluator 714, as described regarding FIG. 7. The Search Criteria are analyzed by the Criteria Evaluator 718 to return a set of partial results including a Target Concept and a partial score for that Target Concept. The Criteria Evaluator 718 can compute a Constraint Tree that is used to compute a set of Target Concepts that match the constraints, and each of those Constraints can be evaluated by a Constraint Evaluator 722 that uses an Attribute Index 109 and an Attribute Indexer 724 to determine the set of sub-matching Concept/Value Sets. In addition, the system 312 can include a degree of match evaluator 1216 that can receive a Reference Concept (e.g., employment years). For example, the user could be searching for resumes listing 5+years of experience as a software engineer, and the Degree of Match Evaluator 1216 can extract this value of 5+years and construct a curve (described above), and then can pull values from the Target, such as years of experience at a particular company with a particular title. The Evaluator 1216 can add up years of experience at company with that title and do a final degree of match calculation (described below). The rest of the process shown in FIG. 12 continues as shown in FIG. 7, including the score evaluation, combination of partial scores to get a final score for each of the Target Concepts, sorting of the results based on score, and returning 1208 a Search Result Set. Those sub-matching Concept or Value Sets are then combined together using the prescribed Boolean logic to arrive at the final set of Target Concepts.

The extraction of a query to construct a Contextual Match Search is illustrated in FIG. 10, according to an embodiment. This general process of receiving 602, 606, 610 a document (unstructured, clear text, structured, etc.) and extracting 604, 608 (where necessary) and tagging 612 the document with Knowledge Base 108 references to extract a query is similar to the as the process illustrated in FIG. 6 for indexing 616 of Knowledge Base 108 references. However, when extracting a query from a document, the resulting concept structure does not necessarily need to be indexed. Rather, the concept structure is used to construct 1002 a Contextual Match Search. This process of extracting structure and tagging a document is described in detail below. The end result of the extraction process is a set of Concepts inserted into and linked together in a Knowledge Base 108.

Figure 13:
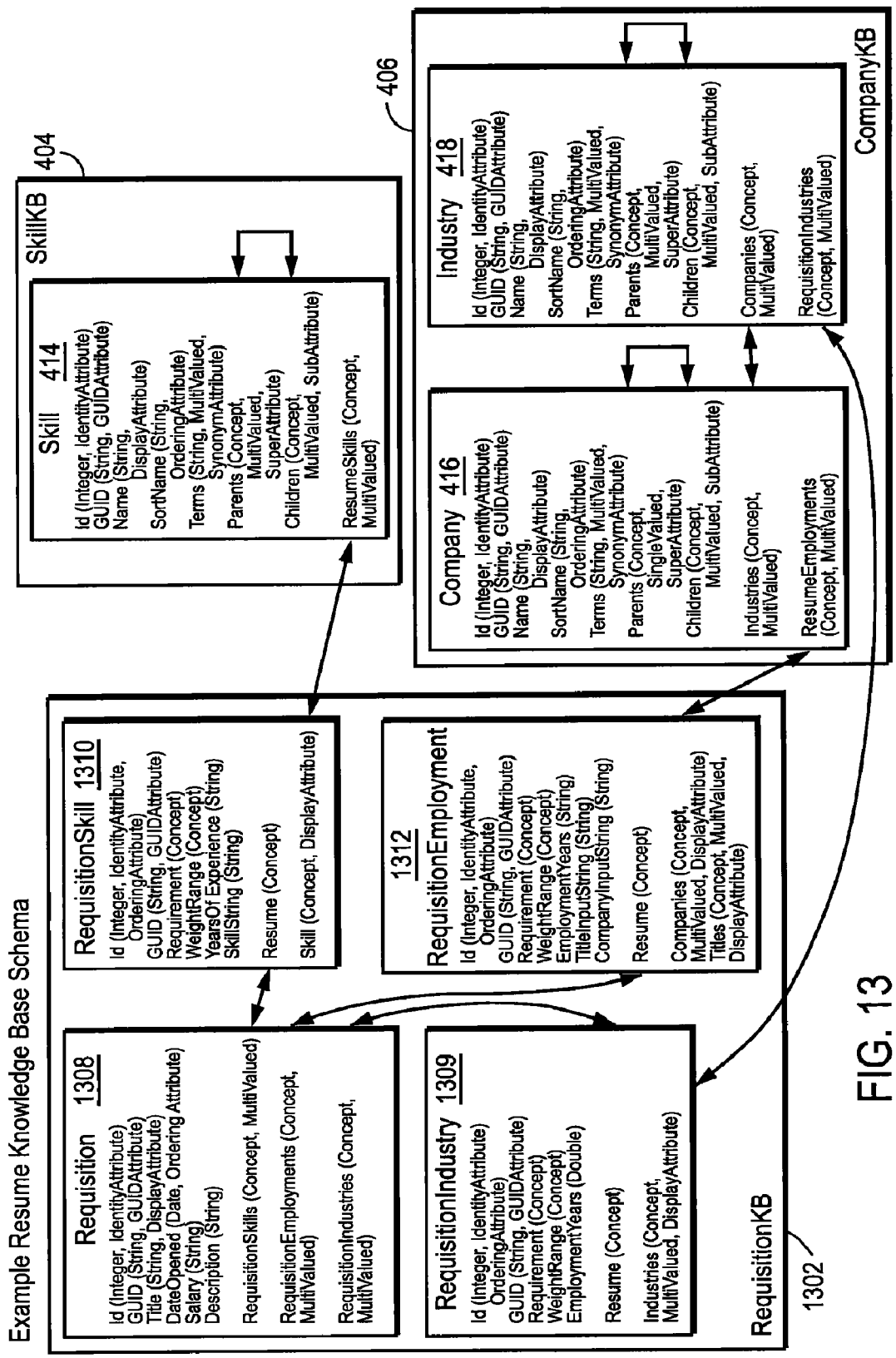
FIG. 13 is a diagram illustrating an example requisition knowledge base schema, according to one embodiment of the present invention.
Figure 14:
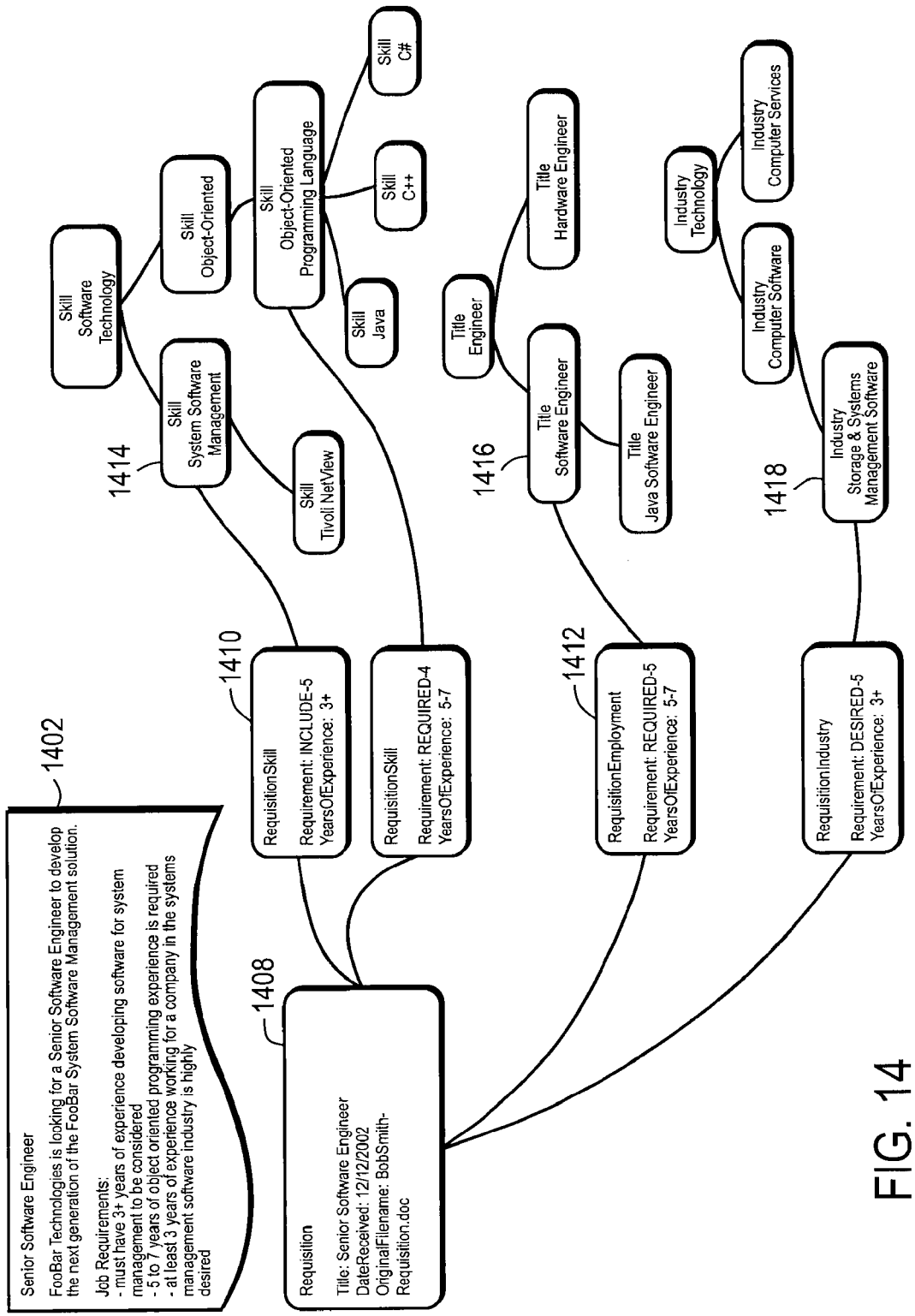
FIG. 14 is a diagram illustrating an example requisition knowledge base instance, according to one embodiment of the present invention.

An example Knowledge Base Schema for a Job Requisition KnowledgeBase is illustrated in FIG. 13. Similar to the example Knowledge Base Schema of FIG. 4, this Job Requisition Knowledge Base Schema illustrates a RequisitionKB 1302, a SkillKB 404, and a Company KB 406, along with various Categories. In this example, the RequisitionKB 1302 includes the Requisition Category 1308, the RequisitionSkill Category 1310, the RequisitionIndustry Category 1309, and the RequisitionEmployment Category 1312. The SkillKB 404 includes the Skill Category 414, and the CompanyKB 406 includes the Company Category 416 and the Industry Category 418. Using this Job Requisition KB Schema, it is possible to take a Requisition, such as the following Requisition, and convert it into an instance of the Requisition Knowledge Base:

Senior Software Engineer
FooBar Technologies is looking for a Senior Software Engineer to develop the next generation of the FooBar System Software Management solution.
Job Requirements:
must have 3+years of experience developing software for system management to be considered
5 to 7 years of object oriented programming experience is required
at least 3 years of experience working for a company in the systems management software industry is highly desired FIG. 14 illustrates an example of this Job Requisition instantiated in the Requisition KB, similar to the example Knowledge Base instance of FIG. 5, associated with Bob Smith's résumé. The process for extracting this KB structure is discussed below. FIG. 14 also illustrates the three KB schemas, including the RésuméKB 402, the SkillKB 404, and the Company KB 406. The fragment of the Senior Software Engineer Requisition shown above is also included in FIG. 5 as a requisition fragment 1402. This example shows that under the Requisition Concept 1408 (an instantiation of the Requisition Category 1308) the Title Attribute is "Senior Software Engineer," the name of the job title stated on the requisition. Similarly, there are various RequisitionSkill Concepts 1410 (instantiations of RésuméSkill Categories 1310) representing the different Skills requirements, including "System Software Management" and "Object-Oriented Programming Language" Skills. The RequisitionEmployment Concepts 1412 reference Title Concepts 1416, including the Title "Software Engineer." Similarly, the RequisitionIndustry Concepts 1409 references Industry Concepts 1418, including "Storage & Systems Management Software."

1. Contextual Match Search

The system enables a Contextual Match Search using a match schema (also defined as a MatchMap 1210 in FIG. 12), and takes as input a reference concept. A Contextual Match Search can be an extension of a Contextual Search and provides several additional properties, including, defining a source from which a search is populated, including a set of reference values used to compute a degree of match. A Match Schema or MatchMap 1210 can provide a Source Category of the Reference Concept and a set of match criteria. An example of a Reference Concept is a job requisition. The MatchCriteria can be extensions of Criteria defined by the Contextual Search Engine, and provide additional schema elements, including a SourceAttributePath from the Reference Concept. The SourceAttributePath can be used to automatically construct MatchCriteriaValues based on the Reference Concept. The MatchMap 1210 can describe how a Résumé Knowledge Base is traversed to construct a Contextual Match Search to search for Target Concepts also contained in the Résumé Knowledge Base or Candidate Knowledge Base. Given this MatchMap, the structure illustrated in FIG. 14 showing the Job Requisition Knowledge Base instance can be traversed to construct a search to find Concepts illustrated in FIG. 5 (e.g., concepts relating to Bob Smith's résumé).

a. Degree of Match Functions

The execution steps of a Contextual Match Search are very similar to a Contextual Search (and thus will not be repeated here) with the exception that the Contextual Match Engine provides Degree of Match Functions that are controlled by the Degree of Match Evaluator 1216, as illustrated in FIG. 12. The Contextual Match Engine 312 provides a degree of match function that computes partial scores for CriteriaValues. The DegreeOfMatchFunction is a ScoreEvaluator 740 (of the Criteria Evaluator 718) that can be integrated into ScoreCriteria as well as SubPartialEvaluators 742 (of the Criteria Evaluator 718). Associated with the DegreeOfMatchFunctions are Normalizers that transform Target Concept values into a normalized space where DegreeOfMatchFunctions compute partial scores. DegreeOfMatchFunctions can take as input reference values that are accessed via the Reference Concept.

The system preferably includes a special type of DegreeOfMatchFunction called a CurveDegreeOfMatchFunction, which provides a piece-wise continuous mapping of an input value to an output value that represents a score. A CurveDegreeOfMatchFunction backed by a CurveFunction (defined in detail above) can be defined by the following curve sections: EqualToLeadIn, EqualToInterval, and EqualToTail; RangeLeadIn, RangeInterval, and RangeTail; GreaterThanLeadIn and GreaterThanInterval; and LessThanInterval and LessThanTail. Each curve section can be defined by a Bezier curve. When the curve sections are spliced together, they form a continuous function that provides a fuzzy mapping between an input value and a score for a given function, including equal-to, range, greater-than, and less-than. With this mechanism, Criteria such as ">5," are no longer binary constraints, but rather fuzzy constraints where for example a value of "4" might have a score of 0.75 instead of 0.0.

b. ProductDegreeOfMatchCompoundSubsumptionEvaluator

The Contextual Match Engine 312 includes several SubPartialEvaluators 742 used to compute partial scores for SearchCriteriaValues, one of which is the ProductDegreeOfMatchCompoundSubsumptionEvaluator. This SubPartialEvaluator 742 can extend the SubsumptionEvaluator described above and can add the ability to compute an arbitrary number of DegreeOfMatchFunctions for components that comprise the target vector. To perform this operation, the Contextual Match Engine 312 can define the concept of a Partial Path. A Partial Path can be an AttributePath to a ConceptAttribute whose ConverseCategory is used to perform a partial score evaluation. The general methodology can include selecting all Partial Path Concepts that match the constraints of the SearchCriteriaValue, and then assemble Target Vectors that correspond to the Target Concepts, whereby the dimensions of the components of the vectors are computed using DegreeOfMatchFunctions, where the input values are values associated with the Partial Path Concepts.

Figure 15A:
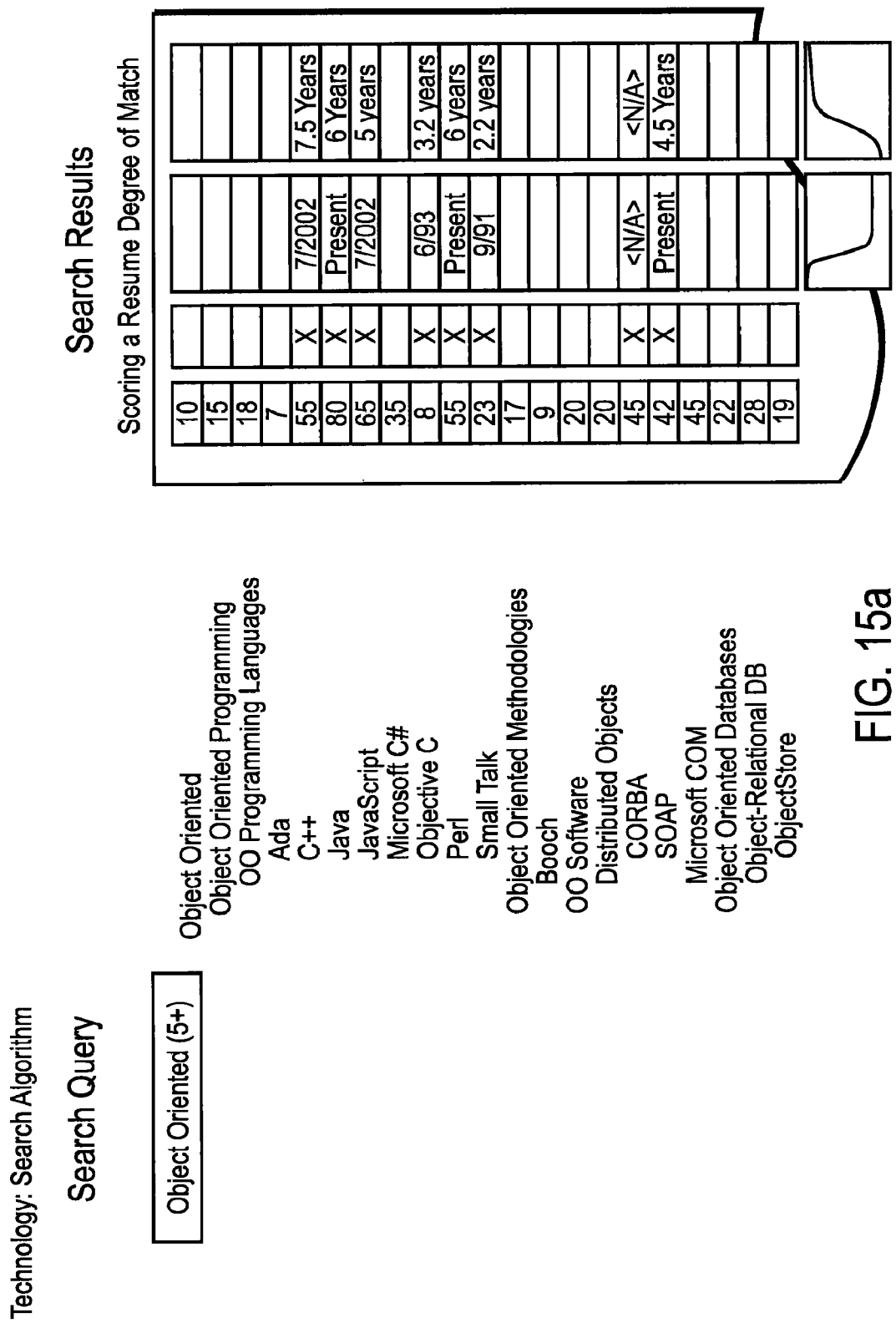
FIG. 15a is a high-level block diagram illustrating a search query example showing scoring of a résumé degree of match, according to one embodiment of the present invention.
Figure 15B:
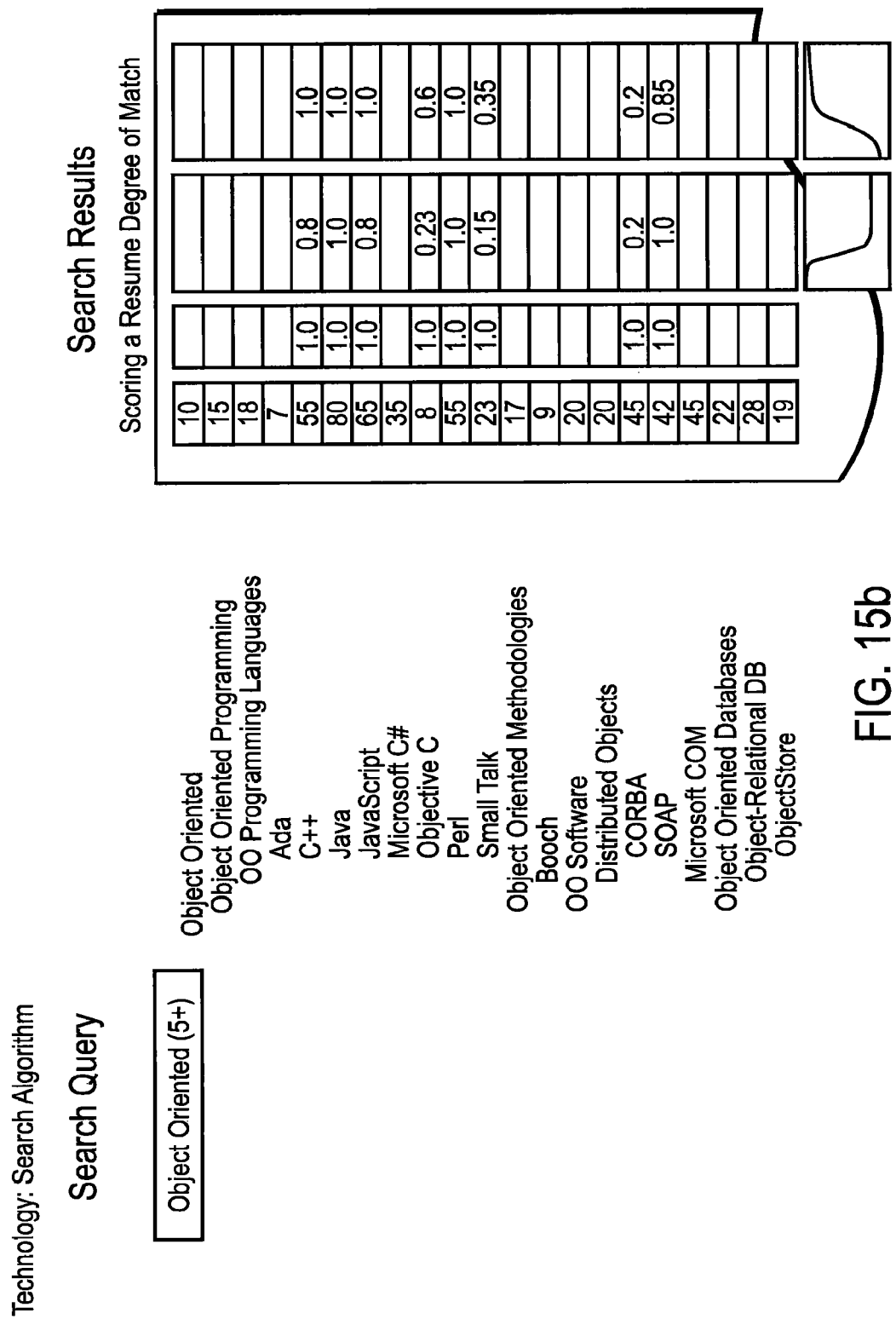
FIG. 15b is a high-level block diagram illustrating another search query example showing scoring of a résumé degree of match, according to one embodiment of the present invention.

For example, consider a SearchCriteriaValue corresponding to "Résumés with 5+years of Object Oriented experience." To evaluate this SearchCriteriaValue, it is possible to define the Partial Path to be RésuméKB.Résumé.RésuméSkills (which means that we will use RésuméSkills to compute the partial scores), and a CurveDegreeOfMatchFunction (as defined by "5+" or "x>5" as illustrated above) to evaluate the Attribute RésuméKB.Résumé.RésuméSkills.YearsOfExperience. In addition, it is also possible to provide a "hidden" CurveDegreeOfMatchFunction that evaluates "how long ago a Résumé used an Object Oriented skill," as illustrated in FIG. 15*a*. In this case, the Normalization Function uses a YearsSinceNow function to map the RésuméKB.Résumé.RésuméSkills.DateLastUsed value into a positive floating point value. That floating point value can be plugged into a CurveFunction as the X value to generate a partial score. In cases where there is no value associated with the DegreeOfMatchFunction Attribute, then a NotAvailableScore is assigned to that partial score component. The values after normalization and application of the CurveFunction are illustrated in FIG. 15*b*

In this example, two DegreeOfMatchFunctions have been provided for the SearchCriteriaValue, whose partial scores can be combined together to produce a single partial score using one of the following methods: 1) weighted average, 2) average, 3) geometric mean, 4) weighted geometric mean, or 5) product of the partial scores.

Referring again back to FIGS. 11*a* and 11*b*, FIG. 11*a* showed the basis vector for the input parameter "Object Oriented" is illustrated in FIG. 11*a*, showing the weight of each component associated with the input parameter. FIG. 11*a* illustrates the basis vector for each of the Skills including the weights for each of these components or rows of the vector. FIG. 11*b* illustrates the scoring for a resume that includes 8 of the RésuméSkills, including C++, Java, JavaScript, etc. A weight of 1.0 is assigned to each of the skills present on the resume. In FIG. 15*a*, further considers how recent the skill is and how many years that candidate used that skill (e.g., experience level). That information is included in the vectors shown. If a skill is less recent, it is given a less credit in comparison to a more recent skill. In FIG. 15*a*, the skill of Objective C was used back in 1993, so will likely be given less credit than the skill of Java, which is presently used. At the bottom of that column is shown a graph illustrating this. Similarly, as illustrated in the graph shown at the bottom of the column for years of experience, skills for which the candidate has had many years of experience (e.g., C++ for 7.5 years) will likely get more credit than skills for which the candidate has less experience (Objective C for 3.2 years). In addition, less credit can be given if a resume shows too much experience in a skill. As explained above, the system builds piecewise linear curves and can use these to obtain the numbers shown in FIG. 15*b*. The numbers shown in FIG. 15*b* can be aggregated together.

With a ProductDegreeOfMatchCompoundSubsumptionEvaluator a partial score can be computed for each of the components for which a Target Concept has a value. In the example illustrated in FIG. 5, Bob Smith would have two components that correspond to the SearchCriteriaValue "Résumés with 5+years of Object Oriented experience", namely "Java" and "C++".

As a further example, referring to FIG. 15*a*, a person can exhibit the use of the following skills on his résumé: C++, Java, JavaScript, Objective C, Perl, Small Talk, CORBA and SOAP. The résumé can also indicate that the person is currently using Java, Perl and SOAP in his current position, last used C++ and JavaScript in July 2002, and so forth. The résumé can also indicate based on the dates of employment that he has 7.5 years of experience with C++, 6 years of experience with Java and Perl, and so forth. Using this information, a "degree of match" weight can be computed based on how recently the person used the above skills. A degree of match curve for "skill recency" might give full credit for the skill, i.e. a value of 1.0 for present to up to 2 years ago and then gradually taper off until only a small amount of credit is given, e.g. 0.15. Such a degree of match function can be computed by using, for example, a Bezier curve to represent a relatively arbitrary function that has a shape similar to the one illustrated at the bottom of FIG. 15*a*. Similarly, a degree of match function can be computed based on how long someone has used a skill. In the query described above, "5+years of experience" could be used as a basis for computing a function that would give nearly full credit for 5 years of experience, possibly a weight of 0.75 for 4 years of experience, and possibly 0.15 for one year of experience, and so forth. These degree of match weights can be combined together to form a final weight for each skill in a dimensioned vector. A dot product of the skill vector for the résumé and the "ideal" set of skills can then be computed to determine how close the résumé is to a perfect candidate. This dot product is the score for the "5+years of Object Oriented Programming experience" Search Criteria.

c. SumDegreeOfMatchCompoundNoSubsumptionEvaluator

Another example embodiment of a SubPartialEvaluator 742 is a SumDegreeOfMatchCompoundNoSubsumptionEvaluator. This SubPartialEvaluator 742 extends the SubsumptionEvaluator described above and adds the ability to compute an arbitrary number of DegreeOfMatchFunctions for components that comprise the target vector. This evaluator can be similar to the ProductDegreeOfMatchCompoundSubsumptionEvaluator except that does not use a similarity measure based on the normalized dot product of a Basis Vector and Target Vector; rather, it uses MultiPartFunctions to compile values collected from Partial Path Concepts, and then computes a partial score based on a DegreeOfMatchFunction where the input is the compiled values.

For example, consider the SearchCriteriaValue that would correspond to "Résumés with 5+years of experience as a Software Engineer". In this case, we would want to compute the partial score based on the sum of all the years of experience for each of the Partial Path Concepts that correspond to a Target Concept; or in other words, the total years of experience with positions working as a Software Engineer.

To perform this operation, the SumDegreeOfMatchCompoundNoSubsumptionEvaluator can also provide a Partial Path to an evaluation Category used to perform a partial score evaluation. The general methodology is to select all Partial Path Concepts that match the constraints of the SearchCriteriaValue, and then compile the partial values that correspond to the Target Concepts using MultiPartFunctions. MultiPartFunctions can include, but are not limited to:

DateMultiPartFunction
   LatestDateMultiPartFunction
   OldestDateMultiPartFunction
   LastDateMultiPartFunction
LastDoubleMultiPartFunction
LastIntMultiPartFunction
LastValueMultiPartFunction
NumberMultiPartFunction
   MaxNumberMultiPartFunction
   MinNumberMultiPartFunction
   SumNumberMultiPartFunction In the example given above, a SumNumberMultiPartFunction can be used to add up the number of years of experience with positions as a Software Engineer, and a LatestDateMultiPartFunction can be used to compute the latest date used, which can be combined with a YearsSinceNowNormalizer to determine the input value for the DegreeOfMatchFunction.

D. Adaptive and Collaborative User Profiling Engine

The Adaptive and Collaborative User Profiling Engine 310 builds and maintains collections of profile weights for Values and Concepts for a given context, i.e. an Attribute, or contextless, i.e. without the context of an Attribute. These profile weights are used by the Personalized Search and Match Engine 308 to personalize search results based on user feedback.

The Adaptive and Collaborative User Profiling Engine 310 allows for the conducting of personalized searches. The Contextual Search Engine and Contextual Match Engine can find and rank documents based queries ranging from a few high level search criteria to very complex queries with many search criteria with differing importance to entire documents that implicitly state search criteria. Yet, in the examples described above regarding Contextual Searches and Contextual Match Searches, if two users enter the same query, they will get back exactly the same result. However, it is often useful to have different results returned based on preferences of the user for whom the search is being conducted and the type of search being conducted. The Adaptive and Collaborative User Profiling Engine 310 allows for this by building and maintaining collections of profile weights for Values and Concepts for a given context. Thus, a user can conduct a search that is personalized to his own preferences.

As one example, a recruiter conducting a search for résumés for two different hiring managers where the search is very similar on the surface, yet the hiring managers had implicit needs that they did not fully specify to the recruiter, the system can respond by learning these implicit requirements based on feedback from the hiring manager. The system can rank the search results according to requirements implicitly specified by the feedback. For example, if the original search criteria included Title=Software Engineer and Skills=Object Oriented Programming, the system learns that one hiring manager preferred résumés that listed experience with the Java programming language, while another hiring manager preferred résumés that listed experience with the C# programming language, and all the skills associated with those languages, respectively. Furthermore, the one hiring manager may have two open requisitions, both with the same high level requirements (Title=Software Engineer, and Skills=Object Oriented Programming), yet the hiring manager may want experience with Java for one position and experience with C++ for another position. Further, a hiring manager may have a preference for résumés of candidates from particular locations (e.g., candidates that went to school in the North Eastern United States, and who worked in the Mid-Western United States). In this case, the context in which a concept is used is useful for delivering good results.

The user feedback can be explicit, so can be provided explicitly by a user via some type of rating or other feedback system. The user feedback can also be implicit, so it can be learned or determined by the system based on actions taken by the user (e.g., saving certain search results, clicking on a link of interest, spending a longer amount of time viewing a search result, viewing results that are further down on a search list, bookmarking a result, etc.).

The Adaptive and Collaborative User Profiling Engine 310 further allows for learning of both user profiles and search profiles, and applying these to the search to modify the ranking of documents. As will be described in the next section, the Personalized Search and Match Engine 308 applies the profiles to the search methods to yield personalized search results. This method of personalization is not limited in any way to searching for résumés and job requisitions, but can be applied to many other fields.

The Engine 310 allows for learning both User Profiles and Search Profiles. User Profiles pertain to the user's general preferences that are not specifically associated with a search; whereas, a Search Profile is specific to a type of search or a specific search, but does not factor in the user conducting the search. An example of a User Profile is a profile that is specific to a Hiring Manager. An example of a Search Profile is a profile that is specific to the search for a Software Engineer who knows Object Oriented Programming. A Biased Profile combines the weights of a User Profile and a Search Profile. For example, a Biased Profile is used to combine the Profile associated with the Hiring Manager with the Profile associated with the search for a Software Engineer who knows Object Oriented Programming. In one example, the Search Profile forms the basis of the Profile. If a profile weight exists in the Search Profile, then that weight is "biased" by the weight in the User Profile using a biasing function. Examples of a biasing function include a mean, a geometric mean, a generalized mean, a trimmed mean, a winsorized mean, a median etc.

Profiles can be constructed based on user feedback on Search Results. A profile includes a set of concepts or value weights. For example, with the Software Engineer who knows Object Oriented Programming, a profile is likely to have weights for Java, J2EE, C#, .Net, C++, Ruby on Rails, etc. When an Object Oriented Programming Skill is found in a Résumé it is evaluated using these profile weights. For a given Search Result (and associated Target Concept and Contextual Search), there can be a Feedback Value Tuple including an Implicit Feedback Value, Explicit Feedback Value, and Negative Feedback Value, each of which have a value between −1.0 and 1.0.

A FeedbackApplicator 1620 (shown in FIG. 16, described below) can be used to apply feedback to a Profile given a Source Concept (i.e. the Target Concept of a Contextual Search) that is a compound concept containing many different values for which feedback is to be given, and a Reference Concept from which differences are computed. A FeedbackApplicator can use a FeedbackMap, a set of AttributePaths used to specify which values of the Source Concept are to be applied to the Profile and whether or not the feedback Concepts should be applied with the context of their source Attribute and a corresponding set of AttributePaths from the Reference Concept from which to compute relative differences. When feedback is applied with the FeedbackApplicator 1620, corresponding values from the Source Concept and Reference Concept are gathered to form two sets of values: set S contains value from the Source Concept, and set R contains values from the Reference Concept.

Using these two sets, the Implicit Feedback Value is applied to all the values in S\R (i.e. the values in S and not in R). The Explicit Feedback Value is applied to all values in S©R (i.e. all values that S and R have in common). The Negative Feedback Value is applied to all values in R\S (i.e. the values in R and not in S). Based on the Feedback Values, a model can be constructed for each Concept and Value. A ValueWeight can capture and specify a weight for a particular Value of an Attribute. The weight can be computed by a weight function with the input including a set of the set of normalized feedback values. An example of weight functions includes geometric mean, weighted geometric mean, weighted average and average, where the weighting measure is the amount of energy (described below) associated with each Feedback Value. A weight can become statistically significant when the confidence level (which is computed based on the standard deviation of the feedback samples) raises above the specified level, given at least the minimum number of feedback samples.

Each document can contain a set of Concepts, e.g. Skill Concepts. When a user rates a document, he is implicitly rating each of the Skill Concepts associated with the résumé. If the user rates a résumé with 5 out of 5 stars, then that might translate to a feedback value of 1.0 on a scale of −1.0 to 1.0. All of the skills in that résumé would receive a feedback sample of 1.0. If another résumé had the same skill and was rated with 2 stars, then the feedback might be 0.25, and a sample of 0.25 would be added to that skill. After there are a certain number of samples it is possible to compute a (geometric) mean and standard deviation. If the standard deviation is very high, then it means that there is not much consistency between the feedback samples, and hence the "confidence" is not very high that the feedback has much meaning. If the standard deviation is very low, then it means that the samples are fairly consistent and one can then infer that mean of the samples should be the weight associated with the concept or value.

The system further preferably includes a learning rate and a forgetting rate. The learning rate describes how much energy is applied for each FeedbackValue. The forgetting rate describes how much energy in total is stored for each Value Weight or Concept Weight. Once the forgetting rate energy threshold is reached, the oldest Feedback Values are removed from the pool of samples until the energy level drops below the forgetting rate threshold. Thus, the information learned can decay over time. In this manner, a user can use the system a year later, and the information learned in the past will not necessarily bias his current search results, since the information learned in the past may be outdated.

Both User and Search Profiles can be arranged hierarchically, and feedback can be propagated up the Profile hierarchy. Using this mechanism, users can collaboratively build and refine Profiles. In addition, child Profiles in a hierarchy can inherit profile weights from parent profiles where profile values are not defined in the child profile.

F. Personalized Search and Match Engine

The Personalized Search and Match Engine 308 (or Profiled Search Engine) personalizes search results to a particular user's preferences or the preferences of a particular type of search by using the Profiles defined above. To accomplish this objective, the Engine 308 can use the weights computed by the Profile (profile weights) to modify the weights used by the Contextual Search or Contextual Match (internal weights). This weight biasing is applied in several key areas of the search, including, but not limited to, 1) calculation of CriteriaValue weights, and 2) calculation of vector component weights used by the SubPartialEvaluators. This Engine 308 is illustrated in more detail in FIG. 16, according to an embodiment of the invention. Many of the components of the Personalized Search and Match Engine 308 are similar to the Contextual Match Engine 312 and the Contextual Search Engine 314 (and thus will not be described again here), except that the Personalized Search and Match Engine 308 further includes a Feedback Applicator 1620, as described in more detail below.

Figure 16:
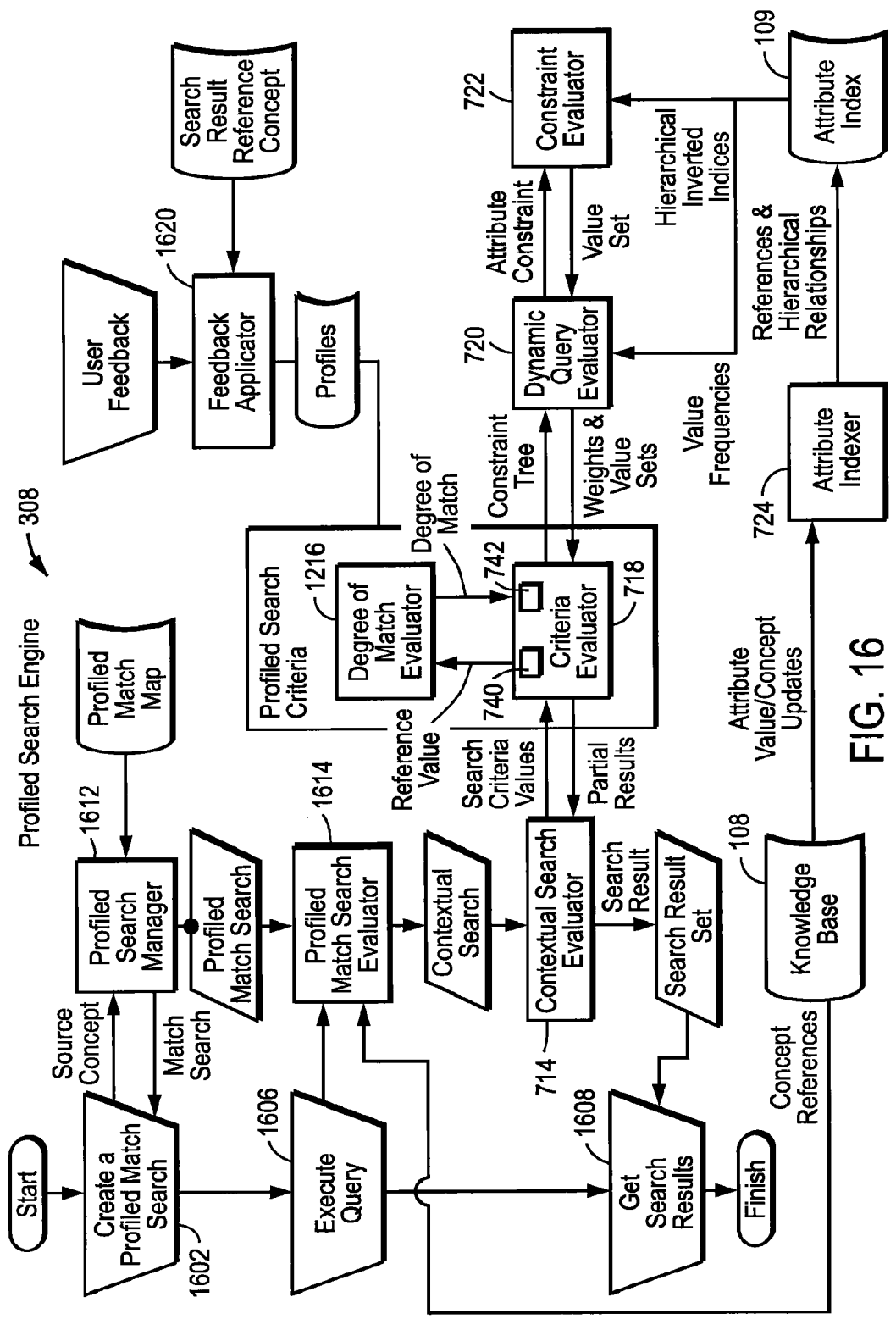
FIG. 16 is a diagram the Profiled Search Engine components and processes, according to one embodiment of the present invention.

As shown in FIG. 16, a Profiled Match Search is created 1602 using the Profiled Search Manager 1612, where the search is defined by a Profiled MatchMap 1610. The Profiled Match Search is executed 1606 by the Profiled Match Search Evaluator 1614, and a Contextual Search can be conducted by the Contextual Search Evaluator 714, as described regarding FIGS. 7 and 12. The Search Criteria are analyzed by the Criteria Evaluator 718 to return a set of partial results and a Constraint Tree is computed. The Constraints can be evaluated by a Constraint Evaluator 722 that uses an Attribute Index 109 and an Attribute Indexer 724 to determine the set of sub-matching Concept/Value Sets. In addition, the system 312 can include a degree of match evaluator 1216 that functions in a manner similar to that shown in FIG. 12. The Profiled Search Engine 308 also includes a Feedback Applicator 1620 that accepts feedback from users regarding search results (e.g., a user can give a high rating to a resume received in a search result that lists Object Oriented, if that is a skill of interest). This feedback is then stored in a profile for the user. The feedback can be used to figure out the weight of Object Oriented. The internal weights shown in FIG. 11a can be combined with the profiled weights. Thus, a skill such as Objective C, which received a low internal weight in FIG. 11a, can have its weight increased if a user gives high ratings to resumes with Objective C. The rest of the process shown in FIG. 16 continues as shown in FIGS. 7 and 12, including the score evaluation, combination of partial scores to get a final score for each of the Target Concepts, sorting of the results based on score, and returning 1208 a Search Result Set. Those sub-matching Concept or Value Sets are then combined together using the prescribed Boolean logic to arrive at the final set of Target Concepts.

The Personalized Search Engine preferably redefines a weight to be a function of the internal weight, iw—a weight defined by the document collection as represented by a Knowledge Base—and the profiled weight, pw, i.e. w=f(iw, pw), where iw=f(fp,ft), where fp is the partial frequency and ft is the total frequency. Examples of the internal weight function, include 1) log frequency, 2) log inverse frequency, 3) linear frequency, 4) fuzzy frequency, and 5) fuzzy inverse frequency, as defined above. Several weight models can be used interchangeably, including geometric mean, weighted geometric mean, mean and weighted mean. The weights in the weighted geometric mean and weighted mean correspond to the amount of energy represented by each profile weight, where the energy is proportional to the frequency of the Value or Concept corresponding to the profile weight. For example, if there are 100 concepts in a particular ConceptAttribute and Category and 15 of which have been rated by the user, then using a weighted average the weight calculation would be ((85)(iw)*(15)(pw))/100. The Profiled Search Engine module replaces the previous weight calculations (which correspond to the internal weight calculations) with the new weight function w=f(iw,pw), for all weight calculations. This modification results in a personalized search result ranking 1. ProfiledScoreCriteria The Personalized Search Engine also provides new classes of ScoreCriteria called ProfiledScoreCriteria that capture implicit criteria. To define these new constructs, the system describes a ProfiledSearchMap and a ProfiledMatchMap that provide the schema for ProfiledScoreCriteria. Two examples of a ProfiledScoreCriteria are shown below:

SimpleProfiledScoreCriteria—a ProfiledScoreCriteria based on a single Attribute or AttributePath, and CompoundProfiledScoreCriteria—a ProfiledScoreCriteria based on a set of ProfiledScoreCriteria The instantiated forms of these Criteria are the SimpleProfiledScoreCriteriaValue and CompoundProfiledScoreCriteriaValue, respectively. As with all CriteriaValues, SimpleProfiledScoreCriteriaValues and CompoundProfiledScoreCriteriaValues are provided with a tuple including at least the following:

a weight range,
a weight, which is a function of the weight range,
a requirement, which can be one of the following
    REQUIRED
    DESIRED A SimpleProfiledScoreCriteriaValue can use an AttributePath from a Target Concept to select a set of Values to evaluate, described as the Evaluation Set. In some embodiments, the weight of the SimpleProfiledScoreCriteriaValue is a function of the total number of values in the Evaluation Set, ft, and the number of values in the Evaluation Set for which a profile weight is described (as described above), fp: w=f(ft,fp). Example weight functions include log frequency and log inverse frequency. In some embodiments, a log frequency is used to compute the weight for a SimpleProfiledScoreCriteriValue.

The partial score of a SimpleProfiledScoreCriteriaValue is preferably computed using a similarity measure between a vector comprised of the "active" profile weights, P, where the dimensions of the vector P are defined by the Values associated with the AttributePath specified by the SimpleProfiledScoreCriteria and lengths of the dimensions are defined by the profile weights, and a vector corresponding to the values references by the Target Concept, T, where the dimensions of the vector T are similarly defined by the Values associated the AttributePath specified by the SimpleProfiledScoreCriteria, and the length of the dimensions are set to 1.0 (note, alternatively the lengths of the dimensions of T can be defined the frequency of Ti in Target Concept i, or any other mapping function). The similarity measure used in the preferred embodiment is the normalized dot product $$(P \cdot T)/(\|P\| \|T\|)$$

The weight of a CompoundProfiledScoreCriteriaValue is preferably computed using either the geometric mean or the mean of the weights of the sub-ProfiledScoreCriteria. The partial score of a CompoundProfiledScoreCriteriaValue can be computed by first computing the score for each of the sub-ProfiledScoreCriteria, and then aggregating the results using the Score Integration Function (as defined above), where SPSC=f({(w,r,ps)}).

G. Search Improvement Wizard

The learning methods described in the previous section function most effectively with a number feedback samples to narrow in on a consistent profile weight model that represents a user's preferences. To address this issue, in some embodiments, the system includes a method for determining a set of Values or Concept for which a user can provide explicit feedback without having to implicitly specify preference feedback based on Target Concepts of a search. This method includes analyzing the set of Target Concepts in a search result, and for a given AttributePath determines the set of Values or Concepts for a user to provide feedback. In some embodiments, the system includes a method that uses clustering and covariant analysis to determine which Values or Concepts will result in the greatest impact on the search results.

After selecting a set of Values or Concepts, they can be presented to the user using a Search Improvement Wizard as a part of the web application 302 shown in FIG. 3. When feedback is applied to the Profile, it is applied only with the Explicit Feedback Value. The amount of energy feed into the Profile for Explicit Feedback Values is higher than feedback given for a Target Concept as a whole.

As will be understood by those familiar with the art, the invention may be embodied in other specific forms without departing from the spirit or essential characteristics thereof. Likewise, the particular naming and division of the modules, managers, engines, components, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the invention is in no way limited to implementation in any specific programming language, or for any specific operating system or environment. Accordingly, the disclosure of the invention is intended to be illustrative, but not limiting, of the scope of the invention, which is set forth in the following claims.

I claim:

1. A computer-implemented method for constructing a search query to execute a search of a knowledge base, the method comprising:
    using a processor to perform method steps comprising:
        parsing an input query received from a user conducting the search of the knowledge base into a plurality of sub-components;
        matching at least one of the plurality of sub-components to concepts represented as nodes in a semantic concept network of the knowledge base that provides an index of a plurality of documents that are target concepts linked to one or more nodes in the network;
        selecting from the knowledge base a set of matching concepts that match at least part of the sub-components;
        mapping the matching concepts to a structured set of criteria and criteria values that specify a set of constraints on and scoring parameters for the matching concepts, the criteria and criteria values being linked to nodes of the matching concepts; and
        executing the search of the database to retrieve a set of target concepts as search results constrained by the criteria according to a relationship between the search results and the matching concepts, the search results retrieved by matching nodes of the criteria and criteria values across the network to nodes of the target concepts using transitivity, wherein the search results are scored against each of the matched concepts and the search results are ranked based on the criteria values, the search results including one or more of the documents indexed.

2. The method of claim 1, wherein the input query is selected from a group consisting of: a query for job requisitions and a query for resumes.

3. The method of claim 1, wherein the input query is selected from a group consisting of: a résumé document and a job requisition document.

4. The method of claim 1, wherein the input query is selected from a group consisting of: an input string of text, a set of contextual input strings, and a document.

5. The method of claim 1, wherein the search is defined as a search schema providing a target category and the set of criteria for the search.

6. The method of claim 5, further comprising instantiating the search schema with criteria values corresponding to each of the criteria in the set.

7. The method of claim 1, wherein parsing step further comprises using regular expressions to parse the input query into the sub-components that are matched to concepts.

8. The method of claim 7, further comprising:
applying a rule set for parsing the input query into the sub-components; and
defining a string normalization function for mapping one of the sub-components to another sub-string, the string normalization function converting the input query or the sub-components into common character representations for finding matches with the concepts in the knowledge base.

9. The method of claim 1, wherein matching at least one of the plurality of sub-components to concepts further comprises matching based on tests selected from a group consisting of: searching for concepts having attributes that explicitly match one of the plurality of sub-components, and searching for concepts that match one of the plurality of sub-components using synonyms.

10. The method of claim 9, wherein an action is taken based on a result of the tests, the action selected from the group consisting of: assign, create, recurse, return, stop, unassign, and any combination of these.

11. The method of claim 1, wherein the concept network represents a directed acyclic graph.

12. The method of claim 1, wherein the criteria values can be defined by a tuple of values selected from a group consisting of: a weight range, a weight, a requirement, a value or set of values, and any combination of these.

13. The method of claim 1, wherein the criteria are selected from a group consisting of: filter criteria, include criteria, score criteria, search criteria, and any combination of these.

14. The method of claim 13, wherein the filter criteria specify how the search results are filtered based on the presence of the matched concepts, the include criteria specify concepts that are required to be present in the search results, the score criteria specify how individual concepts in the search results are scored, and the search criteria specify how sub-sets of concepts in the search results are selected and scored as a group.

15. The method of claim 13, wherein the criteria are applied as a predefined hierarchy of filter criteria, include criteria, score criteria, and search criteria.

16. The method of claim 13, wherein the filter criteria are instantiated as filter criteria values, the include criteria are instantiated as include criteria values, the search criteria are instantiated as search criteria values, and the score criteria are instantiated as score criteria values.

17. The method of claim 1, wherein each of the criteria specify a weight model that is used to compute weights for matched search criteria values.

18. The method of claim 1, further comprising:
evaluating each of the criteria; and
returning a set of partial results from the evaluation for each of the criteria, the partial results including a target concept and a partial score for that target concept.

19. The method of claim 18, further comprising:
computing a constraint tree in the evaluation, the constraint tree including a hierarchy of constraints; and
using the constraint tree compute a set of target concepts that match the constraints of the constraint tree.

20. The method of claim 19, further comprising:
evaluating each of the constraints using an index to determine a set of sub-matching concepts that are combined together to obtain a final set of target concepts as partial result set for the search;
assigning partial scores to each target concept of the partial result set; and
combining the partial scores to obtain a final score for each of the target concepts of the partial result set.

21. The method of claim 20, further comprising:
sorting the target concepts of the partial result set based on the final score for each; and
constructing and returning a search result set.

22. The method of claim 1, further comprising conducting the search using a fuzzy query.

23. The method of claim 1, wherein the criteria are filter criteria that are instantiated as filter criteria values, and the method further comprises:
selecting a subset of target concepts for each filter criteria value using filter criteria value parameters; and
computing inclusion and exclusion filter sets by combining the subsets together using set operations specified by the filter criteria values.

24. The method of claim 1, wherein the criteria are include criteria that are instantiated as include criteria values, and the method further comprises:
selecting a subset of target concepts for each include criteria value using include criteria value parameters; and
adding the selected target concepts to a search result set, applying inclusion and exclusion filter sets when specified.

25. The method of claim 1, wherein the criteria are search criteria that are instantiated as search criteria values, and the method further comprises:
selecting a subset of target concepts for each search criteria value using search criteria value parameters;
computing a partial score for each of the target concepts in the subset; and
adding each of the selected target concepts to a search result set.

26. The method of claim 1, wherein the criteria are score criteria that are instantiated as score criteria values, and the method further comprises:
computing for each score criteria value a partial score for target concepts in a search result set created using the include criteria values and the search criteria values;
computing a final search result score; and
sorting the search results.

27. The method of claim 1, further comprising selecting subsets of target concepts for criteria values using a constraint tree to construct queries that select the subsets of target concepts.

28. A computer system for constructing a search query to execute a search of a knowledge base, the system comprising:
a computer-readable storage medium storing executable software components comprising:
a query parser for parsing an input query received from a user conducting the search of the knowledge base into a plurality of sub-components;
a search engine for:
matching at least one of the plurality of sub-components to concepts represented as nodes in a semantic concept network of the knowledge base that provides an index of a plurality of documents that are target concepts linked to one or more nodes in the network;
selecting from the knowledge base a set of matching concepts that match at least part of the sub-components;
mapping the matching concepts to a structured set of criteria and criteria values that specify a set of constraints on and scoring parameters for the matching concepts, the criteria and criteria values being linked to nodes of the matching concepts;
executing the search of the database to retrieve a set of target concepts as search results constrained by the criteria according to a relationship between the search results and the matching concepts, the search results retrieved by matching nodes of the criteria and criteria values across the network to nodes of the target concepts using transitivity, wherein the search results are scored against each of the matched concepts and the search results are ranked based on the criteria values, the search results including one or more of the documents indexed; and
a processor configured to execute the software components stored by the computer-readable storage medium.

29. The system of claim 28, wherein the input query is selected from a group consisting of: a query for job requisitions and a query for resumes.

30. The system of claim 28, wherein the search is defined as a search schema providing a target category and the set of criteria for the search, the search schema instantiated with criteria values corresponding to each of the criteria in the set.

31. The system of claim 28, wherein the query parser is further for using regular expressions to parse the input query into the sub-components that are matched to concepts.

32. The system of claim 28, wherein the concept network represents a directed acyclic graph.

33. The system of claim 28, wherein the criteria are selected from a group consisting of: filter criteria specifying filtering of search results based on the presence of the matching concepts, include criteria specifying concepts that are required to be present in search results, score criteria, specifying how individual concepts in search results are scored, search criteria specifying how sub-sets of concepts in search results are selected and scored as a group, and any combination of these.

34. The system of claim 28, wherein each of the criteria specify a weight model that is used to compute weights for matched search criteria values.

35. The system of claim 28, further comprising:
a contextual search evaluator for evaluating each of the criteria; and
the contextual search evaluator for returning a set of partial results from the evaluation for each of the criteria, the partial results including a target concept and a partial score for that target concept.

36. The system of claim 35, further comprising:
a criteria evaluator for computing a constraint tree in the evaluation, the constraint tree including a hierarchy of constraints;
a dynamic query evaluator for using the constraint tree compute a set of target concepts that match the constraints of the constraint tree; and
a constraint evaluator for evaluating each of the constraints using an index to determine a set of sub-matching concepts that are combined together to obtain a final set of target concepts as partial result set for the search.

37. The system of claim 36, further comprising:
the criteria evaluator for assigning partial scores to each target concept of the partial result set;
the contextual search evaluator for combining the partial scores to obtain a final score for each of the target concepts of the partial result set;
the contextual search evaluator for sorting the target concepts of the partial result set based on the final score for each; and
the contextual search evaluator for constructing and returning a search result set.

38. A computer-readable storage medium storing computer program instructions executable by a processor for constructing a search query to execute a search of a knowledge base, the computer program instruction comprising instructions for:
parsing an input query received from a user conducting the search of the knowledge base into a plurality of sub-components;
matching at least one of the plurality of sub-components to concepts represented as nodes in a semantic concept network of the knowledge base that provides an index of a plurality of documents that are target concepts linked to one or more nodes in the network;
selecting from the knowledge base a set of matching concepts that match at least part of the sub-components;
mapping the matching concepts to a structured set of criteria and criteria values that specify a set of constraints on and scoring parameters for the matching concepts, the criteria and criteria values being linked to nodes of the matching concepts; and
executing the search of the database to retrieve a set of target concepts as search results constrained by the criteria according to a relationship between the search results and the matching concepts, the search results retrieved by matching nodes of the criteria and criteria values across the network to nodes of the target concepts using transitivity, wherein the search results are scored against each of the matched concepts and the search results are ranked based on the criteria values, the search results including one or more of the documents indexed.

39. The computer program product of claim 38, wherein the input query is selected from a group consisting of: a query for job requisitions and a query for resumes.

40. The computer program product of claim 38, wherein the search is defined as a search schema providing a target category and the set of criteria for the search, the search schema instantiated with criteria values corresponding to each of the criteria in the set.

41. The computer program product of claim 38, wherein parsing an input query further comprises using regular expressions to parse the input query into the sub-components that are matched to concepts.

42. The computer program product of claim 38, wherein each of the criteria specify a weight model that is used to compute weights for matched search criteria values.

43. The computer program product of claim 38, further comprising selecting subsets of target concepts for criteria values using a constraint tree to construct queries that select the subsets of target concepts.

* * * * *